United States Patent
Lahann et al.

(10) Patent No.: US 8,399,047 B2
(45) Date of Patent: Mar. 19, 2013

(54) MULTIFUNCTIONAL CVD COATINGS

(75) Inventors: Joerg Lahann, Ann Arbor, MI (US);
Yaseen Elkasabi, Ann Arbor, MI (US)

(73) Assignee: The Regents of The Univeristy of Michigan, Ann Arbor, MI (US)

( * ) Notice: Subject to any disclaimer, the term of this patent is extended or adjusted under 35 U.S.C. 154(b) by 675 days.

(21) Appl. No.: 12/054,171

(22) Filed: Mar. 24, 2008

(65) Prior Publication Data
US 2008/0269456 A1    Oct. 30, 2008

Related U.S. Application Data

(60) Provisional application No. 60/919,545, filed on Mar. 22, 2007.

(51) Int. Cl.
*B05D 5/12*    (2006.01)
(52) U.S. Cl. ....... 427/97.5; 427/509; 528/422; 528/396; 528/212; 528/220; 528/230; 528/271
(58) Field of Classification Search ................. 528/212, 528/396, 422, 230, 20, 271
See application file for complete search history.

(56) References Cited

U.S. PATENT DOCUMENTS

| | | | |
|---|---|---|---|
| 4,746,347 A | 5/1988 | Sensi | |
| 4,792,536 A | 12/1988 | Pecoraro et al. | |
| 5,171,132 A | 12/1992 | Miyazaki et al. | |
| 5,240,886 A | 8/1993 | Gulotta et al. | |
| 5,271,724 A | 12/1993 | van Lintel | |
| 5,277,556 A | 1/1994 | van Lintel | |
| 5,375,979 A | 12/1994 | Trah | |
| 5,385,872 A | 1/1995 | Gulotta et al. | |
| 5,393,593 A | 2/1995 | Gulotta et al. | |
| 5,776,748 A | 7/1998 | Singhvi et al. | |
| 5,858,188 A | 1/1999 | Soane et al. | |
| 5,869,135 A | 2/1999 | Vaeth et al. | |
| 5,935,409 A | 8/1999 | King et al. | |
| 6,074,725 A | 6/2000 | Kennedy | |
| 6,086,679 A * | 7/2000 | Lee et al. | 118/724 |
| 6,103,479 A | 8/2000 | Taylor | |
| 6,192,168 B1 | 2/2001 | Feldstein et al. | |
| 6,291,072 B1 | 9/2001 | Kimoto et al. | |
| 6,473,696 B1 | 10/2002 | Onyia et al. | |
| 6,712,846 B1 | 3/2004 | Kraus et al. | |
| 6,751,558 B2 | 6/2004 | Huffman et al. | |

(Continued)

FOREIGN PATENT DOCUMENTS

| | | |
|---|---|---|
| DE | 19604173 | 8/1997 |
| EP | 0519087 | 12/1992 |

(Continued)

OTHER PUBLICATIONS

Nandivada, H. et al., "Click Chemistry: Versatility and Control in the Hands of Materials Scientists," Adv. Mater., vol. 19, Issue 17, pp. 2197-2208 (2007).

(Continued)

*Primary Examiner* — Shane Fang
(74) *Attorney, Agent, or Firm* — Harness, Dickey & Pierce, P.L.C.

(57) ABSTRACT

Multifunctional reactive polymers created by chemical vapor deposition (CVD) and methods of making such polymeric systems are provided. Such polymers provide multifunctional surfaces which can present two or more different molecules (e.g. biological ligands) in controlled ratios. Polymers may include compositional gradients allowing attached ligands to be presented as continuous gradients across a surface. The polymer compositions are modularly designable and applicable to a wider range of applications, including biomedical devices and diagnostic systems.

20 Claims, 34 Drawing Sheets

U.S. PATENT DOCUMENTS

| | | | |
|---|---|---|---|
| 6,942,771 B1 | 9/2005 | Kayyem | |
| 6,977,138 B2 * | 12/2005 | Lahann et al. | 430/322 |
| 6,977,866 B2 | 12/2005 | Huffman et al. | |
| 7,020,355 B2 | 3/2006 | Lahann et al. | |
| 7,217,356 B2 | 5/2007 | Cork et al. | |
| 7,648,739 B2 | 1/2010 | Lahann et al. | |
| 2003/0044546 A1 | 3/2003 | Lahann et al. | |
| 2005/0064027 A1 | 3/2005 | Jacob et al. | |
| 2005/0118595 A1 * | 6/2005 | Lahann | 435/6 |
| 2005/0276835 A1 | 12/2005 | Lahann et al. | |
| 2006/0064740 A1 | 3/2006 | Kelley et al. | |
| 2006/0187325 A1 | 8/2006 | Laue et al. | |
| 2006/0192281 A1 | 8/2006 | Lu et al. | |
| 2006/0201390 A1 | 9/2006 | Lahann et al. | |
| 2006/0294588 A1 | 12/2006 | Lahann et al. | |
| 2007/0237800 A1 | 10/2007 | Lahann | |
| 2007/0272122 A1 | 11/2007 | Lahann et al. | |
| 2007/0281126 A1 | 12/2007 | Lahann et al. | |
| 2008/0242774 A1 | 10/2008 | Lahann et al. | |
| 2008/0269456 A1 | 10/2008 | Lahann et al. | |
| 2009/0118819 A1 | 5/2009 | Merz et al. | |
| 2010/0015447 A1 | 1/2010 | Lahann et al. | |
| 2010/0038830 A1 | 2/2010 | Lahann et al. | |
| 2010/0068810 A1 | 3/2010 | Smith et al. | |
| 2010/0145422 A1 | 6/2010 | Seymour et al. | |

FOREIGN PATENT DOCUMENTS

| | | |
|---|---|---|
| WO | WO 99/30823 | 6/1999 |
| WO | WO 99/40174 | 8/1999 |
| WO | WO 00/04389 | 1/2000 |
| WO | WO 00/04390 | 1/2000 |
| WO | WO 00/53625 | 9/2000 |
| WO | WO 00/60356 | 10/2000 |
| WO | WO 01/07891 | 1/2001 |
| WO | WO 02/094454 | 11/2002 |
| WO | WO 2004/016672 | 2/2004 |

OTHER PUBLICATIONS

Nandivada, H. et al., "Reactive Polymer Coatings that 'Click'," Angewandte Chemie International Edition, vol. 45, Issue 20, pp. 3360-3363 (2006).

Elkasabi, Yaseen et al., "Chemical vapor deposition co-polymerization of functionalized [2.2]paracyclophanes," Poster No. 142al presented at AIChE Annual Meeting, Cincinnati, OH (Oct. 31, 2005).

Elkasabi, Yaseen et al., "Multipotent Polymer Coatings Based on Chemical Vapor Deposition Copolymerization", Adv. Mater., vol. 18, Issue 12, pp. 1521-1526 (2006).

Lahann, Joerg et al., "Bioactive immobilization of r-hirudin on CVD-coated metallic implant devices", Biomaterials, vol. 22, pp. 817-826 (2001).

Lahann, Joerg et al., "Microengineered Surfaces for Biomedical Applications Based on a Polymeric Active Ester", Polymer Reprints, Am. Chem. Soc., vol. 42, No. 2, pp. 113-114 (2001).

Lahann, Joerg, "Vapor-based polymer coatings for potential biomedical applications", Polym. Int., vol. 55, pp. 1361-1370 (2006).

Lahann, Jorg et al., "Chemical vapour deposition polymerization of substituted [2.2]paracyclophanes", Macromol. Rapid Commun., vol. 19, pp. 441-444 (1998).

Lahann, Jorg et al., "Synthesis of Amino [2.2]paracyclophanes—Beneficial Monomers for Bioactive Coating of Medical Implant Materials", Agnew. Chem. Int. Ed., vol. 40, No. 4, pp. 726-728 (2001).

Lahann, Jorg, "Reactive Polymer Coatings for Biomimetic Surface Engineering", Chem. Eng. Comm., vol. 193, Issue 11, pp. 1457-1468 (2006).

Elkasabi, Y. et al., "Vapor-Based Polymer Gradients," Macromolecular Rapid Communications, vol. 30, pp. 57-63 (2009).

Non-Final Office Action for U.S. Appl. No. 11/691,210 (U.S. Pub. No. 2007/0272122) dated Feb. 12, 2010.

Response filed on Mar. 15, 2010 to Non-Final Office Action dated Feb. 12, 2010 for U.S. Appl. No. 11/691,210 (U.S. Pub. No. 2007/0272122).

Non-Final Office Action for U.S. Appl. No. 11/691,210 (U.S. Pub. No. 2007/0272122) dated May 5, 2010.

Response filed on Aug. 4, 2010 to Non-Final Office Action dated May 5, 2010 for U.S. Appl. No. 11/691,210 (U.S. Pub. No. 2007/0272122).

Non-Final Office Action for U.S. Appl. No. 11/756,890 (U.S. Pub. No. 2007/0281126) dated Mar. 29, 2010.

Response filed on Jun. 29, 2010 to Non-Final Office Action dated Mar. 29, 2010 for U.S. Appl. No. 11/756,890 (U.S. Pub. No. 2007/0281126).

* cited by examiner

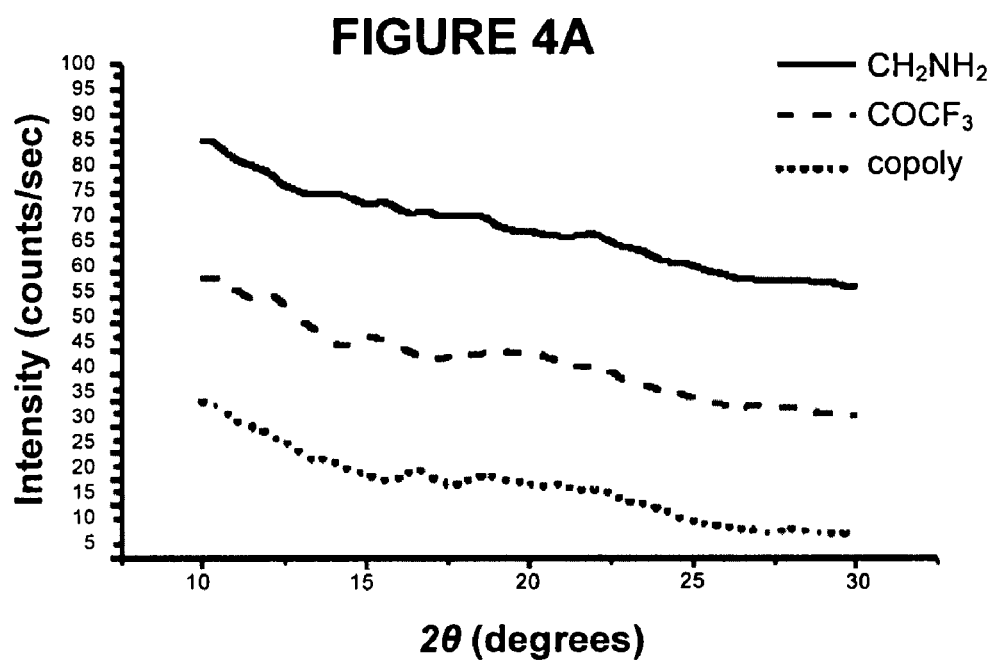
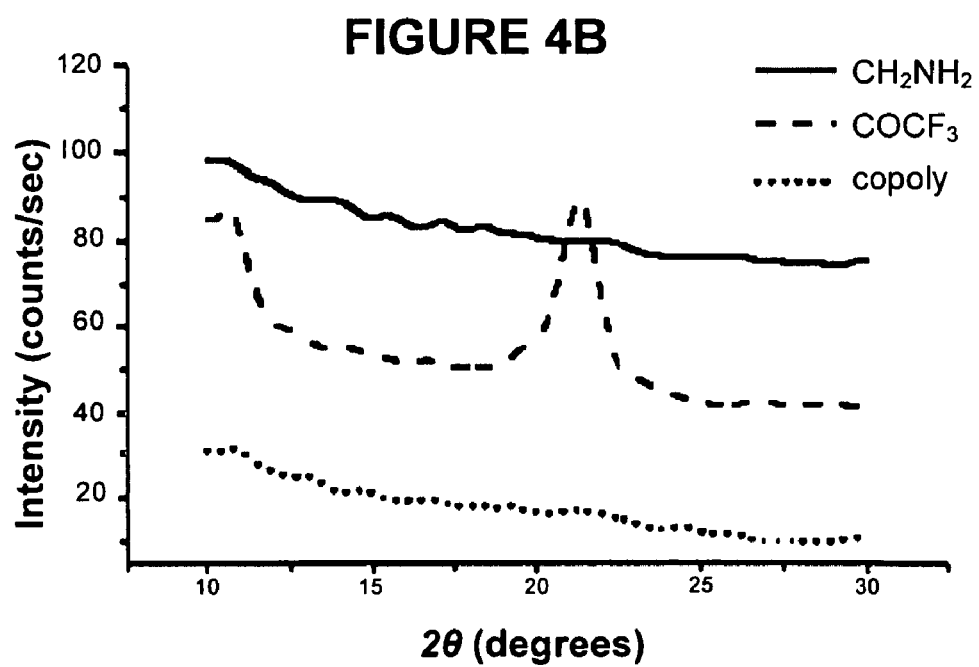

| R= | $T_{sub}$ (°C) | $T_1$ (°C) | $T_2$ (°C) | $T_{pyr}$ (°C) |
|---|---|---|---|---|
| $C_6H_5$ | 110 | 685 | 800 | 810 |
| $C_2H_5$ | 80 | 555 | 660 | 670 |
| $C_2F_5$ | 75 | 540 | 660 | 670 |
| $CF_3$ | 80 | 555 | 660 | 670 |

FIGURE 11C

Copolymer with linearly changing composition gradients

MULTIFUNCTIONAL CVD COATINGS

CROSS-REFERENCE TO RELATED APPLICATIONS

This application claims the benefit of U.S. Provisional Application No. 60/919,545, filed on Mar. 22, 2007. The disclosure of the above application is incorporated herein by reference in its entirety.

GOVERNMENT RIGHTS

This invention was made with government support under Contract Nos. DMR-0449462 and DMR-0420785 awarded by the National Science Foundation. The government has rights in the invention.

FIELD

The present disclosure relates to chemical vapor deposition (CVD), and more particularly to reactive polymers deposited by CVD that have multi-functionality.

INTRODUCTION

The statements in this section merely provide background information related to the present disclosure and may not constitute prior art.

The ability to generate patterns of molecules, biological ligands, proteins or cells on surfaces is important for various technologies. For example, in biomedical engineering, such pattern control may be used in the development of certain types of biosensors or for cell biology applications that require spatially controlled attachment of ligands. Other similar examples include surface patterning for biological assays and for combinatorial screening of drugs. In tissue engineering, the formation of tissue or organized cell structures often requires a specific architecture that allows cells to occupy defined locations on an implant or device, while preventing non-specific adhesion in certain regions. Furthermore, control over spatial arrangement can be useful for monomolecularly dimensioned interlayers for self-assembled monolayers (SAMs).

Controlled and stable immobilization of one or more types of molecules to a surface is a critical challenge in various applications, including the regulation of cell shapes, the development of advanced biological assays, scaffolds for regenerative medicine and tissue engineering, medical implant and device coatings, the development of microelectronic elements such as optical displays, circuits, or lasers, the fabrication of complex three-dimensional microstructures or microfluidic devices, or the fabrication of increasingly complex micro-total analytical systems ($\mu$TAS) that automate laboratory analysis steps on a microscale. Many of these applications require materials with sufficient mechanical integrity that also provide adequate contact properties within biological environments.

Biomaterials used in such applications may sometimes induce unfavorable responses, depending on the application, such as chronic inflammation or blood coagulation. One way of addressing these shortcomings is through controlled surface modification, because interactions between the surface of a biomaterial with proteins and cells are among the key factors that govern these biological activities. Various methods are used to design materials that exhibit defined surface chemistries, including plasma polymerization, self-assembly of monolayers, and spray coating. However, these methods can become problematic when actual devices with materials that diverge from well-defined model systems and non-planar geometry are employed. In addition, despite being widely used, solution-based surface modification methods bear the risk of introducing coating non-uniformities and impurities.

Thus, while a range of methods are used for immobilization of a biomaterial or other functionalized material to various artificial substrates; there is a need for improving methods of immobilization of multiple distinct molecules in a controlled fashion on a substrate. Moreover, there is a need for polymer coated surfaces that have gradients in one or more directions with one or more functional groups and/or biomaterials attached via these functional groups. For example, design of biomaterial coatings, such as antithrombotic coatings for cardiovascular stents, requires widely applicable and robust methods of surface modification.

SUMMARY

In various aspects, the present disclosure includes compositions and methods related to multifunctional polymer coatings formed by chemical vapor deposition (CVD) co-polymerization.

In certain embodiments, the present disclosure relates to a polymeric film including a compositional gradient. The polymeric film may comprise a copolymer comprising a first substituted p-xylylene unit, wherein distribution of the first substituted p-xylylene unit in the copolymer forms a first compositional gradient in at least one first direction on the film. The polymeric film may include a second substituted p-xylylene unit having a distribution in the copolymer that can form a second compositional gradient in at least one second direction on the film. Such compositional gradients may correspond to the same or distinct directions, for example, where the gradients converge or diverge in a particular direction with respect to the amount of substituted p-xylylene unit(s).

In certain aspects, a substituted p-xylylene unit may include a functional group selected from —CHO, —COCH$_3$, —COC$_2$H$_5$, —COC$_n$H$_{2n+1}$, where n ranges from 3 to 8, —COCF$_3$, —COC$_2$F$_5$, —COC$_n$F$_{2n'+1}$, where n' ranges from 3 to 8, —COC$_6$H$_5$, —NH$_2$, —CH$_2$NH$_2$, —C≡CH, —CH$_2$OH, —CH$_2$OCH$_3$, —CH$_2$OCOCH$_3$, —COOCH$_3$, —CH$_2$OCOCOOC$_6$F$_6$, —CH$_2$OCOCF$_3$, —Cl, —Br, and —F. In certain aspects, a polymeric film formed in accordance with the present teachings may include one substituted p-xylylene unit comprising an amine group and a second substituted p-xylylene comprising a carbonyl group. In various aspects, the substituted p-xylylene units are substantially unreactive with each other. In certain aspects, films are not limited to two substituted p-xylylene units, but rather optionally comprise a plurality of distinct substituted xylenes that polymerize with one another to form the polymeric film.

In other aspects, the present disclosure relates to methods for making a polymeric film having one or more compositional gradients in one or more directions. In certain aspects, a method of making a polymeric film having a compositional gradient in at least one direction may comprise sublimating a first paracyclophane monomer into a first stream and sublimating a second paracyclophane monomer into a second stream. At least one of the first and second paracyclophane monomers is a substituted paracyclophane and the first paracyclophane is distinct from the second paracyclophane. At least a portion of the first and second streams is pyrolyzed to generate first and second reactive monomers. The first and second reactive monomers are introduced into a deposition chamber comprising a substrate, where the first reactive monomer enters the chamber at a first position with respect to the substrate and the second reactive monomer enters the chamber at a second position with respect to the substrate. The first reactive monomer and the second reactive monomer polymerize on the substrate to form the polymeric film having the compositional gradient in at least one direction.

In certain embodiments, the first and second positions where the reactive monomers enter the deposition chamber are substantially opposite of each other. In certain aspects, sublimating the first and second paracyclophane monomers may occur at different temperatures. In various aspects, the respective amounts of the first or second reactive monomers introduced to the chamber is controlled relative to the other one of the first and second reactive monomers to provide a select and predetermined ratio of the first and second reactive monomers in the polymeric film. In this regard, in certain aspects, the portions of the first and second streams may be independently pyrolyzed to generate the amount of first and second reactive monomers in the stream.

In certain embodiments, the present disclosure relates to a method of controlling the ratio of one or more monomers incorporated into a polymeric film. A method of controlling the ratio of monomers in a polymeric film comprises sublimating a first paracyclophane monomer at a first temperature in a first stream and sublimating a second paracyclophane monomer at a second temperature in a second stream. At least one of the first and second paracyclophane monomers is a substituted paracyclophane and the first paracyclophane is distinct from the second paracyclophane. In certain aspects, the first and second temperatures are also distinct from one another. At least a portion of the first and second streams is pyrolyzed to generate first and second reactive monomers. A first amount of the first reactive monomer and a second amount of the second reactive monomer are introduced to a deposition chamber comprising a substrate, wherein the first reactive monomer and the second reactive monomer polymerize on the substrate to form the polymeric film having a select and controlled stoichiometry. The amounts of the first and second reactive monomers may be controlled by changing the flow rate of at least one of the first or second reactive monomers to provide the first or second amount. Or, the concentration of at least one of the first or second reactive monomers may be changed to provide the first or second amount.

In certain aspects, polymer coatings of various paracyclophane derivatives may be co-deposited in controlled ratios and/or used to form compositional gradients in polymeric films. Based on chemical vapor deposition polymerization, thin polymer films with controlled and optionally continuously changing chemical compositions may be deposited on a range of different substrate materials. The resulting polymers with continuous surface gradients may be used in biomaterials, cellular engineering, or biomimetic applications, by way of non-limiting example.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A depicts a schematic of a reaction mechanism to create a multifunctional polymer by CVD co-polymerization of [2.2]paracyclophane including a list of suitable functional groups for groups $R_1$, $R_2$, $R_3$ and $R_4$; FIG. 1B depicts a reaction mechanism to form a copolymer to create a multifunctional polymer by CVD copolymerization of [2.2]paracyclophane including suitable functional groups X and Y; and FIG. 1C depicts a schematic of a mechanism to create a multifunctional polymer (3) accessible by CVD co-polymerization of [2.2]paracyclophanes (1) and (2) by the principles of various aspects of the disclosure, with structures of the individual polymers (4) and (5) are shown for comparison;

FIG. 2A shows a high-resolution $C_{1s}$ XPS results for poly [(4-aminomethyl-p-xylylene)-co-(4-trifluoroacetyl-p-xylylene)-co-p-xylylene]polymer (3) prepared with a 1:1 feed ratio compared to the individual polymers (4) and (5) including a table of data that generated the graph; and FIG. 2B shows XPS imaging maps for poly[(4-aminomethyl-p-xylylene)-co-(4-trifluoroacetyl-p-xylylene)-co-p-xylylene] polymer (3) prepared with a 1:1 feed ratio;

FIG. 3 shows an FTIR spectra of polymer (3) with varying molar ratios of $CH_2NH_2$:$COCF_3$ where (a) is pure $CH_2NH_2$, (b) is a 5:1 ratio, (c) is a 2:1 ratio, (d) is a 1:1 ratio, (e) is a 1:2 ratio, (f) is a 1:5 ratio, and (g) is pure $COCF_3$;

FIG. 4 shows X-ray diffraction (XRD) patterns of the individual polymers (4) and (5) and the co-polymer (3) before (A) and after annealing Figure (B) at 120° C. Polymer (4) exhibits crystallinity after annealing. Figure (C) shows X-ray diffraction of co-polymers with varying ratios and Figure (D) X-ray diffraction of (4) at various annealing temperatures;

FIG. 5 shows a schematic diagram outlining the selective reactivity of a multivalent surface prepared in accordance with the principles disclosed in the present specification; the activated ester appears to react with the aminomethyl group, while the hydrazide group shows selective reactivity towards ketones;

FIG. 6 shows fluorescence intensities detected on the co-polymers versus $x_{(2)}$, the relative feed concentration of [2.2] paracyclophane polymer (2) used for CVD co-polymerization, showing ligand immobilization occurs in controlled ratios as a function of increasing relative ratio of the [2.2] paracyclophanes. Inlet: Fluorescence micrograph of areas that were reacted with biotin ligand (1), Atto 655 NHS ester ligand (2), or both (3);

Figure 24:
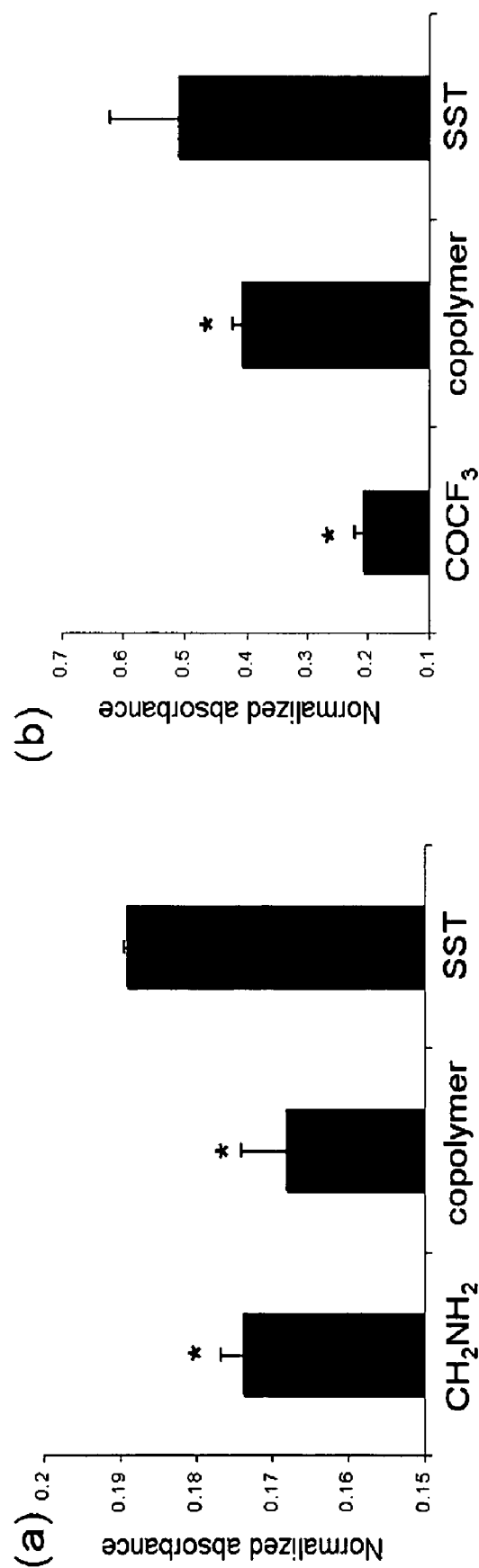
Figure 25:
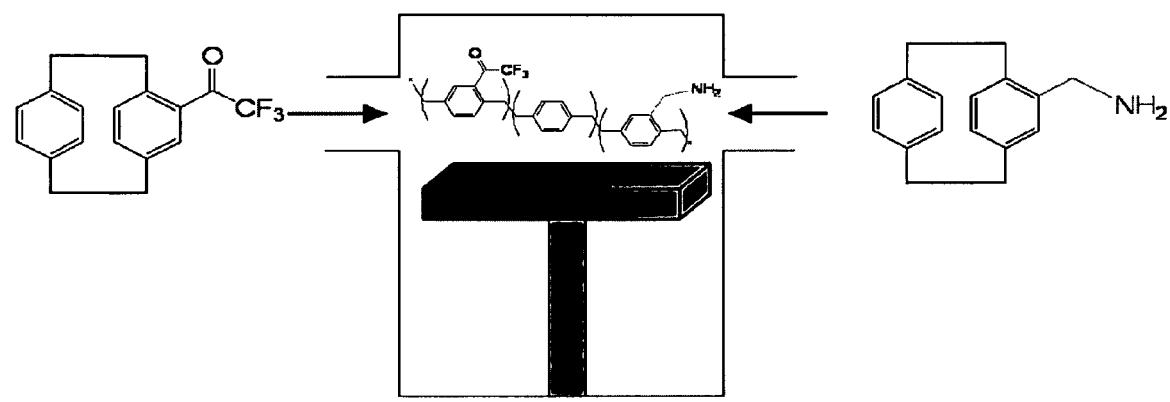
Figure 25:
Figure 26:
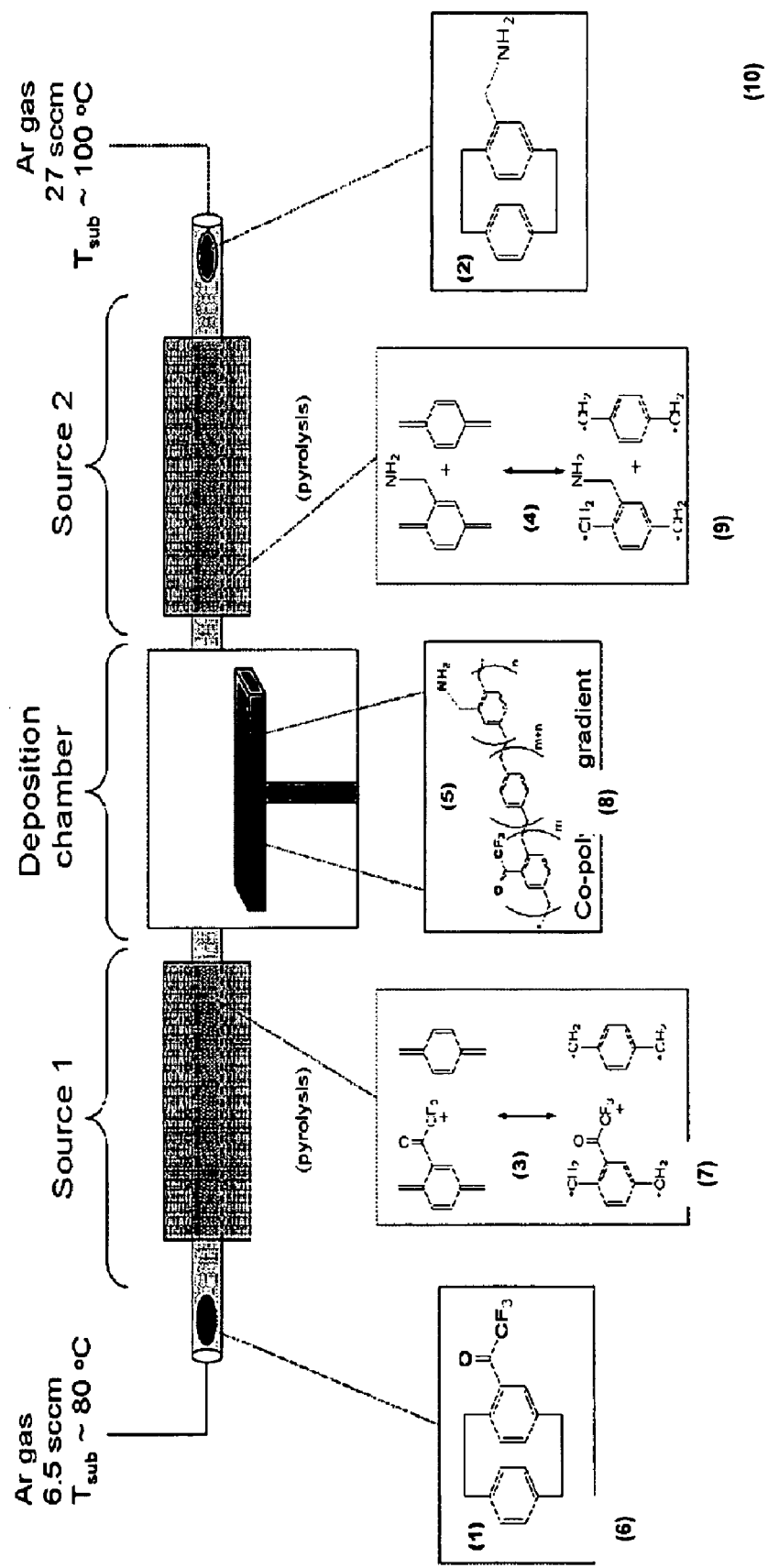
Figure 27:
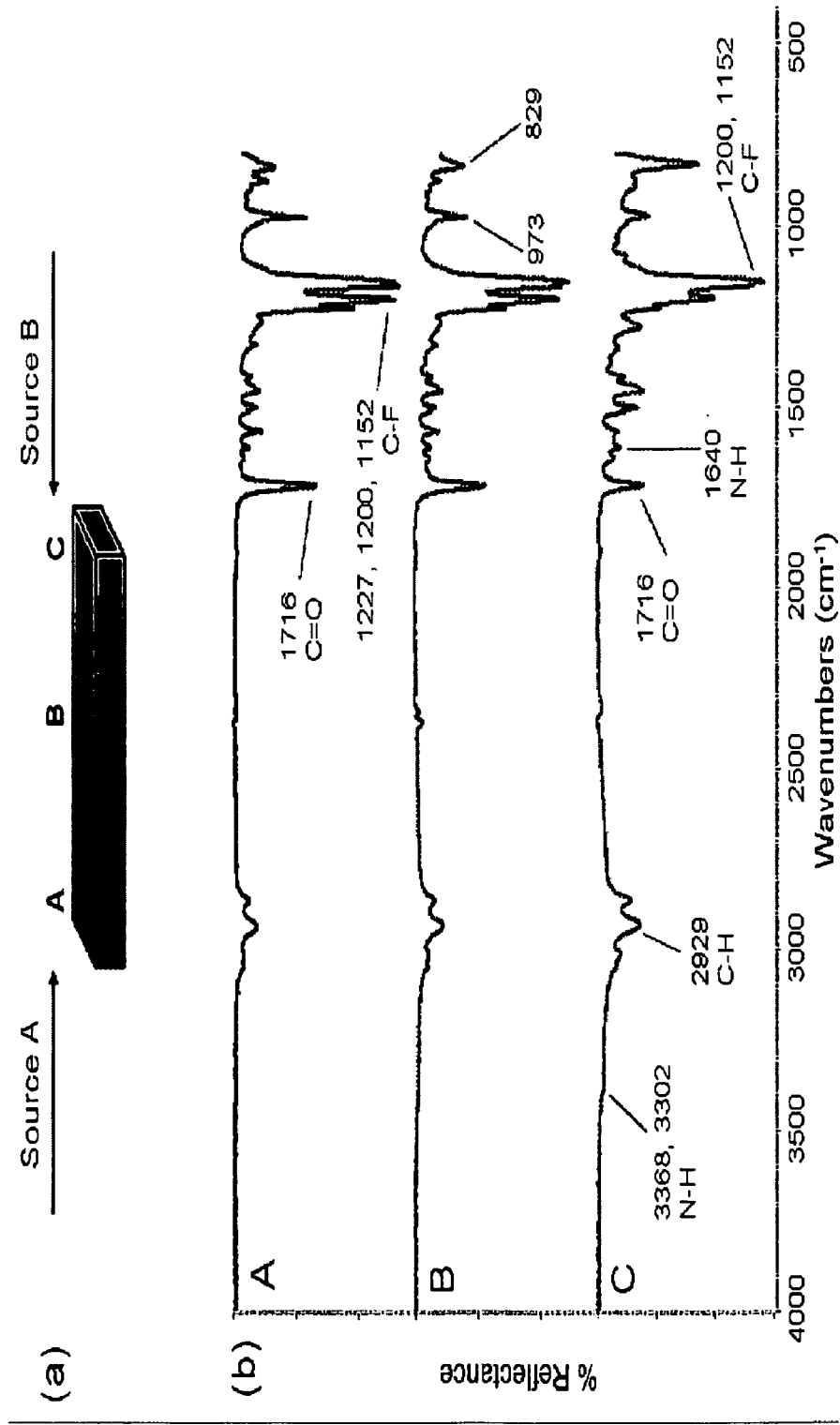
Figure 28:
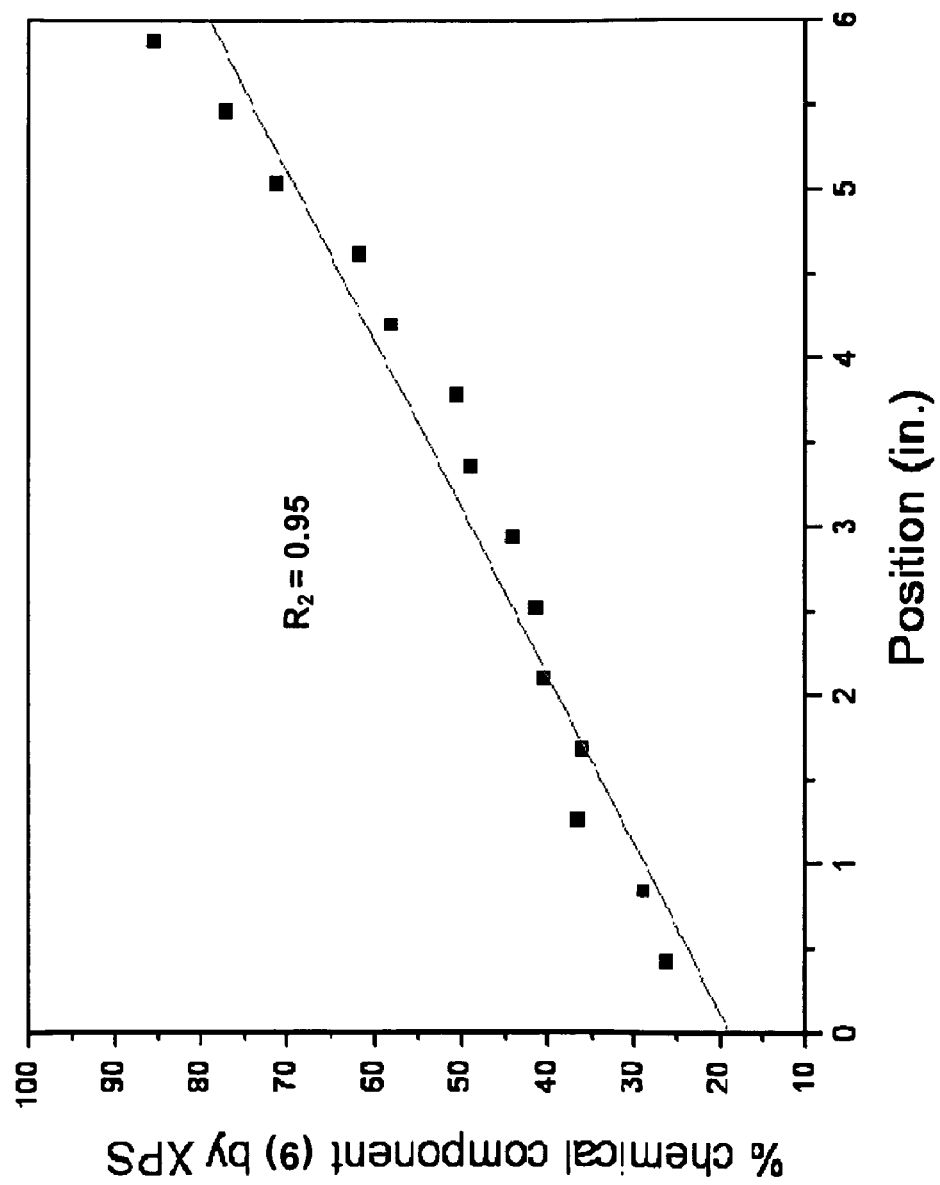
Figure 29:
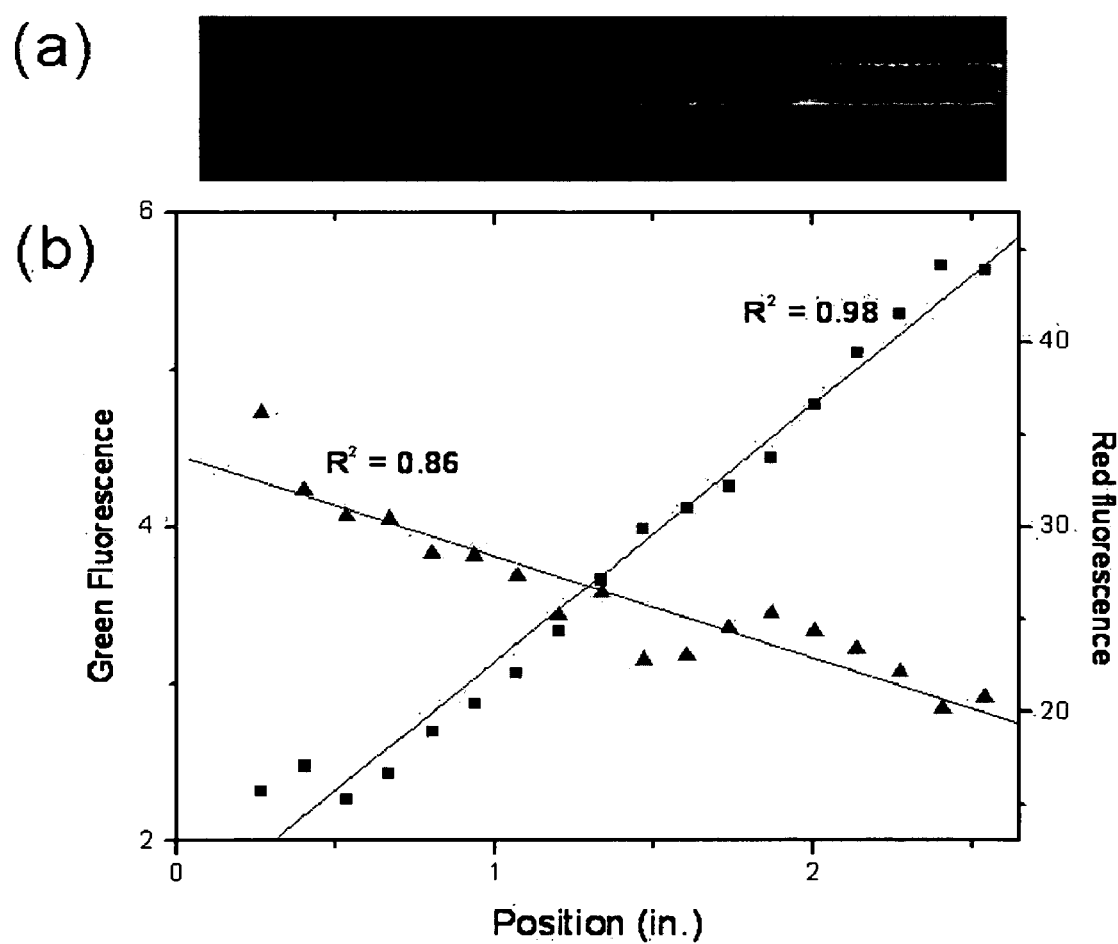
Figure 30:
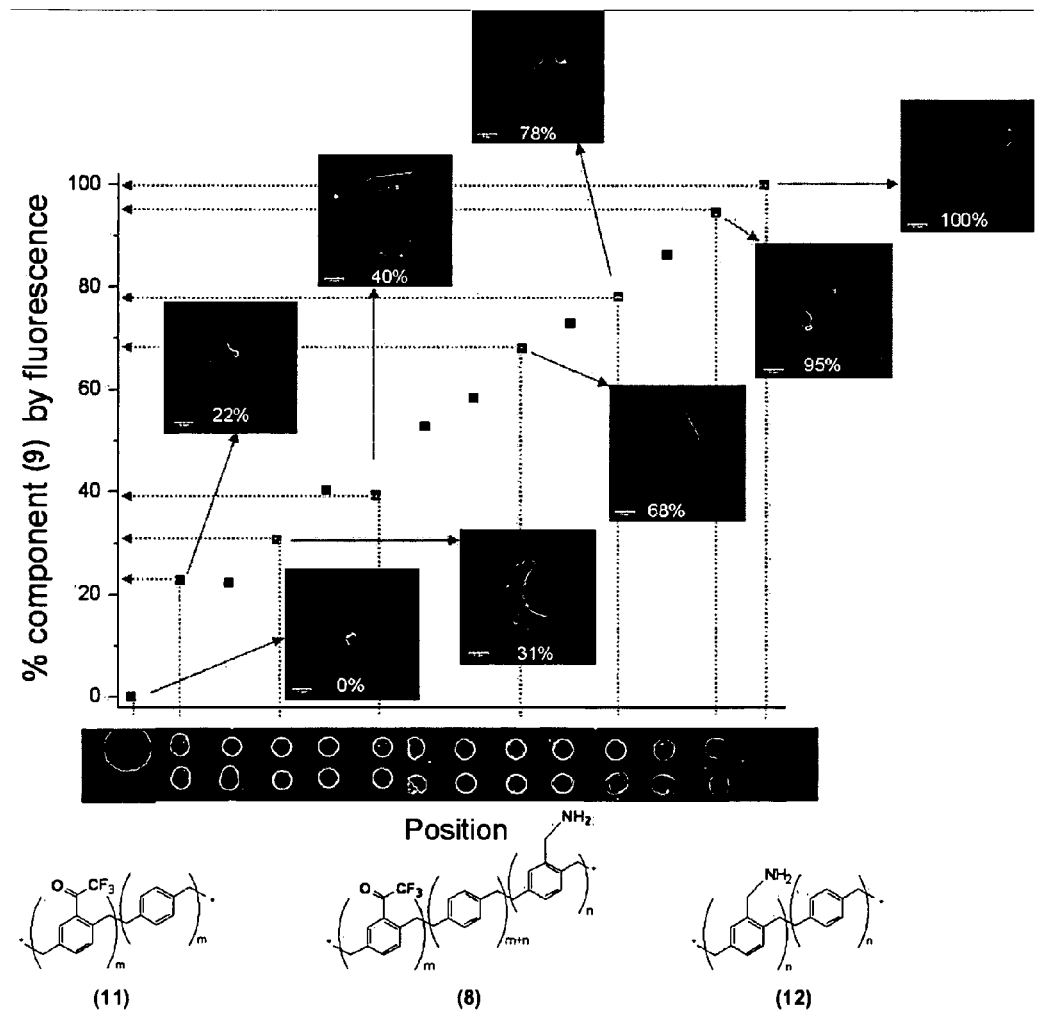

FIG. 24 illustrates (a) Hirudin binding as measured by chromogenic assay, normalized absorbance at 405 nm are reported, with n=3, *: p<0.05 compared to stainless steel; (b) heparin binding as measured by Toluidine Blue absorbance, normalized absorbance at 631 nm are reported, with n=3, *: p<0.05 compared to stainless steel FIG. 25 illustrates chemical vapor deposition polymerization of a copolymer with a linearly changing compositional gradient;

FIG. 26 illustrates a side-view schematic of an embodiment of a two-source CVD system constructed according to the present disclosure;

FIG. 27 panel (a) illustrates a side view of a CVD sample holder, where distance from AB=BC=3" and AC=6"; panel (b) illustrates FTIR spectra of CVD copolymers produced from the conditions illustrated in FIG. 26, where the bulk ratio of CVD copolymer changes with respect to position along the sample holder;

FIG. 28 graphically depicts copolymer composition along a surface gradient, based upon XPS survey spectra; copolymer ratios are calculated based upon the percentage of fluorine and nitrogen, both characteristic of (6) and (10) shown in FIG. 26, respectively; the concentration of aminomethyl functionality (12) shown in FIG. 30 increases with respect to position along the substrate;

FIG. 29 panel (a) illustrates a fluorescence image and panel (b) graphically depicts intensity profiles of immobilized fluorescent dyes across a CVD polymer gradient; both Atto 655 NHS ester (red) and biotin hydrazide with rhodamine-tagged streptavidin (green) react over the same regions, showing that the compositional gradient is reactive; and both ligands can be immobilized continuously across the surface; and FIG. 30 illustrates surface composition of CVD copolymer gradients, as calculated by fluorescence ratios of dually immobilized ligands; HUVECs are grown on the copolymer gradient and fluorescently stained, as shown by confocal micrograph insets; as the aminomethyl functionality increases in concentration, the HUVEC contact area increases, going from a small, collapsed structure to one that is larger and spread out illustrating that different surface concentrations are able to induce various morphologies.

DETAILED DESCRIPTION

The following description is merely exemplary in nature and is not intended to limit the present disclosure, application, or uses. It should be understood that throughout the drawings, corresponding reference numerals indicate like or corresponding parts and features.

Solventless surface modification methods, such as chemical vapor deposition (CVD) polymerization, may be used to create biomedical coatings. CVD polymerization offers several unique advantages as compared to solvent-based coating processes. First, CVD coatings are conformal, allowing for easy and uniform modification of non-planar substrate geometries. Second, although the initiation step, which takes place away from the substrate, requires high temperatures, the substrates can be maintained at a controlled temperature—typically room temperature, or below. Third, impurities associated with the use of solvents, initiators, or plasticizers can be precluded or minimized.

CVD may be used to prepare polymers comprising polypeptide chains grafted onto a surface of interest. In other cases, even if the monomer of interest does not contain an initiator, one can introduce polymerization initiators together with the monomer through basic process modification. Hot filaments within the CVD deposition chamber can provide the needed activation energy for initiation; polymerization yields conformal coatings, which can be ultra-thin. Patterning the surface with the initiator can result in a surface patterned with linear polymer, a method useful for fabricating microscale devices.

Thus, one aspect to coating such devices is spatially controlling self-assembly of monolayers on a substrate. Thin films can be formed via CVD by polymerization of reactive precursors. Such CVD methods can be used to coat various substrates with polymer systems. CVD coating procedures may include a one-step coating process that provides good bulk properties of a material and enhanced contact properties. However, such polymer systems have only afforded control over deposition of limited functional species, hence only providing control over the immobilization of limited molecules. For example, in certain applications there is a need for defined surface architectures that simultaneously present multiple functionalities, such as various biological entities, in controlled ratios.

In nature, biological information is typically encoded and displayed in the form of continuous gradients that may control important cellular events, such as cell signaling, cell differentiation or development, or chemotaxis. Mimicking surfaces with natural, spatially continuous gradients is therefore important to a range of biological applications, including studies of neuronal growth and differentiation, the design of cell migration, inflammation assays, microfluidics, and discovery-driven biomaterials research. In spite of the importance of surface gradients for biological applications, their realization, especially with biomedically relevant polymers, has been challenging.

Methods of making gradients are often relatively undifferentiated and are associated with a number of limitations, including: (i) the translation of chemical gradients into biological gradients requires immobilization of biomolecules, which is often not possible with existing materials; (ii) due to technical constraints on the resolution, resulting gradients may be intrinsically discontinuous with steep transitional zones; (iii) gradients may be restricted to a particular surface chemistry, such as thiols to gold or siloxanes to glass or silicon, and the range of materials to which a given protocol can be applied is often limited.

Fabrication of gradients in inorganic materials can benefit from anisotropic chemical vapor deposition. Such improvements can be used to produce efficient, high-throughput screening methods that may be used to screen for catalytic activity, conductivity, or luminescence, for example.

In some embodiments, the disclosure relates to surface modification techniques based on chemical vapor deposition (CVD) polymerization of substituted [2.2]paracyclophanes. The CVD deposition of such polymer systems to form a reactive coating is disclosed in U.S. Pat. No. 6,977,138 to Lahann et al., the relevant portions of which are expressly incorporated herein by reference. Such novel coating technology results in a diverse class of polymers comprising functionalized p-xylylenes. Such xylylenes optionally comprise a wide variety of functional groups, such as amines, esters, aldehydes, and alcohols. The polymers generated by CVD polymerization provide a flexible solution to surface engineering challenges, as they decouple surface design from bulk properties. In essence, the CVD technology is a one-step coating procedure to generate functionalized surfaces without the need of further post-treatments once the films are deposited.

In some embodiments, the disclosure provides the use of CVD polymerization to fabricate multi-functional, multi-potent and/or modular coatings. By multi-functional, it is meant that the polymer comprises at least two distinct functional groups. Preferably, such functional groups are respectively reactive with distinct binding molecules. The term "multi-potent coating" refers to a reactive coating that is compatible with the simultaneous presentation of multiple biomolecules in controllable ratios.

In some embodiments, the present teachings provide a polymer composition deposited on a substrate, the polymer composition comprises a copolymer deposited by chemical vapor deposition comprising a first moiety and a second moiety. The first moiety comprises a substituted xylylene comprising a first functional group and the second moiety comprises a substituted xylylene comprising a second functional group. Preferably, the first and second functional groups are distinct from one another. As appreciated by those of skill in the art, the polymer may comprise a plurality of distinct moieties, e.g., monomers, and each monomer may comprise more than one functional group. The present disclosure provides control of the ratio and stoichiometry of the first moiety and the second moiety in the polymer film.

In some embodiments, the disclosure provides compositions and methods for making polymer gradients with continuously changing surface compositions. Given the wide-range applicability of CVD polymerization to a diverse set of different substrates, polymer gradients based on CVD polymer technology have the potential to expedite biomaterials discovery.

Figure 1A:
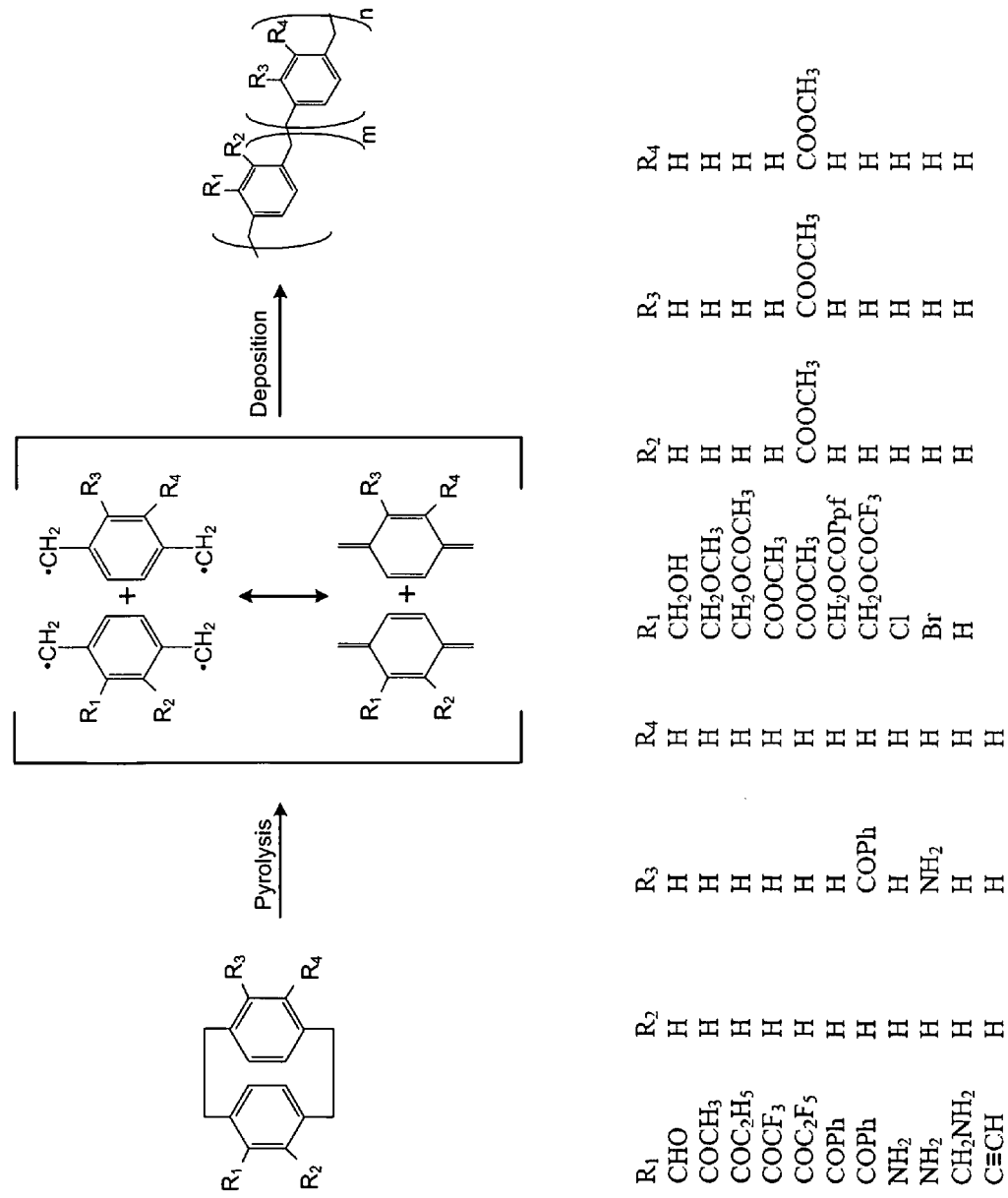

The present disclosure relates to the predictable design of a surface with different domains of functionality, as it can provide microstructured surfaces. Suitable functional groups include: $CHO$, $COCH_3$, $COC_2H_5$, $COC_nH_{2n+1}$, where n ranges from 3 to 8, $COCF_3$, $COC_2F_5$, $COC_nF_{2n'+1}$ where n' ranges from about 3 to 8, $COC_6H_5$, $NH_2$, $CH_2NH_2$, $C\equiv CH$, $CH_2OH$, $CH_2OCH_3$, $CH_2OCOCH_3$, $COOCH_3$, $CH_2OCOCOOC_6F_6$, $CH_2OCOCF_3$, Cl, Br, F and H, and mixtures thereof. One mechanism by which the CVD polymerization can occur in accordance with the principles of the present disclosure is shown in FIG. 1A, which also includes a non-limiting list of suitable functional groups ($R_1$-$R_4$). These embodiments may include reactive polymers deposited by CVD that have multi-functionality as described and characterized in Example 1.

In certain embodiments, the polymer composition is formed from specific polymer systems. With reference to the structures illustrated in FIG. 1C, 4-trifluoroacetyl[2.2]paracyclophane (1) and 4-aminomethyl[2.2]paracyclophane (2) are synthesized from [2.2]paracyclophane. CVD co-polymerization of (1) and (2) results in a vacuum-deposited film of co-polymer (3) on the substrate.

For CVD co-polymerization, mixtures of carefully purified dimers (1) and (2) are initially sublimated under a reduced pressure of about 0.56 mbar at temperatures at optionally about 80° C. to 110° C., preferably about 90° C. to about 100° C. The sublimation temperatures of (1) and (2) are sufficiently similar to ensure that the compounds are exposed to comparable sublimation conditions by placing them in proximity to each other within the CVD system. Sublimated (1) and (2) are then transferred to the pyrolysis zone, which is heated to greater than about 650° C., preferably greater than about 670° C. to ensure cleavage of the C—C bonds, resulting in the corresponding quinodimethanes (monomers). While the term "pyrolysis" is used herein, it should be noted that the process may use any form of feasible energy application to suitably decompose and activate the paracyclophane molecules to generate the reactive monomers, as recognized by those of skill in the art. By way of example, applying energy to generate the reactive polymers for pyrolysis may include for example, applying radiant energy, laser energy, microwave energy, plasma, non-thermal plasma (NTP or so-called "cold plasma"). As referred to herein, applying "heat" in intended to generally cover application of various types of energy to the system to generate reactive monomers from the paracyclophane monomer precursors.

In the next step, monomers are adsorbed on the substrate at temperatures of about 0° C. to about 25° C., preferably about 10° C. and are spontaneously polymerized. CVD co-polymerization of (1) and (2) results in transparent and topologically uniform polymer films (FIG. 2A) with thicknesses between about 50 and 200 nm. The film thickness may be related to the total amount of [2.2]paracyclophanes used for polymerization. For instance, the thickness of a film produced by the deposition of 20 mg of equimolar amounts of (1) and (2) was determined by means of imaging ellipsometry to be (115±15) nm.

The multi-functional coatings created by such processing showed excellent chemical stability in a dry air environment. No significant change in composition or chemical behavior is found for samples stored in a dry air atmosphere for several weeks, as compared to freshly prepared samples. All co-polymers, as well as the two individual polymers (4) and (5), remain intact after rinsing with standard solvents, such as water, chloroform, acetone, and ethanol.

Figure 2A:
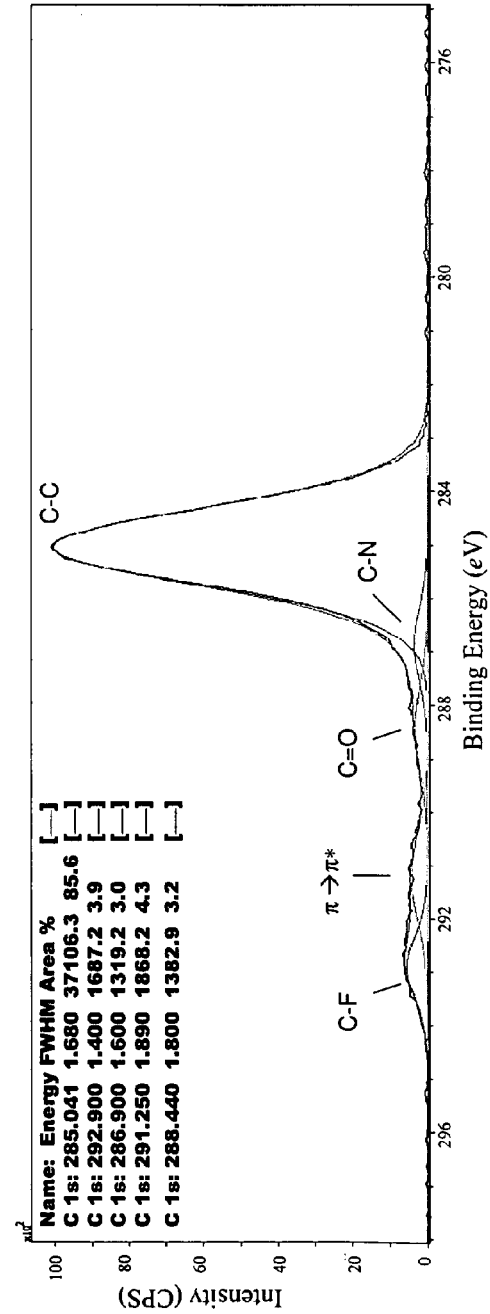
Figure 2B:
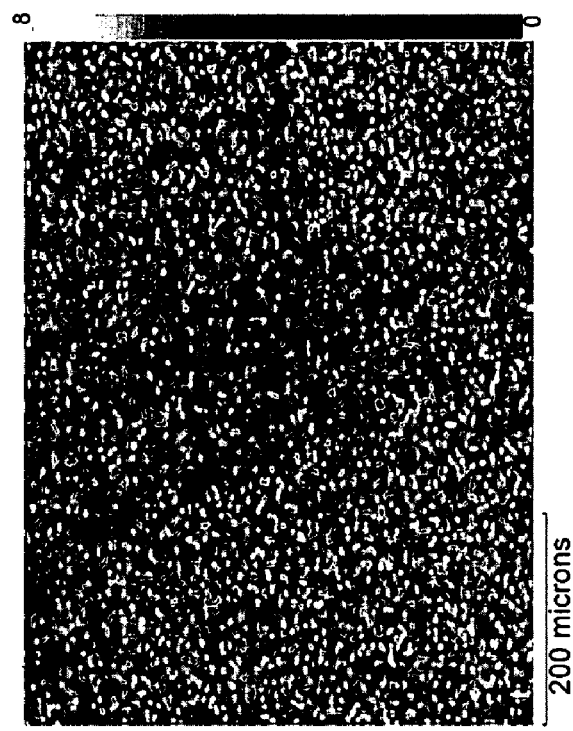
Figure 2B:
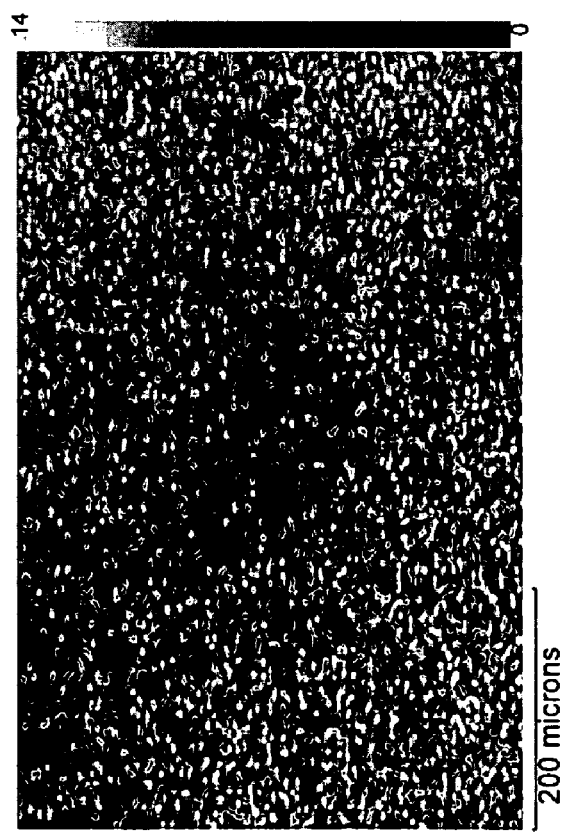

The elemental composition of the co-polymer poly[4-aminomethyl-p-xylylene-co-4-trifluoroacetyl-p-xylylene-co-p-xylylene] (3) can be determined using X-ray photoelectron spectroscopy (XPS). Examples of results are shown in FIGS. 2A and 2B. XPS is capable of detecting atomic composition within a depth of about 10 nm. The co-polymer (3) is compared to the individual polymers, poly[4-trifluoroacetyl-p-xylylene-co-p-xylylene] (4) and poly[4-aminomethyl-p-xylylene-co-p-xylylene] (5).

As shown in FIG. 2A, characteristic chemical elements detected for the individual polymers (4) and (5), such as oxygen (polymer (4)), fluorine (polymer (4)), and nitrogen (polymer (5)) are simultaneously detected in the co-polymer, indicating the presence of both functional groups on the surface. Because nitrogen is only present in the aminomethyl group of polymer (5), while fluorine is a characteristic element for the ketone of polymer (4), the ratio of the elemental composition of nitrogen and fluorine is a good indicator for the chemical quality of the co-polymer films. Using XPS, a N/F ratio of about 0.332 may be observed, which is in good accordance with the theoretically expected ratio of 0.333. Accordingly, side reactions, such as decomposition of the functional groups, are negligible when pyrolysis is conducted at temperatures under 670° C. and working pressures are selected to be between about 0.4 and 0.6 mbar. Furthermore, XPS reveals no signs of cross-reaction of the aminomethyl and keto groups under the conditions of CVD polymerization. The table of data in FIG. 2A shows the experimental results of the 1:1 co-polymer high-resolution $C_{1s}$ XPS to be in good agreement with theoretical values.

Figure 3:
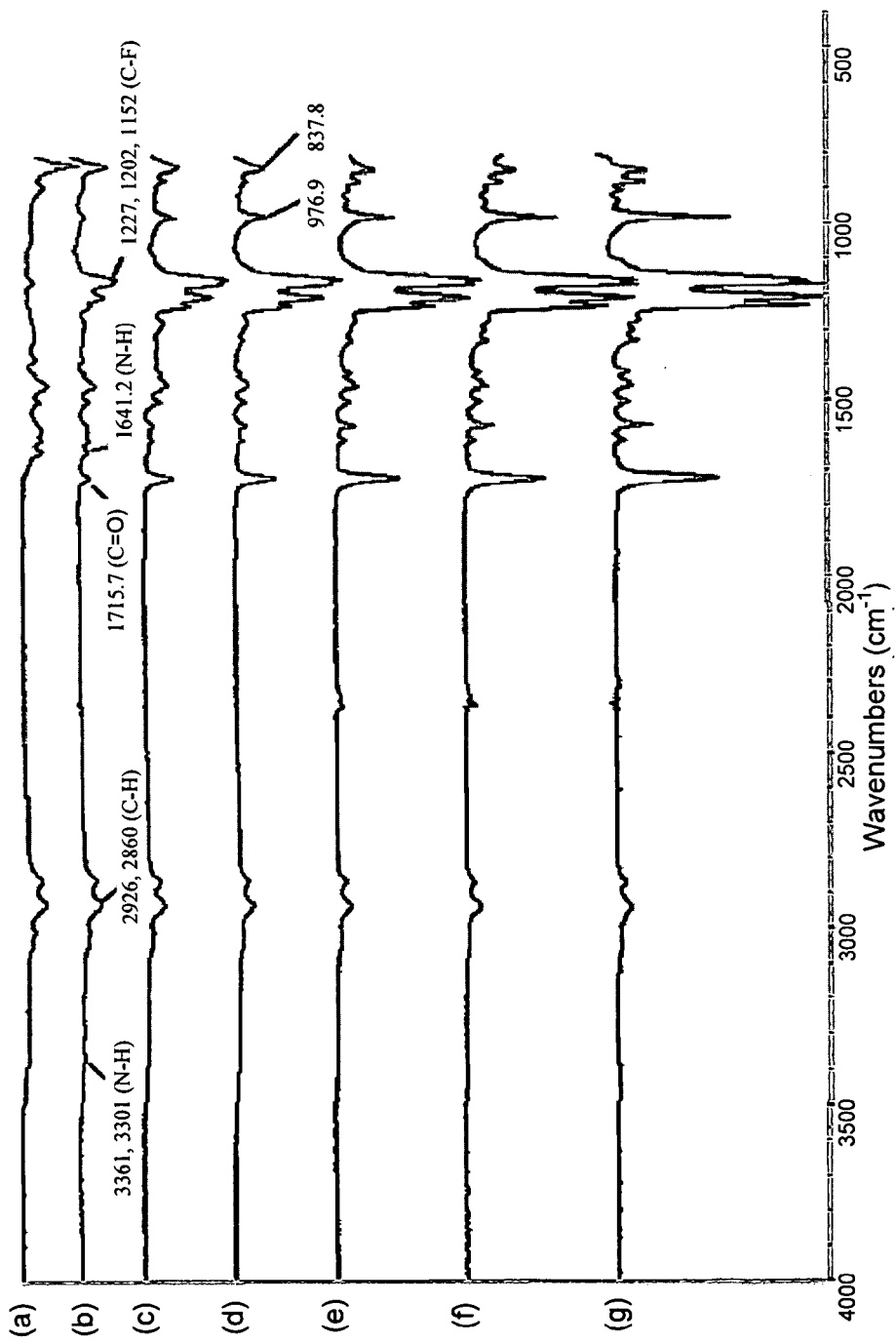

To further support the XPS data, grazing angle Fourier transform infrared spectroscopy (FTIR) spectroscopy may be used to assess the structure of co-polymers deposited onto a gold substrate. FIG. 3 displays IR spectra of polymer films made by co-polymerization of (1) and (2) using varying feed ratios. The spectra are ranging from 100% of compound (2) ($CH_2NH_2$ designated as (a)) to 100% of compound (1) ($COCF_3$ designated as (g)). All spectra are normalized based on the C—H band intensity (2926.1 $cm^{-1}$), because the C—H group is present in each polymer. If the feed ratio changes, the peak intensities of side groups are changed accordingly. Due to potential differences in film thickness, only qualitative analysis is performed. The carbonyl stretches at 1715 $cm^{-1}$, being characteristic for $COCF_3$ groups, are compared to the C—H band at 2926.1 $cm^{-1}$. The carbonyl stretch at 1715 $cm^{-1}$ is absent in spectrum (a). For spectra (b) to (g), the carbonyl stretch grows until maximum intensity is attained for spectrum (g). The same trend can be observed for the C—F stretches at 1227, 1202, and 1152 $cm^{-1}$. Similarly, the signal at 976 $cm^{-1}$ can increase with increasing contribution of the ketone to become a strong signal for the pure polymer (4).

Thus, in accordance with various aspects of the disclosure, CVD co-polymerization of [2.2]paracyclophanes having different functional groups is provided. To further ascertain the structural properties of the resulting co-polymers, additional analysis can be conducted to determine whether such CVD co-polymerization processes result in a true co-polymer—with properties distinct from individual polymers (4) and (5)-or result in a layered blend of the two polymers.

Figure 4C:
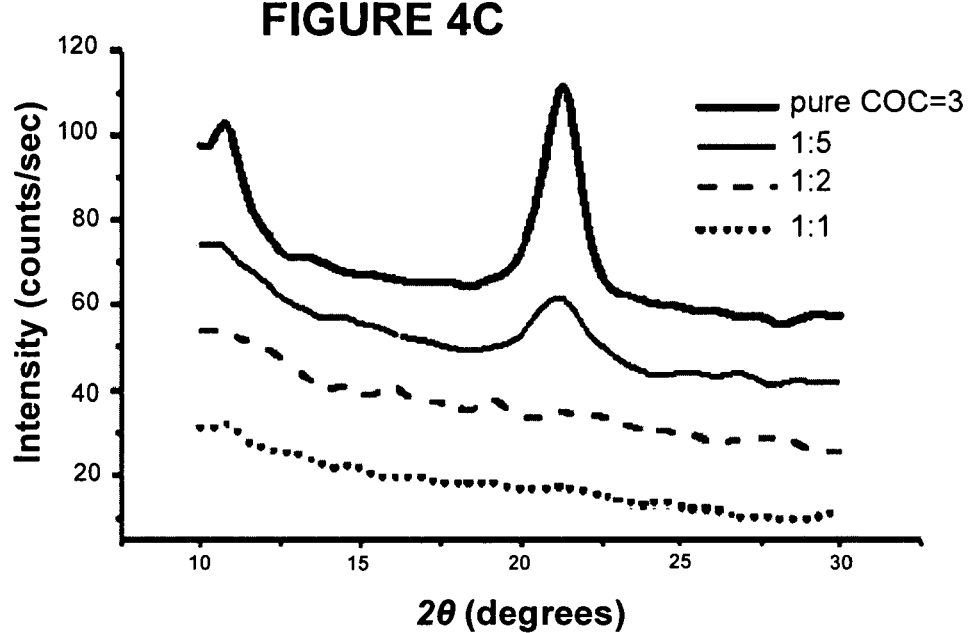
Figure 4D:
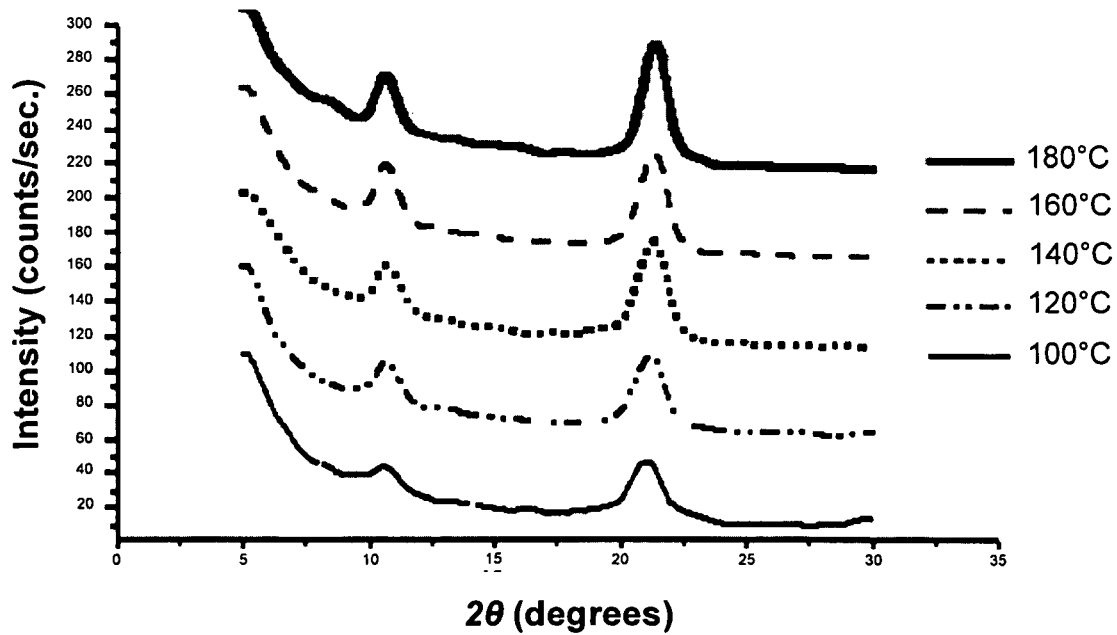

FIG. 4 shows X-ray diffraction (XRD) measurements of thin CVD films before and after annealing. Poly(p-xylylenes) are often semi-crystalline polymers with characteristic features in the XRD spectra. XRD data for individual CVD polymers (4) and (5) are first characterized. Prior to annealing, no diffraction patterns are obtained for either (4) or (5), indicating that both films are largely amorphous in the as-deposited state. After annealing for about 14 hrs at about 120° C., however, the trifluoroacetyl-functionalized polymer (4) shows characteristic diffraction patterns, which likely correspond to (020) and (110) planes, and a d-spacing greater than that known for the monoclinic poly(p-xylylene). In contrast, the aminomethyl-functionalized polymer (5) remains amorphous.

FIG. 4 also shows the diffraction patterns before and after annealing for the individual polymers (4) and (5) and the co-polymers. Exposing the polymer films to a high-temperature environment allows for realignment of functional groups to form crystalline domains. The structural properties of polymer (3) made by co-polymerization of an equimolar feed ratio of (1) and (2) are assessed. Based on the FTIR study, it is believed that this co-polymer may contain both components in about the same ratio. If the co-polymerization results in a layered blend of individual polymers (4) and (5), the resulting diffraction pattern would essentially be the superposition of the diffraction patterns of the individual polymers. If however, the CVD co-polymerization results in a true co-polymer, a new polymer with distinct, presumably amorphous structure would be observed. As shown in FIG. 4, no diffraction patterns are detected for the co-polymer, independent of the annealing. This observation also holds for the co-polymer made from [2.2]paracyclophanes (1) and (2) in a feed ratio of 1:2. If a large excess of the ketone is used (feed ratio: 1:5), a smaller diffraction pattern can be detected after annealing, indicating the onset of a semi-crystalline structure. While not limiting as to any particular theory by which the invention is bound, it is believed that the CVD co-polymerization results in true co-polymers with distinct structural properties, rather than layered blends of the individual polymers (4) and (5), as observed in the XRD data.

Additionally, the availability of both functional groups for further surface modification contained in co-polymer (3) are assessed. The availability of the functional groups for further surface reaction can be important for immobilization of two different types of molecules, for example, such as embodiments that immobilize biomolecules. The co-polymer surface (3) may be reacted with two fluorescent dyes, which exhibit orthogonal reactivity, to assess whether or not each functional group remains active and able to specifically react with the assigned ligands. An embodiment of this reaction is conducted in accordance with the process shown in FIG. 5. Fluorescence scanning is used to examine the presence of surface-bound ligands.

Figure 6:
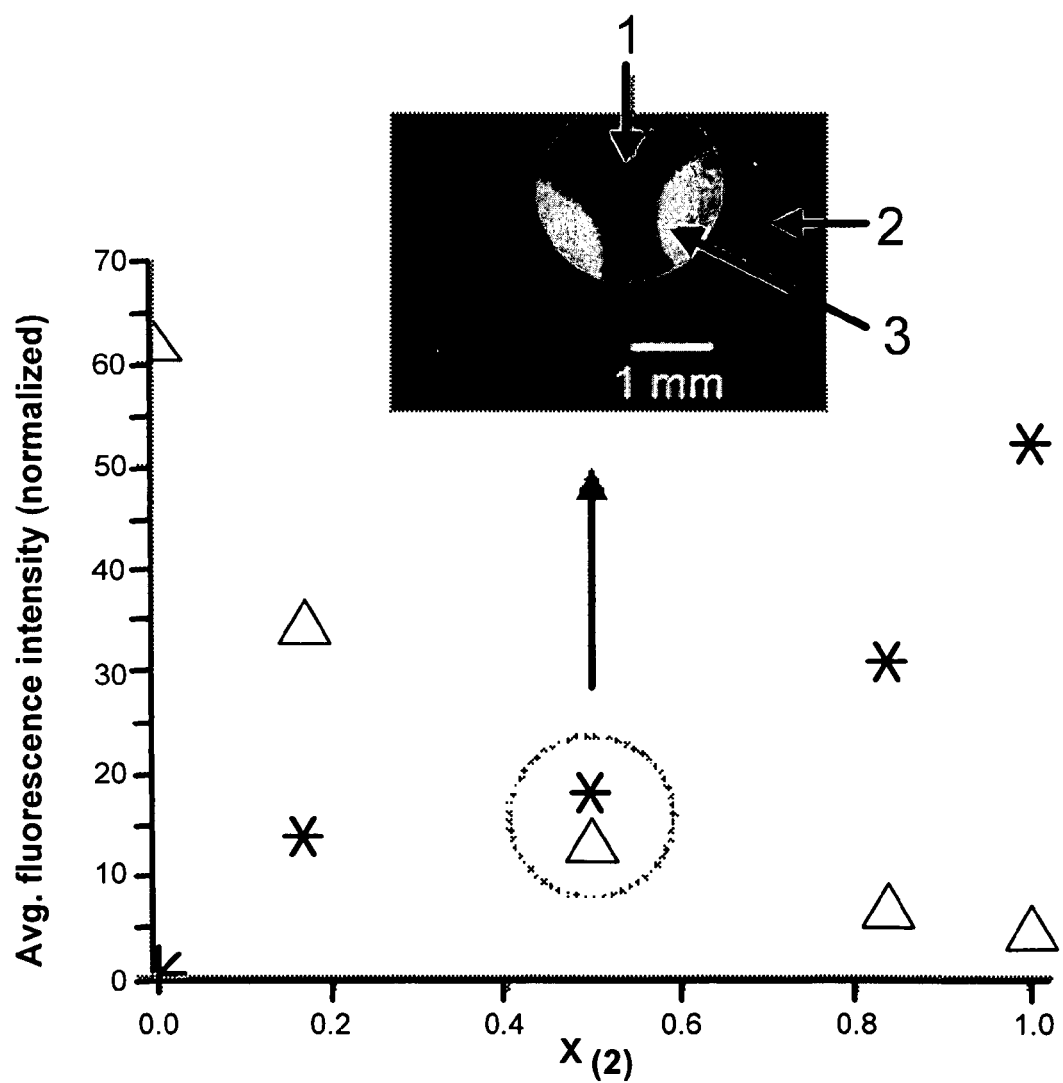

FIG. 6 shows an example of results of the surface reaction of polymer (3) with an NHS ester fluorophore (commercially available as Atto 655 from Sigma-Aldrich, St. Louis, Mo.) as well as biotin-streptavidin. To avoid reaction of the Atto 655 ligand with the amino groups of streptavidin, a consecutive immobilization scheme is employed, where the Atto 655 ligand is immobilized first followed by the biotin ligand.

Atto 655 appears to bind strongly to the aminomethyl-containing polymer (5). In contrast, only negligible amounts of Atto bind to polymer (4). When reacting the two individual polymers (4) and (5) with a second ligand, a biotin hydrazide derivative, the biotin ligand is found to bind strongly to polymer (4), but not to polymer (5). Fluorescence-labeled streptavidin, a specific binding partner of biotin, is used to visualize the biotin ligands and confirm selective binding to biotin-modified coating (4). In contrast, streptavidin applied to the polymer (4) that is not modified with the biotin ligand does not give any appreciable fluorescence signal. When performing the same procedure on co-polymer (3), both fluorescence signals are observed simultaneously, as shown in FIG. 6. By varying the feed ratios of [2.2]paracyclophanes (1) and (2) in the CVD polymerization, the relative ratio of ligands bound to the surface can be varied. The relative increase of starting material (2) may result in surfaces with increased amounts of Atto-labeled ligands (red color), while a relative increase of compound (1) in CVD polymerization results in an increase in fluorescence signal, indicating more streptavidin/biotin pair is bound to the surface. Based on the FTIR spectra (FIG. 3), it is believed that these trends can be explained by the controlled variation of binding sites available for the two ligands on the surface, which corresponds to the feed ratio of starting materials used during CVD co-polymerization.

For the 1:1 ratio, fluorescence micrographs of different reaction areas are shown in the inset of FIG. 6. Area 1 shows co-polymer (3), which reacts only to the biotin ligand (green color), while area 2 is characterized by red fluorescence, which is due to surface-immobilization of the Atto-labeled ligand. Where both ligands are allowed to react with the co-polymer (3) (area 3), yellow color is observed indicating the parallel immobilization of the two ligands.

According to various aspects of the disclosure, a concept of CVD polymerization is provided for polymer compositions comprising functionalized polymers, such as [2.2]paracyclophanes, and methods for preparing multi-reactive polymer films. The reactive coating can be successfully applied to various substrates, such as polymers, metals, or composites, establishing a fairly universal platform without relying on broad chemical alteration of the bulk material. In alternate aspects, multi-potent biointerfaces are prepared by simultaneously immobilizing mixtures of two different molecules through the same functional groups. However, in accordance with various embodiments, the polymer compositions comprise reactive coatings with two orthogonal functional groups. These orthogonal functional groups are perceived to provide several potential advantages, including: (1) surface ratios can be controlled with high precision, because the ligand immobilization reactions can be conducted independently; (2) substantially different biomolecules can be co-immobilized, even so their transport to the surface is substantially different; and (3) the ability to immobilize various molecules, such as biomolecules, in a sequence allows for combination of biomolecules that would otherwise cross-react with one another. The principles of the various embodiments permit substantially different molecules to be immobilized in precisely defined ratios via CVD co-polymerization. Moreover, various aspects of the disclosure provide for a modular coating design, where the properties of a coating can be designed by selecting the proper combination of building blocks for CVD polymerization. Such modular surface design can be applied to various applications, such as future biomedical devices, high-throughput screening platforms, microfluidic analysis devices, or diagnostic platforms.

Figure 10:
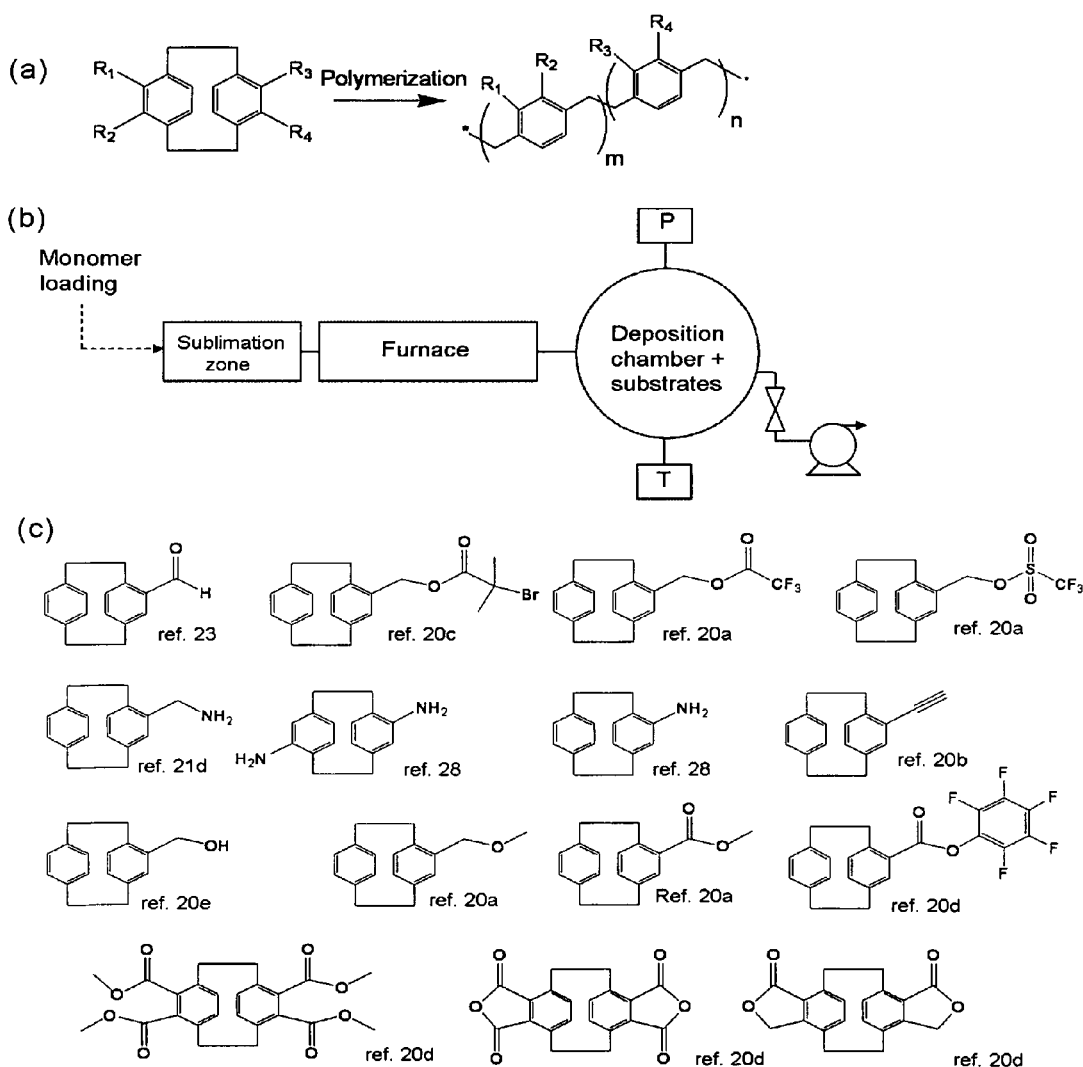
FIG. 10 illustrates reaction scheme 1, where panel (a) shows functionalized [2.2]paracyclophanes (PCPs) polymerized into poly(p-xylylenes) (PPXs) with tailored reactivity, which are deposited as thin films, panel (b) shows a process scheme for the chemical vapor deposition (CVD) of poly(p-xylylene), and panel (c) shows various derivatives of PCP for use in CVD polymerization.
Figure 11A:
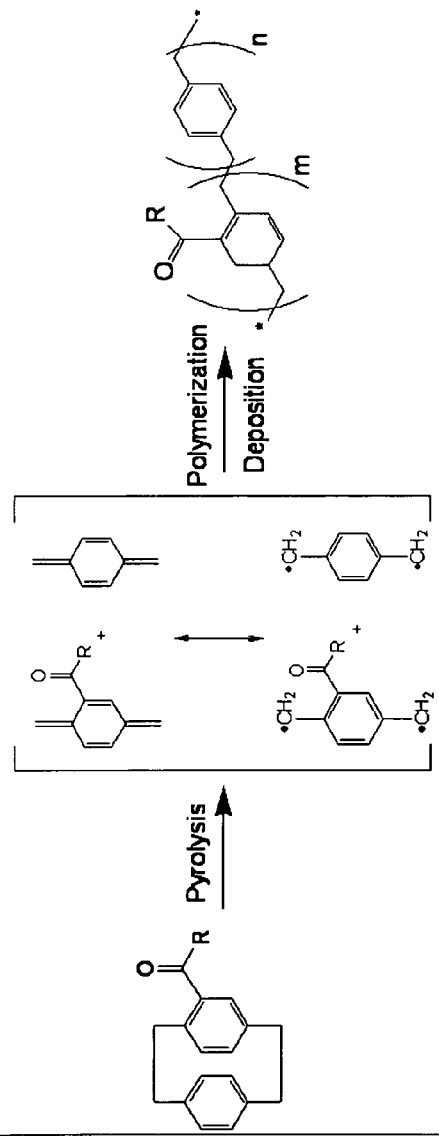
FIG. 11 illustrates reaction Scheme 2, where panel (a) shows a mechanism for the CVD polymerization of carbonyl-functionalized PCPs to produce corresponding PPXs, panel (b) shows a schematic diagram of the CVD process, and panel (c) shows CVD process conditions required for PPX deposition.
Figure 11B:
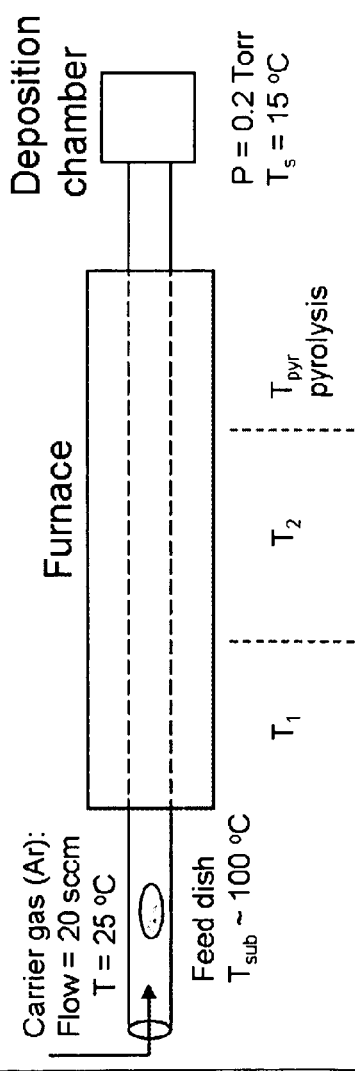

The present disclosure further provides compositions and methods relating to multipotent coatings that include CVD and biofunctionalization of substituted or functionalized [2.2]paracyclophanes (PCP) to yield functionalized poly(p-xylylenes) (PPXs). For example, such substituted co-polymers include carbonyl groups in co-polymers. As illustrated in FIGS. 10 and 11, a cyclic dimer is sublimated under vacuum (e.g., 0.2-0.3 Torr), and the dimer transported by a carrier gas through an external heat source (e.g., T=600-800° C.). When the temperature is high enough, homolytic cleavage can occur across both bridge bonds of the PPX molecule, resulting in reactive monomers, i.e., two quinodimethane diradicals. Such an activation or pyrolysis process serves as an initiation step. The reactive monomer radicals may then deposit and polymerize onto a sample substrate that is fixed at a particular temperature (e.g., about −40° C. and +60° C.). PCPs may be successfully modified with a wide variety of functional groups, which form a polymer film with such groups that may then serve as reactive functional sites for immobilization of various biomolecules. Polymerization of PCPs in accordance with the present disclosure can produce a conformal PPX coating with mechanical integrity and a low dielectric constant, which are useful attributes for MEMS devices, for example. These embodiments may include reactive polymers deposited by CVD that have multi-functionality as described and characterized in Example 2.

Figure 12:
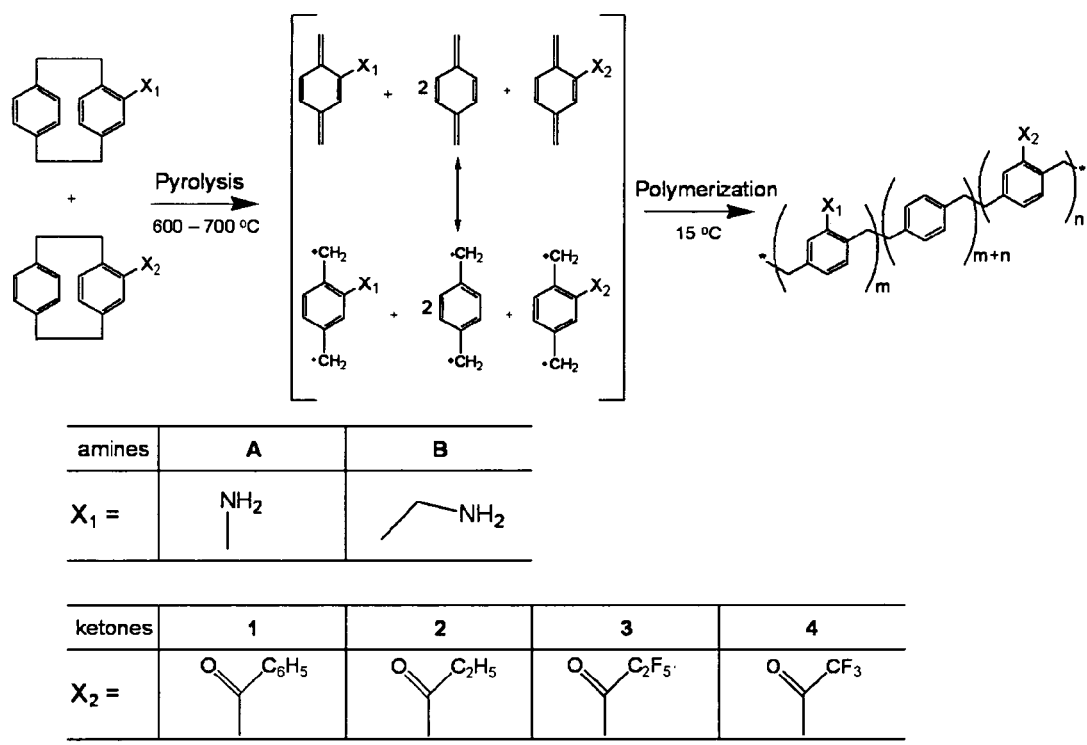
FIG. 12 illustrates a mechanism for CVD co-polymerization of two different PCPs.

A heterogeneous group of functionalized polymer coatings may be synthesized from substituted PCPs, as shown in FIGS. 10, 11, and 12. Carbonyl-functionalized polymers are useful for various applications. In particular, the benzoyl-functionalized polymers can exhibit photoreactivity and may be selectively reacted or functionalized based on this property, for example. In addition, aldehyde-functionalized PCPs can be successfully polymerized, while maintaining a high reactivity of the functional groups, as illustrated by successful immobilization of disaccharides on the resultant polymer coating.

In certain aspects, the multi-functional coating can be used in a biomedical device, where a suitable, defined and biocompatible surface modification strategy in accordance with the present disclosure provides impartment of complex immobilization for multiple biomolecules. For example, endovascular stents require promotion of endothelial tissue growth, while preventing thrombogenicity at the same time. Biological interactions are rarely monovalent and typically involve a complex cascade of activating and inhibitory signals; however, most conventional synthetic surface modification concepts are limited in generating only a single type of surface, i.e., immobilization of a single peptide or an antibody. One of the reasons for this highly reductive approach is due to the technical difficulty in achieving controlled simultaneous presentation of two or more biomolecules. Such procedures demand precise control of multiple surface reactions, while avoiding cross-reactivity between the different chemical groups. These issues can pose a significant challenge.

These issues are addressed by various embodiments of the present disclosure. For example, the present teachings may be used to develop multivalent surface coatings using CVD co-polymerization. Using these approaches, two different PCPs each with orthogonal reactivity may be copolymerized. The resulting coatings may be used to immobilize multiple biomolecules in defined ratios. Carbonyl-functionalized co-polymers may be synthesized where the resultant and/or surface patterns coatings exhibit characteristics useful for biomedical applications, for example. FIGS. 10, 11, and 12 illustrate CVD co-polymerization mechanisms for carbonyl-functionalized polymer coatings.

CVD-based PPXs offer a high degree of flexibility for the incorporation of various functional groups and therefore provide a versatile chemical modification platform. This strategy, however, requires synthesis of the appropriate PCPs and subsequent vapor deposition of well-defined reactive coatings, while maintaining the integrity of the functional groups under the conditions of CVD polymerization. Carbonyl-functionalized polymers are of particular interest because of their favorable deposition properties combined with their selectivity towards particular ligands, including hydrazide-functionalized ligands. When conducting CVD polymerization of functionalized PCPs, such as various carbonyl groups (e.g., —$COC_6H_5$, —$COC_2H_5$, —$COC_2F_5$, and —$COCF_3$), transparent polymer films with excellent adhesion towards silicon, gold, stainless steel, and glass substrates are obtained.

Figure 13:
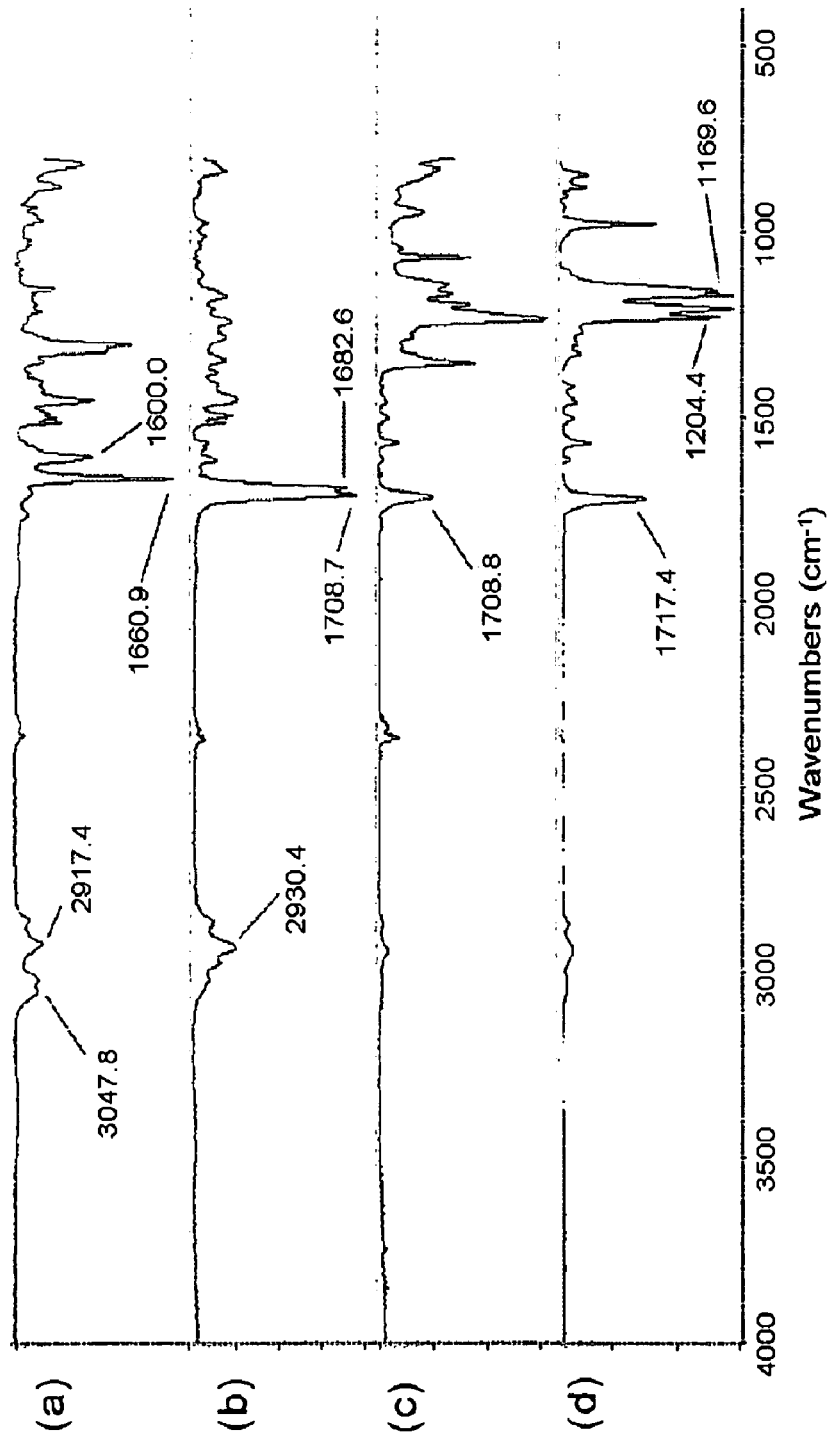
FIG. 13 illustrates FTIR spectra of PPX polymers containing the following functional modifications: (a) $COC_6H_5$, (b) $COC_2H_5$, (c) $COC_2F_5$, and (d) $COCF_3$.

Illustrative FTIR spectra of some polymer examples prepared in accordance with the present teachings are shown in FIG. 13. Strong carbonyl stretches are present in the range of 1720-1660 $cm^{-1}$ in all spectra. Characteristic C—H stretches due to aromatic hydrogens are present between 3050-2910 $cm^{-1}$. In addition, the spectrum of PPX-$COC_2H_5$ reveals a higher intensity band at 2930 $cm^{-1}$ that is indicative of aliphatic hydrogens. Strong FTIR bands between 1204 and 1170 $cm^{-1}$ are due to the fluorinated alkyl groups present in polymers PPX-$COC_2F_5$ and PPX-$COCF_3$. Collectively, the FTIR spectra shown in FIG. 13 confirm the expected structures of carbonyl-functionalized polymers.

Figure 14:
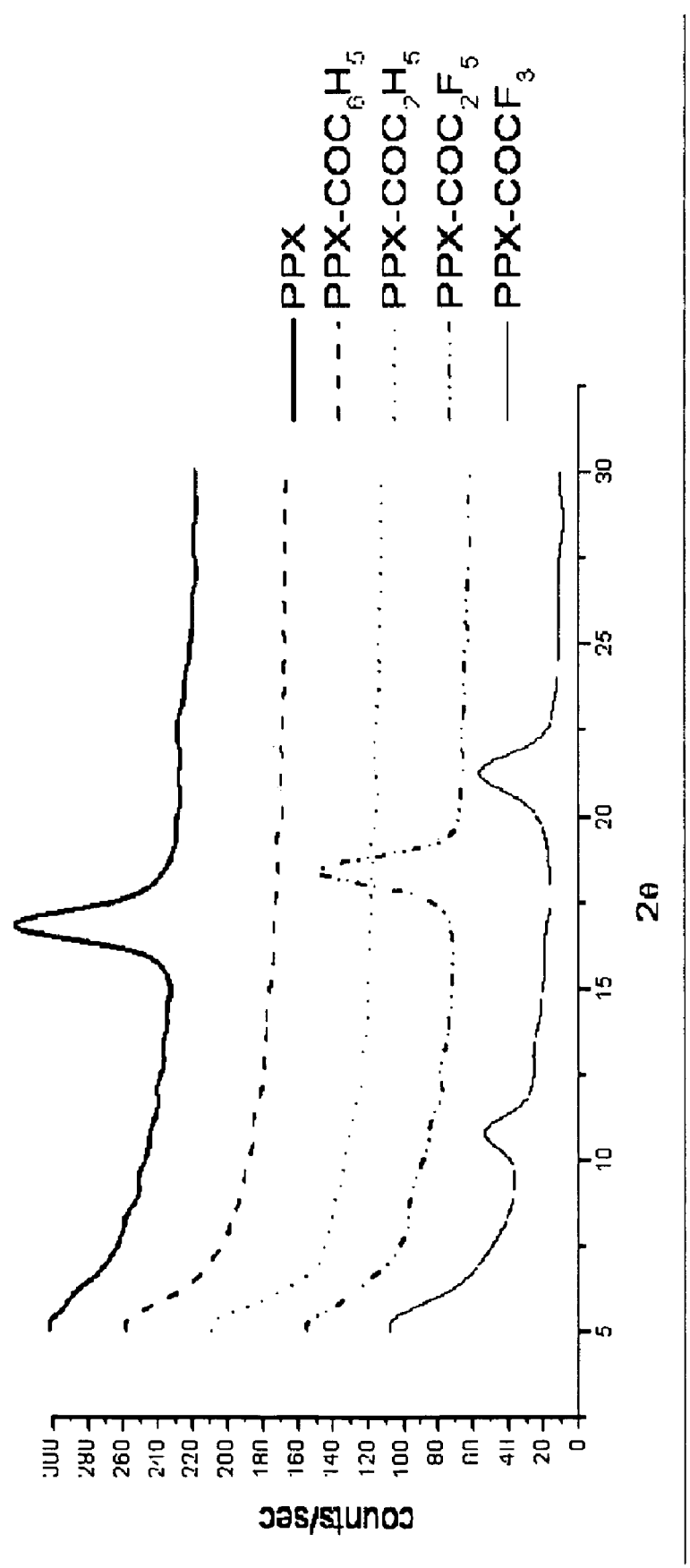
FIG. 14 illustrates XRD of carbonyl-functionalized polymers upon annealing at 120° C. for 14 hrs.

PPX derivatives with different functional groups can either be semi-crystalline or amorphous. In fact, subtle differences in the side group structure can influence the crystallinity of the polymer films. Therefore, XRD may be used to assess differences amongst the four different carbonyl-functionalized polymers and the results may be compared to unfunctionalized PPX (parylene N), as illustrated in FIG. 14. Upon deposition, XRD spectra of all polymers, except for the unfunctionalized PPX, are void of any detectable signals, indicating that these polymers are amorphous (data not shown). After annealing at about 120° C. for about 14 hrs, however, the fluoroalkyl-containing polymers PPX-$COC_2F_5$ and PPX-$COCF_3$ can undergo significant chain remodeling, as indicated by the appearance of sharp signals at 10.70 and 21.20 (PPX-$COCF_3$), as well as 18.40 (PPX-$COC_2F_5$). In fact, these polymers may undergo a transition from an amorphous polymer to become semi-crystalline. In contrast, —$COC_6H_5$-functionalized and —$COC_2H_5$-functionalized PPX coatings can remain amorphous (FIG. 14), even after undergoing identical annealing conditions.

Short-term cell adhesion on these polymers is examined by culturing human umbilical vein endothelial cells (HUVECs) on a range of different CVD coatings. These experiments serve as baseline assessment studies for biological interaction with the various co-polymers produced according to the present disclosure. The four carbonyl-functionalized PPXs are included along with two amine-functionalized coatings; i.e., poly(4-aminomethyl-p-xylylene-co-p-xylylene) and poly(4-amino-p-xylylene-co-p-xylylene). In addition, a poly (L-lysine) (PLL)-coated surface is used as a positive control, while cytotoxic poly(vinyl chloride) (PVC) serves as a negative control.

Figure 15:
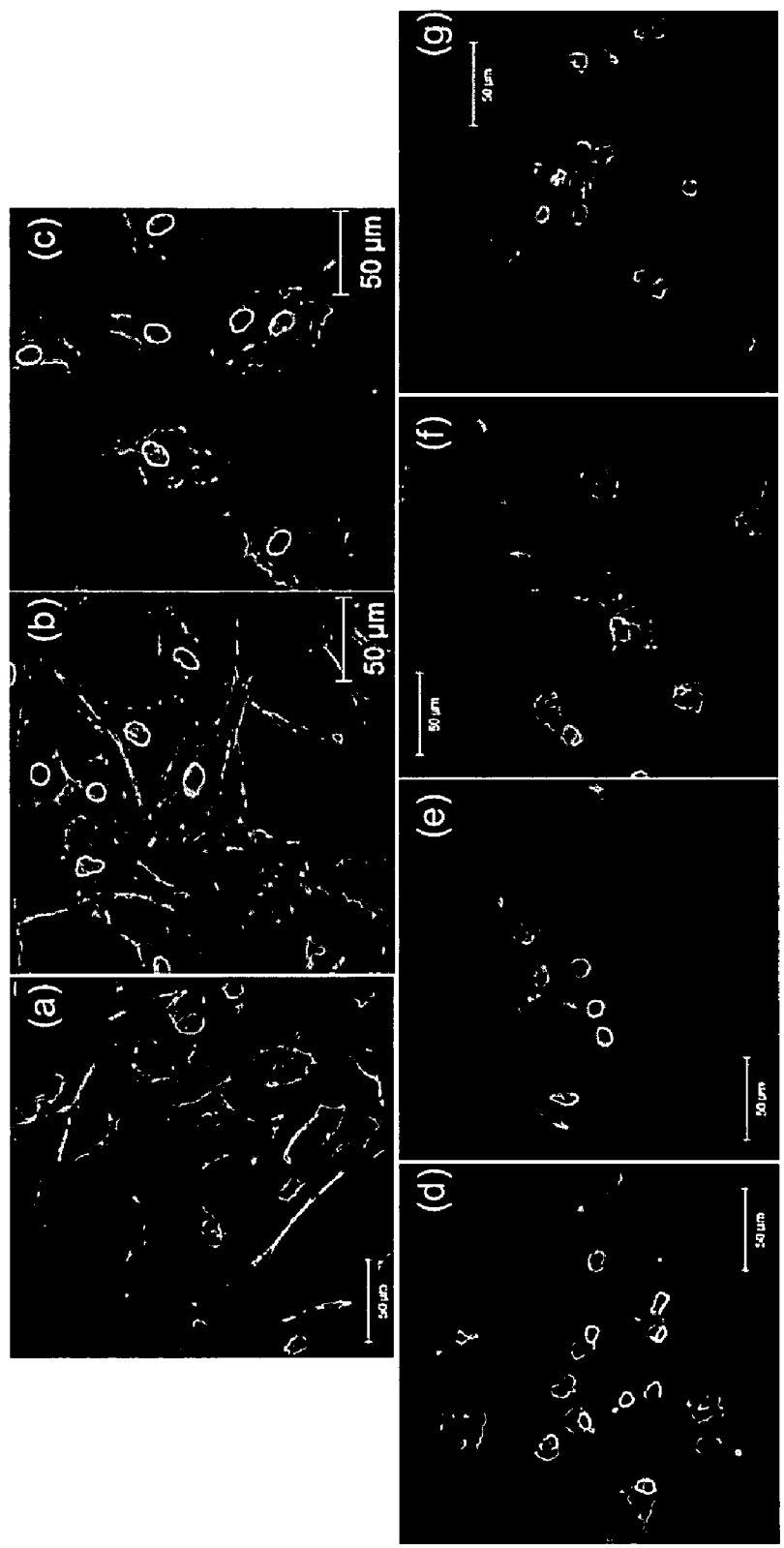
FIG. 15 illustrates confocal microscopy images of HUVECs grown (a) poly(L-lysine) coated cover slip, (b) PPX-$CH_2NH_2$, (c) PPX-$NH_2$, (d) PPX-$COC_6H_5$, (e) PPX-$COC_2H_5$, (f) PPX-$COC_2F_5$, and (g) PPX-$COCF_3$ surfaces; Red: actin cytoskeleton (rhodamine-phalloidin), blue: nucleus (DAPI); n=3, with representative images shown; and all scale bars are 50 μm.

As shown in FIG. 15, HUVECs grown on PLL are spread out and form extensive actin cytoskeletons—a cell morphology that indicates growth-conducive interactions with these substrates. Interestingly, HUVECs cultured on the two amino-functionalized PPXs (FIGS. 15b and 15c) show cell morphologies similar to those cultured on control substrate of PLL-coated glass substrate. In contrast, HUVECs grown on carbonyl-functionalized PPXs present different morphologies, as shown in FIGS. 15d-g. Cells grown on carbonyl-functionalized surfaces appear smaller and are less spread out, to various extents, as compared to those grown on PLL-coated cover slips or on amino-functionalized PPX. In addition, fewer cells adhere to these surfaces as evidenced by phase contrast micrographs of cells in culture up to 24 hrs; this effect is further pronounced upon completion of staining procedures for immunocytochemistry, as cells may have detached from the respective substrates. These findings suggest that in certain environments amino-functionalized PPX have higher cell adhesion than carbonyl-functionalized PPX (with respect to HUVEC contact).

In addition, presence of vinculin is evaluated for these cells. Vinculin is a cytoskeletal protein and a component of the focal adhesion protein complex, which binds the actin cytoskeleton to link cells to their substrate via adhesion molecules. Immunostaining reveals an increase in the numbers of positive punctuate vinculin staining on cells cultured on PLL- and amino-functionalized PPX-coated surfaces relative to those cultured on carbonyl-functionalized PPX coatings (data not shown). These results corroborate the findings of the more spread out morphology of cells on PLL and amino-functionalized PPX surfaces, since cell adhesion on these substrates is likely stronger than that of cells on carbonyl-functionalized PPX. Together, the results suggest that surprisingly small differences in the functional side groups of carbonyl-functionalized PPXs can result in polymer coatings with varied biological responses.

With renewed reference to FIG. 12, embodiments of multi-functionalized CVD coatings that combine amine groups with ketone groups are shown. Multifunctional coatings simultaneously presenting multiple chemical functional groups on their surface are prepared by co-polymerizing an amino-functionalized PCP (—$NH_2$ or —$CH_2NH_2$) with a carbonyl-functionalized PCP (—$COC_6H_5$, —$COC_2H_5$, —$COC_2F_5$, or —$COCF_3$). In these examples, the relative ratio of amino- versus carbonyl-groups is varied by altering the ratio of starting amounts of different PCPs used for CVD polymerization. For a given co-polymer combination, all other process parameters, including total amount of starting materials, pressure, sublimation temperature, pyrolysis temperature, or deposition temperature are kept constant.

Figure 16:
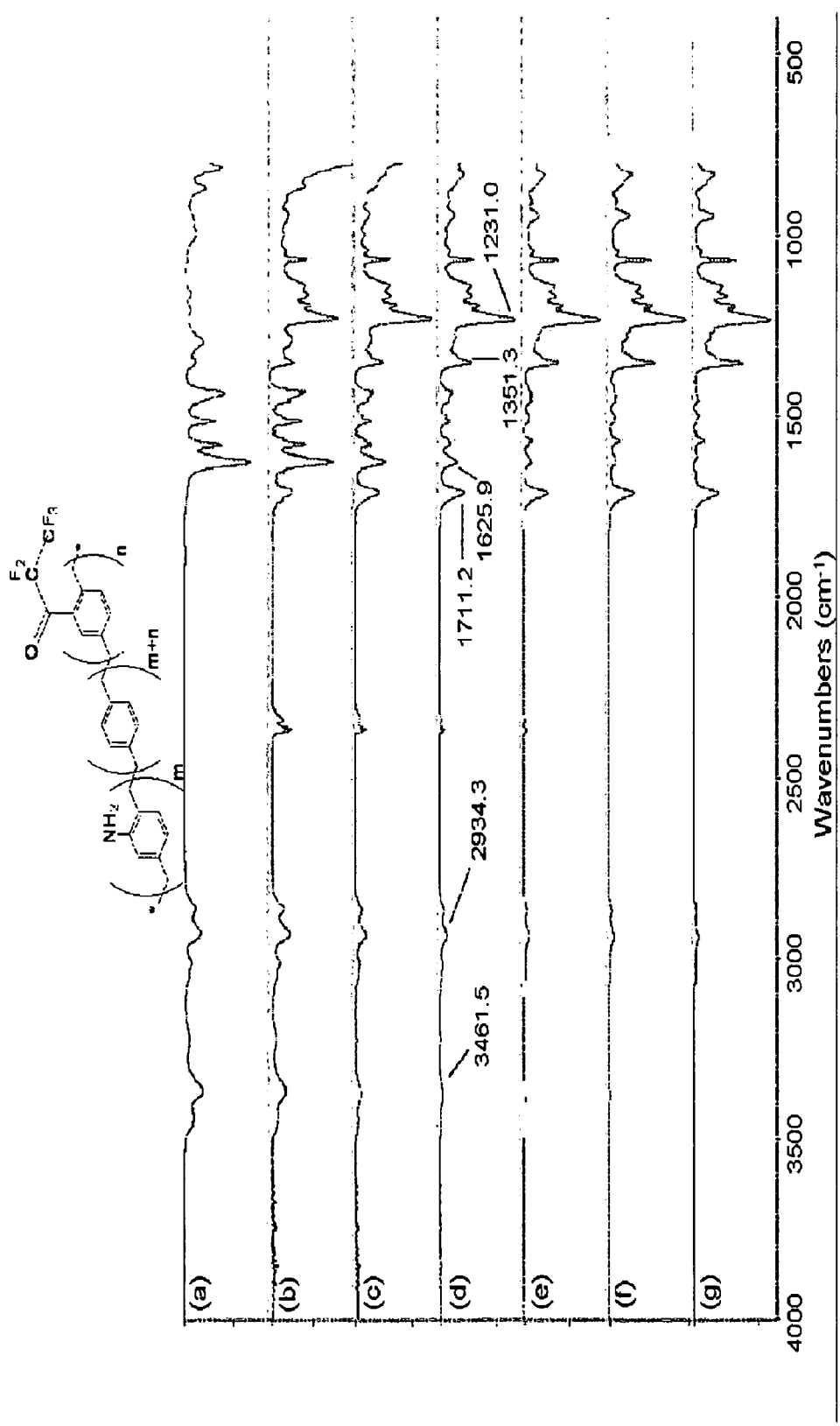
FIG. 16 illustrates FTIR spectra of CVD co-polymer (—$NH_2$/—$COC_2F_5$), co-polymerized into different molar ratios of PPX-$NH_2$:PPX-$COC_2F_5$; (a) pure PPX-$NH_2$ (b) 5:1 (c) 2:1 (d) 1:1 (e) 1:2 (f) 1:5 (g) pure PPX-$COC_2F_5$.
Figure 17:
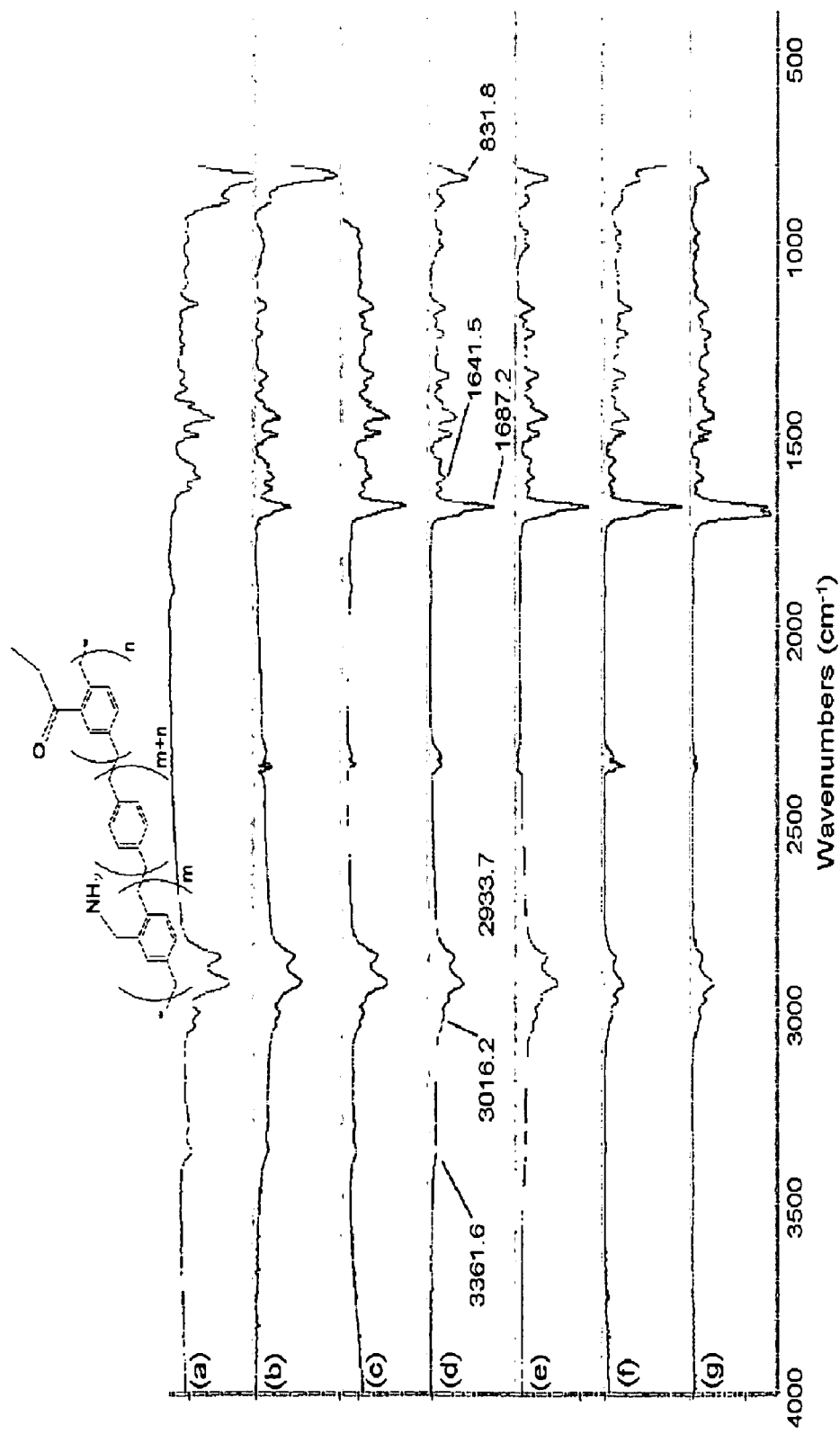
FIG. 17 illustrates FTIR spectra of CVD co-polymer (—$CH_2NH_2$/—$COC_2H_5$) co-polymerized into different molar ratios of PPX-$CH_2NH_2$:PPX-$COC_2F_5$; (a) pure PPX-$CH_2NH_2$ (b) 5:1 (c) 2:1 (d) 1:1 (e) 1:2 (f) 1:5 (g) pure PPX-$COC_2H_5$.

By adjusting the ratio of monomers loaded into the CVD sublimation zone, different molar ratios are prepared for each polymer combination, resulting in a wide variety of co-polymers. In this manner, the polymer composition can be designed to have a desired ratio or stoichiometry of distinct monomers. Control of the ratio of respective monomers in the CVD polymeric film posed difficulty prior to the present inventive methods. To illustrate generalized trends, representative FTIR spectra are shown in FIGS. 16 and 17. FIG. 16 shows FTIR spectra for co-polymer PPX-$NH_2$/—$COC_2F_5$ deposited in 5 different ratios as well as spectra of the monofunctional polymers PPX-$NH_2$ and PPX-$COC_2F_5$ as references. IR bands characteristic of N—H bond occur at 3461.5 and 3380.7 $cm^{-1}$, whereas stretches characteristic of $COC_2F_5$ occur at 1711.2 $cm^{-1}$ (C=O), 1351.3 $cm^{-1}$, and 1231.0 $cm^{-1}$ (C—F). Even for ratios with low carbonyl content, C—F stretches can be clearly distinguished. As the amount of PPX-$COC_2F_5$ is increased, ratios of peaks characteristic to $NH_2$ stretches and $COC_2F_5$ change accordingly. A characteristic band at 1625.9 $cm^{-1}$ is detected in all amino-containing polymers.

Likewise, PPX-$CH_2NH_2$/—$COC_2H_5$ co-polymers show similar trends in the FTIR spectra as the ratio of amount of starting material is varied systematically (FIG. 17). For example, bands at 3361.6 and 1641.5 $cm^{-1}$ are distinct until 1:2 ratio was reached. Vibration at 1641.5 $cm^{-1}$ is characteristic of $NH_2$ scissoring stretches, while vibration at 3361.6 $cm^{-1}$ indicates N—H stretches. As the concentration of PPX-$COC_2H_5$ increases, these vibrations gradually disappear.

Other subtle changes are also visible in the FTIR spectra. For example, the C—H bands change with respect to their relative intensities; with increasing content of PPX-CH$_2$NH$_2$ in the co-polymer, an increase in the aliphatic C—H bands due to the COC$_2$H$_5$ group is observed. There appears to be no evidence of any cross-reaction between the amine and carbonyl functional groups, as indicated by imine stretch (1655 cm$^{-1}$) (FIGS. 16 and 17). In addition, for each co-polymer spectrum, all IR bands can be accounted for based on the spectra of the constituting mono-functional polymers (FIG. 13).

Figure 18A:
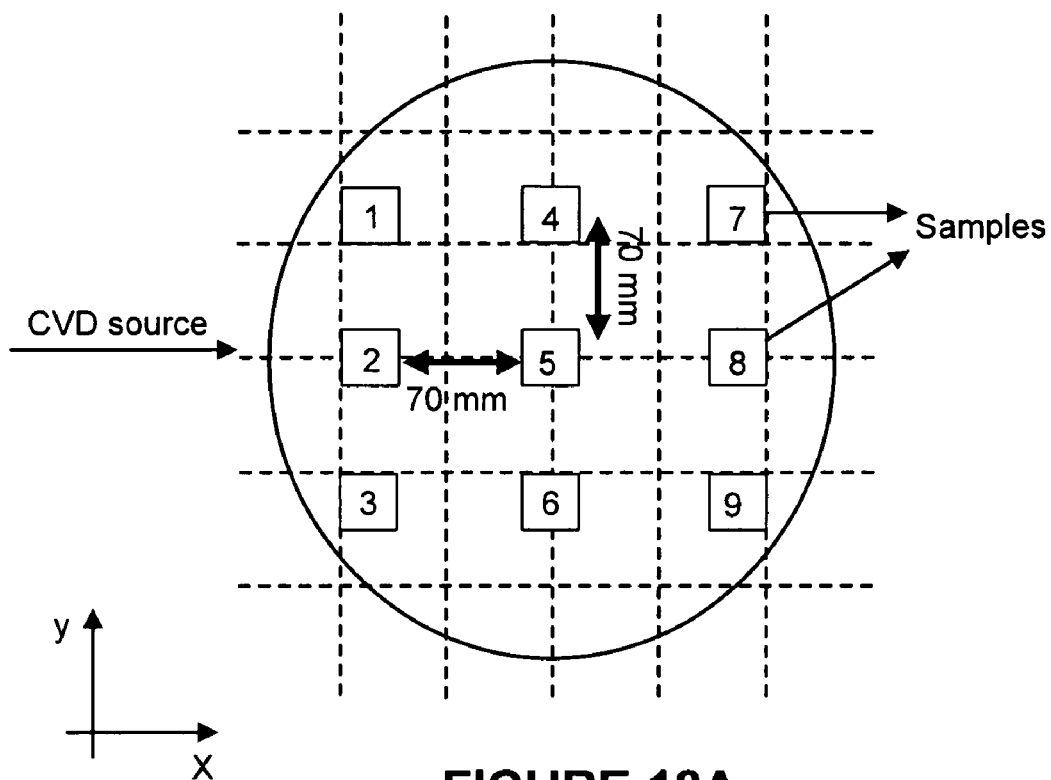
FIG. 18 illustrates (a) schematic representation of substrate positions arranged on the CVD sample holder and (b) plot of FTIR peak ratios (CN:C=O), with respect to substrate temperature.
Figure 18B:
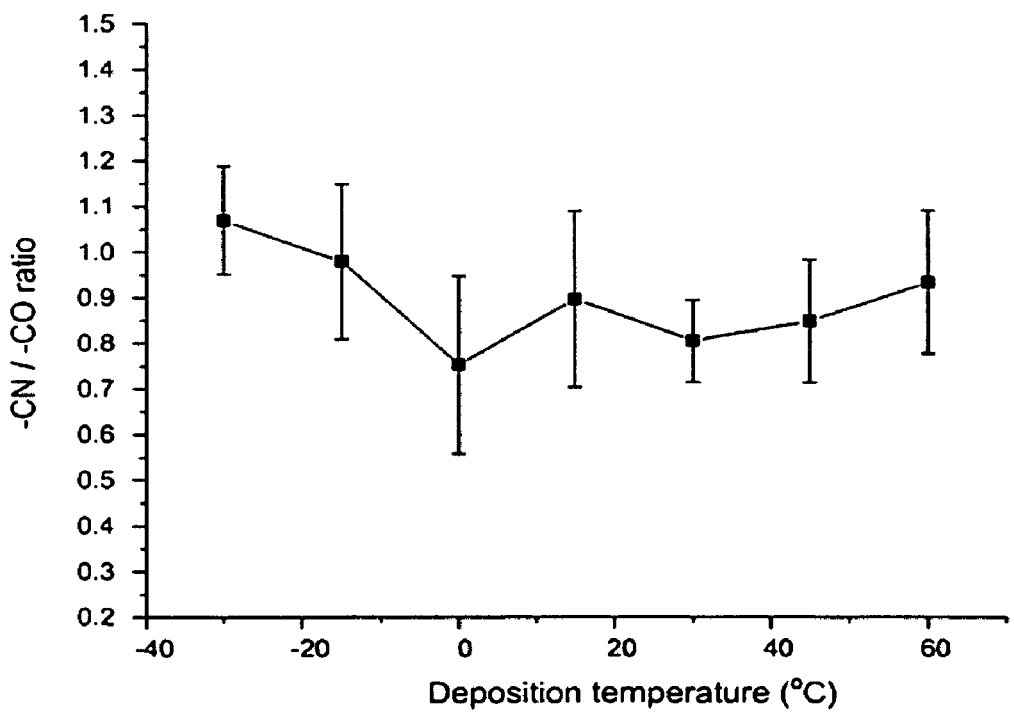

In certain aspects, homogeneous deposition of coatings is an important technological requirement. The deposition chamber can optionally be large enough that temperature gradients can occur within the chamber and/or on the sample holder. Such differences, if they exist, could impact accurate and controlled deposition of defined co-polymer ratios. To assess potential heterogeneity created during CVD co-polymerization due to temperature differences, co-polymer PPX-CH$_2$NH$_2$/—COCF$_3$ (1:1 monomer ratio) is deposited on 9 different samples, each located at various positions within the sample holder (FIG. 18$a$). The experimental conditions are maintained as described for other CVD co-polymerization procedures, with the exception that the sample holder is not rotated and the substrate temperature is systematically varied.

all sample peak ratios are normalized by the peak ratio of sample No. 2. As seen in FIG. 18$b$, the average ratio of the two functional groups remains relatively constant across all deposition temperatures, suggesting no significant composition differences on the sample holder, even at different substrate temperatures.

Although FTIR spectra indicate agreement of the bulk co-polymer composition with the loaded monomer ratio, this method has limited surface sensitivity and provides averaged information of the entire polymer films. To assess the actual surface composition of the co-polymer films, surfaces are analyzed by XPS, which can detect the atomistic composition of a surface, usually to a resolution of about 5-10 nm. This technique can provide a survey spectrum of all atoms present, as well as high-resolution scans that provide information about the binding state of a particular element. Table 1 summarizes the chemical composition of all 1:1 ratios of the entire group of amino/carbonyl co-polymers.

Table 1. XPS results for CVD co-polymers containing (a) 1:1 ratios of (PPX-NH$_2$):(PPX-R) (b) 1:1 ratios of (PPX-CH$_2$NH$_2$):(PPX-R). Atomic composition results are shown on the top half of each table, while high resolution C$_{1s}$ spectra results are shown on the bottom. Theoretical calculations are based upon ideal deposition of the co-polymer ratio.

TABLE 1

NH$_2$ series (A)

| | COC$_6$H$_5$ (1) | | COC$_2$H$_5$ (2) | | COC$_2$F$_5$ (3) | | COCF$_3$ (4) | |
|---|---|---|---|---|---|---|---|---|
| | exper | theor | exper | theor | exper | theor | exper | theor |
| F | — | — | — | — | 15.35 | 14.37 | 11.8 | 9.43 |
| O | 1.69 | 2.04 | 5.04 | 2.70 | 4.56 | 2.87 | 5.42 | 3.14 |
| N | 2.01 | 2.04 | 2.66 | 2.70 | 2.61 | 2.87 | 3.71 | 3.14 |
| C | 96.3 | 95.92 | 92.29 | 94.59 | 77.48 | 79.89 | 79.06 | 84.28 |
| C—C | 91.25 | 91.49 | 87.12 | 88.57 | 78.08 | 79.17 | 86.88 | 88.81 |
| C—N | 2.53 | 2.13 | 2.66 | 2.86 | 4.01 | 3.47 | 2.86 | 3.73 |
| C—C=O | 4.14 | 4.26 | 5.23 | 5.71 | 4.65 | 3.47 | — | — |
| C=O | 2.07 | 2.13 | 4.99 | 2.86 | 5.93 | 3.47 | 5.58 | 3.73 |
| π → π* | 10.71 | — | 4.89 | — | 5.57 | — | 3.37 | — |
| CF$_3$ | — | — | — | — | 3.66 | 3.47 | 4.68 | 3.73 |
| CF$_2$ | — | — | — | — | 3.66 | 3.47 | — | — |

(a)

CH$_2$NH$_2$ series (B)

| | COC$_6$H$_5$ (1) | | COC$_2$H$_5$ (2) | | COC$_2$F$_5$ (3) | | COCF$_3$ (4) | |
|---|---|---|---|---|---|---|---|---|
| | exper | theor | exper | theor | exper | theor | exper | theor |
| F | — | — | — | — | 17.18 | 13.97 | 8.54 | 9.15 |
| O | 1.9 | 2.00 | 2.63 | 4.49 | 4.84 | 2.79 | 5.35 | 3.05 |
| N | 1.23 | 2.00 | 2.63 | 2.36 | 1.90 | 2.79 | 2.84 | 3.05 |
| C | 96.87 | 96.00 | 94.74 | 93.15 | 76.08 | 80.45 | 83.26 | 84.76 |
| C—C | 92.68 | 91.67 | 87.17 | 86.11 | 76.55 | 79.17 | 89.45 | 89.21 |
| C—N | 1.39 | 2.08 | 2.80 | 2.78 | 3.18 | 3.47 | 3.13 | 3.60 |
| C—C=O | 3.91 | 4.17 | 5.89 | 5.56 | 4.98 | 3.47 | — | — |
| C=O | 2.01 | 2.08 | 4.14 | 2.78 | 4.84 | 3.47 | 3.34 | 3.60 |
| π → π* | 2.90 | — | 3.16 | — | 3.41 | — | 4.30 | — |
| CF$_3$ | — | — | — | — | 5.23 | 3.47 | 4.08 | 3.60 |
| CF$_2$ | — | — | — | — | 5.23 | 3.47 | — | — |

(b)

Figure 19:
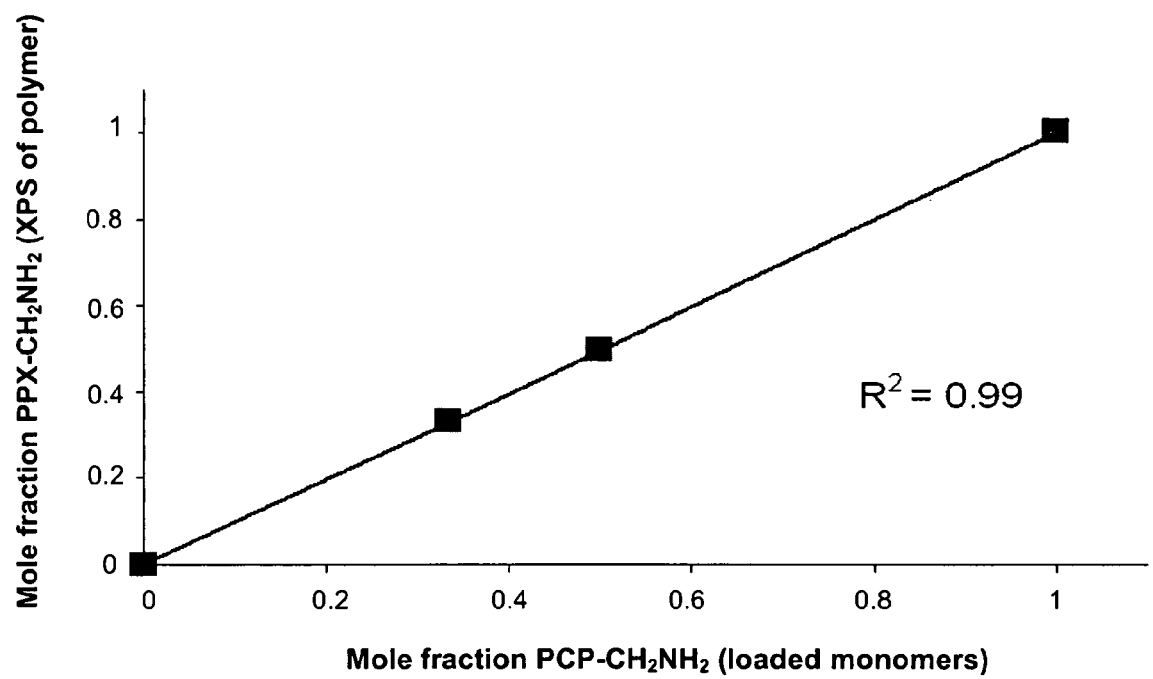
FIG. 19 illustrates a graph of co-polymer ratios of (—$CH_2NH_2$/—$COCF_3$) plotted against their monomer loading ratios.

FTIR is used to obtain the ratio of C—N to C=O bands, which serves as an indicator of co-polymer ratios. For each temperature, sample No. 2 (FIG. 18$a$) is used as a reference;

Experimental data are compared to theoretical values obtained on the basis of the starting materials assuming a 1:1 ratio of the two PCPs. Generally, all co-polymers demonstrate good agreement between experimental values and theoretical compositions. All high-resolution $C_{1s}$ spectra revealed $\pi \rightarrow \pi^*$ transitions, which are characteristic of aromatic polymers. Nevertheless, discrepancies can exist between experimental results and theoretically calculated values. Even though a 1:1 monomer loading ratio is used, fluctuations in ratios can occur during monomer sublimation. The ratio of N and F molecules (N/F ratio) revealed by XPS survey spectra can be used to determine the co-polymer ratio. As the observed trends are quite similar amongst the various co-polymers, the co-polymer PPX-$CH_2NH_2$/—$COCF_3$ is selected as an example in the following discussion. FIG. 19 shows a graph of the co-polymer ratio for CVD polymer PPX-$CH_2NH_2$/—$COCF_3$, determined by XPS, plotted against the actual loaded monomer ratio. There is an excellent correspondence between the loaded monomer ratio and the actual composition of the co-polymer as indicated by the N/F ratio. Furthermore, co-polymer composition can be correlated to the monomer sublimation rates, which are controlled in certain aspects by the sublimation temperatures. Compositions are determined using XPS, and the sublimation temperatures of both monomers are recorded in situ using a thermocouple. Table 2 lists examples of experimental data.

Table 2. XPS composition of co-polymer (PPX-$CH_2NH_2$/—$COCF_3$), deposited using various monomer sublimation temperatures. Monomer loading ratio of 1:1 is used for all depositions.

TABLE 2

| target mole fraction $CH_2NH_2$ | T_$CH_2NH_2$ (° C.) | T_$COCF_3$ (° C.) | total growth rate (A/s) |
|---|---|---|---|
| 0 | 88 | 95 | 0.7 |
| 0.18 | 93.6 | 73.8 | 0.6 |
| 0.26 | 95.8 | 64.8 | 0.6 |
| 0.4 | 104.3 | 58.3 | 0.7 |
| 0.49 | 110.6 | 51 | 0.7 |
| 0.62 | 115.8 | 40.7 | 0.7 |
| 0.73 | 137.6 | 40 | 0.7 |
| 0.91 | 142 | 35 | 0.7 |

Figure 20:
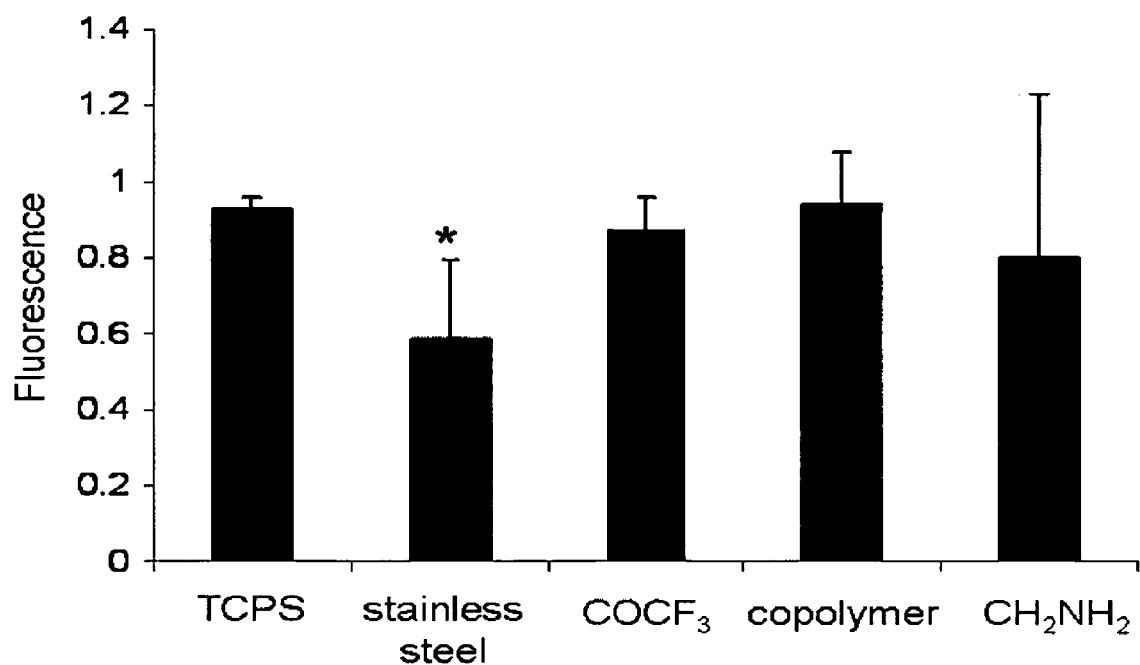
FIG. 20 illustrates fibrinogen adsorption on various substrates; normalized fluorescence values are reported; results were compared to TCPS; with n=3, *: p<0.05.

In order to assess a polymer's ability to function as a biological interface, its compatibility with various cells may be elucidated. For example, the co-polymer PPX-$CH_2NH_2$/—$COCF_3$ can be used to immobilize multiple ligands in defined ratios and its short-term biocompatibility can be determined using cell culture experiments. As shown in FIG. 15, general differences among the homopolymers exist with regard to HUVEC attachment. To study the biocompatibility of co-polymers, the cellular response in culture on CVD films is investigated. Initially, protein adsorption on these CVD polymer coatings is evaluated using fibrinogen as a model protein. Fibrinogen is chosen as a model protein due to its role in blood coagulation. As many biological devices contact blood upon implantation, fibrinogen adsorption behavior may be an important indicator for potential pro-thrombotic activity. As shown in FIG. 20, adsorption of fibrinogen on various CVD surfaces (e.g., mono-functional polymers PPX-$CH_2NH_2$ and PPX-$COCF_3$ and PPX-$CH_2NH_2$/—$COCF_3$ at 1:1 ratio) is not significantly different from that of tissue culture-treated polystyrene (TCPS). Amongst the surfaces tested, adsorption of fibrinogen is lower only on bare stainless steel as compared to TCPS.

As cell attachment onto CVD surfaces may support potential biomedical applications of CVD polymer coatings, biocompatibility of these coatings is also assessed using NIH3T3 fibroblasts. These cells are cultured and grown on various CVD surfaces and their release of glucose-6-phosphate dehydrogenase (G6PD) is measured. This enzyme is normally intracellular but upon compromise of cell membrane integrity or lysis, it may be released into the surrounding media. Thus, the amount of G6PD detected in cell culture media can be indicative of surface cytotoxicity. As compared to the media of live cells, significantly higher amounts of G6PD can be detected in media of lysed cells as well as those cells grown on PVC (FIG. 21), which is known to be cytotoxic. In contrast, lower G6PD release is observed from cells grown on PPX-$CH_2NH_2$, the 1:1 co-polymer ratio, and PPX-$COCF_3$ as compared to live cells, suggesting that CVD surfaces may not cause cell death or lysis at the time point evaluated.

Figure 22:
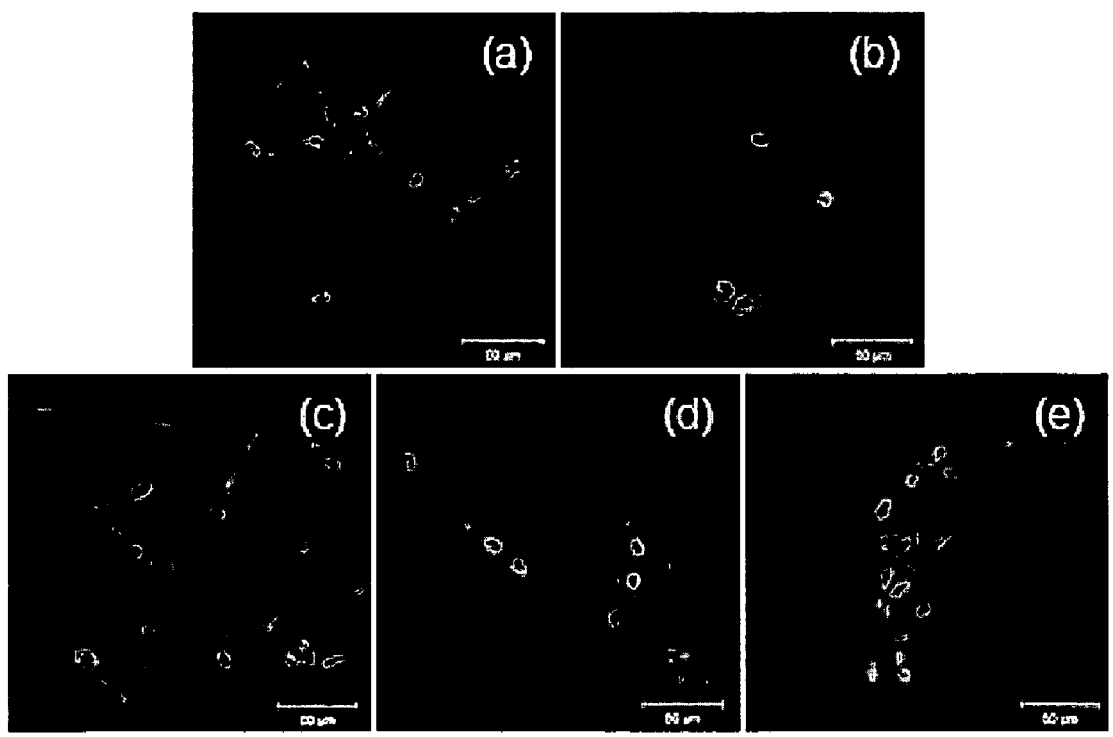
FIG. 22 illustrates confocal microscopy images of NIH 3T3 murine fibroblasts grown on (a) poly(L-lysine) coated cover slip, (b) polyvinyl chloride film, (c) PPX-$CH_2NH_2$, (d) 1:1 ratio of PPX-$CH_2NH_2$ and PPX-$COCF_3$, (e) PPX-$COCF_3$ surfaces; red: actin cytoskeleton (rhodamine-phalloidin), blue: nucleus (DAPI); with n=3, representative images shown; and all scale bars are 50 μm.

Morphologies of NIH3T3 fibroblasts grown on CVD homopolymers and co-polymer PPX-$CH_2NH_2$/—$COCF_3$ can also be compared (FIG. 22). As might be expected, murine fibroblasts do not grow well on PVC disks, as many of the initially seeded cells do not adhere or are detached during washing steps. Cells that remain adherent are small in size and round in shape, suggesting lack of spreading and contact with the surface. NIH3T3s grown on surfaces of PPX-$CH_2NH_2$ and PPX-$CH_2NH_2$/—$COCF_3$ show morphologies comparable to those grown on PLL cover slip, with cell spreading as indicated by actin filaments. On homopolymer 4 (—$COCF_3$, as per FIG. 8), cells mostly aggregated, although more cells remained adherent on this surface, and more spreading is observed than on PVC. In this set of experiments, introduction of polymer PPX-$CH_2NH_2$ to polymer PPX-$COCF_3$, as co-polymer PPX-$CH_2NH_2$/—$COCF_3$, improves NIH3T3 adhesion to the polymer coating. It is hypothesized that the mechanism mediating the enhancement of adhesion, while not completely understood, may be comparable to that observed with HUVECs in FIG. 15, where HUVECs cultured on polymer PPX-$COCF_3$ exhibit altered morphology, indicative of lesser compatibility in comparison to polymer PPX-$CH_2NH_2$.

Another property of carbonyl-functionalized co-polymers is the ability to simultaneously immobilize multiple ligands. In considering design of a multipotent surface under physiological conditions, characterizing the relative chemical reactivity of the different carbonyl groups towards target molecules (e.g., hydrazides) is a relevant factor. In this context, the reaction kinetics of different carbonyl functionalities are analyzed using in situ $^1H$ NMR. Rather than reacting functionalized PCP monomers, functionalized p-xylenes are synthesized and examined because the constrained ring systems can significantly alter the chemical reactivity of the PCPs and disqualify them as model reactants for PPXs. Functionalized p-xylenes may be considered as the smallest repetition unit of the polymer coatings and more closely resemble the PPX chain.

Figure 23:
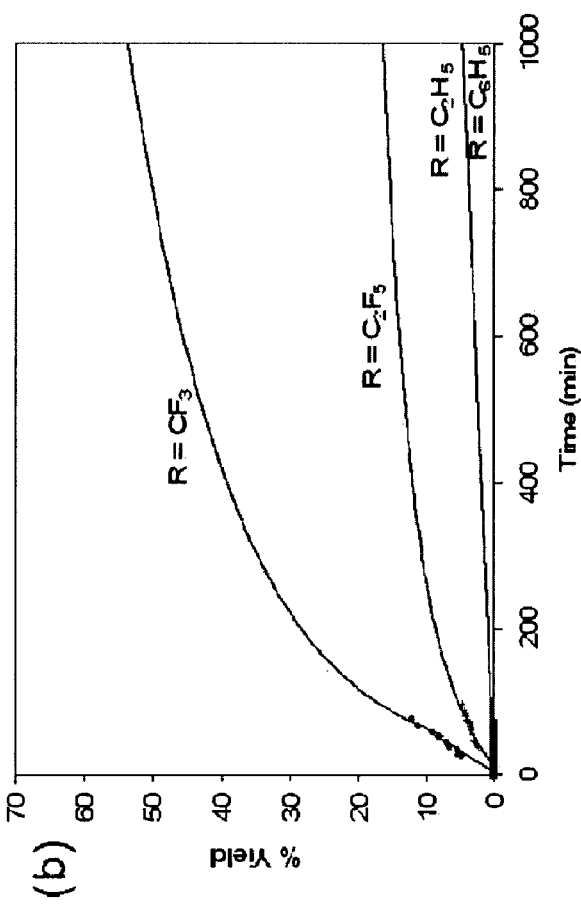
FIG. 23 illustrates (a) protocol used to determine the reaction kinetics of different carbonyl-PPXs, using functionalized p-xylenes as test molecules and (b) percent yield of carbonyl reactions with respect to time, based upon $^1$H NMR of characteristic reactant/product peaks.
Figure 23:
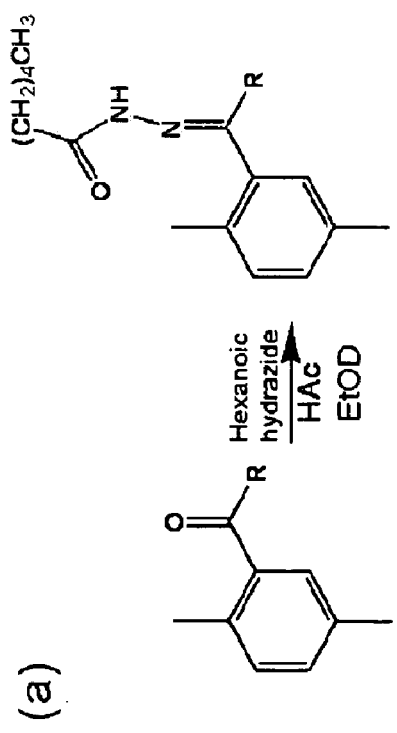

With reference to FIG. 23, two specific peaks on the NMR spectra, one characteristic of the reactants (—CH) and the other one indicating the product (—C=N—$\overline{NH}$), can be integrated and the percent yield of product can therefore be evaluated. Measurement frequency can decrease when the percent yield reaches a plateau. The percent yields are plotted as a function of time for the different reactions with functionalized p-xylene derivatives. FIG. 23 shows kinetic curves fitted to the experimental data. For most p-xylenes, NMR peaks characteristic of the product are evident within about 15-20 minutes of initiating the reaction. NMR spectra for benzoyl-functionalized p-xylene show no peaks characteristic of the product over a reaction duration exceeding 15 hrs. Fluorinated functional groups can be more reactive than non-fluorinated groups. Of the functional groups, $COCF_3$ is the most reactive, followed by $COC_2F_5$, $COC_2H_5$, and $COC_6H_5$ in order of decreasing reactivity. Benzoyl ($COC_6H_5$) group yielded essentially no product within the evaluated reaction times. On the basis of these examples, the trifluoroacetyl ($COCF_3$) group is selected for multifunctional surface modification.

An example illustrating surface immobilization of a biomolecule includes attaching r-hirudin, a recombinant protein which deactivates thrombin, to the polymer surface. Thrombin plays a central role in blood coagulation and mediates restenosis. Thus, the immobilization of hirudin may be one approach for modifying the surface of blood-contacting devices, such as cardiovascular stents. In addition, heparin, a highly-sulfated glycosaminoglycan anticoagulant, may also be immobilized. Hirudin and heparin may be immobilized on a co-polymer coating of —$CH_2NH_2$/—$COCF_3$, through the aminomethyl group via a diisocyanate linker and carbonyl groups via adipic acid dihydrazide, respectively.

For r-hirudin immobilization, the substrates are incubated with hexamethylene diisocyanate, which is reactive towards amine groups. FTIR spectroscopy confirmed the presence of isocyanate (NCO) group on the amine and the copolymer surfaces with a stretch at 2275 $cm^{-1}$ which is absent from the ketone surfaces. After immobilization, r-hirudin is deprotected to restore biomolecular activity, and its binding capacity is measured via a chromogenic substrate (S-2238) for thrombin. In this assay, surface-bound hirudin complexes thrombin, whereas free thrombin cleaves the chromogenic substrate. It can be seen in FIG. 24a that the absorbance is lower for amine-containing homopolymer PPX-$CH_2NH_2$ and the co-polymer PPX-$CH_2NH_2$/—$COCF_3$, as compared to control surface of stainless steel, indicating a higher amount of surface-bound hirudin on surfaces of PPX-$CH_2NH_2$ and PPX-$CH_2NH_2$/—$COCF_3$. Immobilized heparin is photometrically quantified using toluidine blue test. As the activity of surface-bound heparin increases, more dye complexes, leaving less dye in the solution, yielding a lower UV-absorbance. FIG. 24b shows that the absorbance/$cm^2$ is lowest for PPX-$COCF_3$ compared to the co-polymer PPX-$CH_2NH_2$/—$COCF_3$ and the stainless steel control, indicating a higher amount of heparin bound to PPX-$COCF_3$.

While these results demonstrate successful reactivity of the co-polymer towards both molecules, control of number of molecules immobilized to the surface can pose a challenge. Theoretically, the co-polymer contains half the number of active immobilization sites as does the homopolymer, although UV absorbance indicative of hirudin immobilization may not show as much increase in absorbance. This may be due to steric hindrances whereby immobilization of r-hirudin onto the $CH_2NH_2$ group results in masking of other $CH_2NH_2$ sites available for immobilization. As such, the ratio of immobilized biomolecules and/or drugs may be ascertained and altered as desired by for example changing the monomer ratios during polymerization and experimentally determining the extent of subsequent immobilized molecules in accordance with the present disclosure.

The present disclosure illustrates the versatility and activity of carbonyl-functionalized PPXs polymerized from functionalized PCPs. FTIR and XPS may be used to verify the compositions of these polymers, both within the bulk coating and at the surface. The carbonyl-functionalized polymers may also exhibit differences in crystallinity, which may be attributed to compositional changes of the functional group. These subtle changes may also result in altered cellular morphologies on surfaces coated with CVD polymers.

In addition, the present teachings include carbonyl-functionalized or substituted paracyclophanes copolymerized with amine-functionalized or substituted monomers. The resulting co-polymers possess mechanical integrity and are dually-reactive through the presence of the amine and carbonyl groups. FTIR spectra illustrate control over the co-polymer compositions (stoichiometry or ratio) based on the amount of precursor monomer(s) chosen, and show that the resulting polymer can be relatively homogeneous over several inches. In certain aspects, the co-polymer composition is directly related to the monomer sublimation temperatures; changing the sublimation temperature(s) affected relative sublimation rates. Co-polymers formed in accordance with these methods may be used as biomedical coatings, and can be characterized as illustrated herein by protein adsorption, cell adhesion, biocompatibility, and immobilization of model drugs, for example.

For the CVD polymerization to be successful, the initiation and propagation steps should be conducive to producing robust, functional polymer coatings. Less than optimum polymer films may result if, for example, monomer pyrolysis is incomplete. These effects apply to CVD polymerization in general, but can be even more pronounced in the case of CVD co-polymerization. For the polymer combinations used herein, parameters are determined that yield controlled polymer compositions. However, optimization may be performed on a case by case basis.

The present disclosure further provides compositions and methods relating to chemical vapor deposition polymerization of thin polymer films that have continuously changing chemical composition, including gradients of one or more functional groups and/or attached biomaterials. Formation of polymer gradients may include chemical vapor deposition (CVD) polymerization of substituted [2.2]paracyclophanes to prepare polymer coatings with identical backbone chemistries, but different functional groups, for example as depicted in FIG. 25. Copolymerization may include using two or more different [2.2]paracyclophanes to form a polymerized surface with fine-tuned composition ratios of the different monomer units. As such, the resulting continuous surface gradients may be used in biomaterials, cellular engineering, or biomimetic applications, for example. These embodiments may include polymers that have one or more gradients of one or more functional groups and/or biomaterials linked to these functional groups. Embodiments include those further described and characterized in Example 3.

In certain aspects, instead of a single-source CVD system, a polymerization chamber designed with two sources at a 180° angle may be used. In other embodiments, the polymerization chamber may include more than two sources where the inputs are angled relative to the desired gradient direction(s). In certain aspects, a compositional gradient for a first functionalized monomer is established along at least one direction or orientation with respect to the substrate, where the composition of the functional monomer varies in different spatial locations of the substrate. Such a direction can be defined along a major surface of substrate, for example in a direction corresponding to an x or y axis, or optionally in a z-direction (depth) from the substrate as the polymer is formed. In certain aspects, the compositional gradient may be defined across three-dimensional locations, thus corresponding to multiple directions or form various shapes in relation to the substrate (such as rectangular or spherical patterns) and may be formed by masking and patterning, if desired.

In certain aspects for example, three stream sources may be included that are introduced at about 1200 angle with respect to one another in the deposition chamber. Each source may independently provide different types of starting materials. Each respective stream may be sublimated to vapor at a distinct temperature during CVD copolymerization using multiple sources, each ring-constrained [2.2]paracyclophane is thermally converted into corresponding reactive monomer or quinodimethanes and transferred into the reaction chamber. Next, the reactive quinodimethanes monomers spontaneously copolymerize below a certain threshold temperature (typically about 40 to 60° C. depending on the chemical structure of the [2.2]paracyclophane). When the monomer flows over a substrate with a temperature below this threshold temperature, gradual depletion of the monomer from the gas phase occurs, resulting in a gradual decrease in polymer composition of the vapor phase. If two (or more) reactive monomers are deposited countercurrently to each other, each monomer's concentration should decrease with increasing distance from the respective source. As a consequence, the relative ratio of the components that make up the polymer film will form a continuously changing compositional gradient along one or more defined directions with respect to the substrate. In order for gradient deposition to occur in this manner, however, the mass transport properties of the various monomers should desirably allow for sufficient manipulation of gradient features (e.g., length, rate of change). Some process variables that may affect gradient formation include amount or mass of respective monomers, system pressure, argon flow rates, substrate temperature, sample height, and pyrolysis temperatures, for example.

Referring to FIG. 26, an embodiment of a system for gradient co-polymerization of functionalized [2,2]paracyclophanes constructed in accordance with the present disclosure is shown. FIG. 25 is a side-view schematic of a two-source CVD system. Each source consists of a quartz tube that passes through a 3-zone furnace and then connects into the deposition chamber. Both the tubes and the chamber together are held at about 0.16 Torr. Paracyclophanes (6) and (10) (having the respective structures shown in FIG. 26) sublimate, undergo pyrolysis, and then copolymerize to deposit on the sample holder. The specified process conditions create a poly (p-xylylene) (PPX) film possessing a functional compositional gradient.

In one example, synthesis may be conducted in a vacuum deposition chamber that accommodates a 12 inch diameter sample holder placed between the two distinct source inlets. In one example, starting material 4-trifluoroacetyl-[2.2]paracyclophane (6) is loaded into source 1, while 4-aminomethyl-[2.2]paracyclophane (10) is loaded into source 2. Pyrolysis temperatures of about 670° C. are used in both source systems. Under these conditions, paracyclophanes (6) and (10) are converted into the corresponding quinodimethanes (7) and (9). Deposition rates are adjusted by controlling the sublimation rates of starting materials (6) and (10), so that sublimation of each starts and finishes simultaneously after a 10-minute period. Rapid venting of the deposition chamber with argon after gradient deposition may effectively prevent over-deposition of one of the monomers, which could compromise the gradient quality. Gradient co-polymerization yields continuous polymer films with thicknesses varying between about 80-200 nm. Any thickness differences along the polymer gradient do not compromise the gradient reactivity.

Next, steady changes in the bulk composition across the polymer films are evaluated using a combination of surface analytical methods. Fourier transform infrared (FTIR) spectroscopy is used because of its ability to detect relative changes in characteristic bond vibrations. The trifluoroacetyl functional group of homopolymer (11) (shown in FIG. 30) results in characteristic vibrational modes at 1716 cm$^{-1}$ associated with the carbonyl group and at 1200, 1152, and 973 cm$^{-1}$ (C—F stretches). Aminomethyl groups can be associated with characteristic N—H and C—N signals at 3368, 3302, 1640, and 829 cm$^{-1}$, respectively. During gradient co-polymerization, gold substrates are placed at specific positions along the length of the sample holder, and the polymer coating was deposited using the two-source system shown in FIG. 26. Relative ratios of vibrational signal intensities associated with trifluoroacetyl and aminomethyl groups are determined for each substrate.

FIG. 27 shows IR spectra at various locations. Three samples (A, B, and C) are placed at various locations on a 12" diameter sample holder. Sample A is placed at the center of the sample holder, sample C is placed on the sample holder edge by source 2, and sample B is located midway between A and C. A detailed FTIR analysis of these samples reveals a transition from strong trifluoroacetyl signals to strong aminomethyl signals, most evident from the band vibrations at 973 and 829 cm$^{-1}$. Correlation between FTIR and X-ray photoelectron spectroscopy (XPS) data can provide determination of polymer compositions on the surface. Upon calibration using the FTIR method, sample point A is related to a molar ratio of 1:2 (PPX-CH$_2$—NH$_2$:PPX-COCF$_3$), sample point B corresponds to the equimolar ratio of the two building blocks, and sample point C is related to a 5:1 excess of PPX-CH$_2$—NH$_2$, at fixed flow rates of 6.5 sccm source A and 27 sccm source B. Differences in the chemical side groups of the starting materials can have an impact on the spreading of the resulting polymer films.

The FTIR study is complemented by X-ray photoelectron spectroscopy (XPS). XPS provides information about the polymer composition within the top 5-10 nm of a solid sample. XPS may be used in survey spectrum mode to study the composition of a film made by gradient co-polymerization on a silicon substrate. FIG. 28 shows the copolymer concentration profiles based on the XPS results. Fluorine and nitrogen are atoms that are selective for monomers (7) and (9), respectively. On the basis of these reporter atoms, relative surface ratios are calculated. Upon inspection of the surface composition, gradually changing concentrations are observed ranging from about 26% (12) at positions A (closest to source 1) to about 44% at position B, to about 86% at position C (closest to source 2). A detailed analysis on the basis of 13 data points along the trajectory between the two source inlets reveals a linear change in surface composition with distance 6 inches. The ability to predict surface compositions along the surface gradient solely on the basis of its location with an accuracy of R$^2$=0.95, can be important in the performance and modification of the process.

To confirm that amino and trifluoroacetyl groups are available at the surface in the expected ratios, the polymer gradients may be reacted with two fluorescence-based reporter reactants having orthogonal reactivity. Model surface reactions may be employed, including the following examples. First, Atto 655 NHS ester is reacted with the primary amines of (8) followed by reaction of the trifluoroacetyl groups of (8) with biotin hydrazide to form the corresponding hydrazones. Rhodamine-linked streptavidin may then be used to visualize biotin attachment.

FIG. 29 shows a fluorescence scanning image and normalized fluorescence profiles for a surface gradient, which is reacted with the two fluorescent dyes. To obtain fluorescence profiles, actual fluorescence values within areas of ligand immobilization are divided by the polymer background fluorescence. As the concentration changes across the substrate, so does the ratio of fluorescence intensities. The fluorescence gradient changes linearly and corresponds well with the surface composition ratios obtained by XPS. This is important, because XPS provides information that averages over the outermost 5 to 10 nm, while the fluorescence titration only reflects chemical groups available at the surface; additional illustrative data is shown in FIG. 30. Thus, the gradient surfaces not only have well predictable surface compositional gradients, but these gradients also correspond to a gradual change in surface reactivity.

Finally, an example of a specific application, use of surface gradients for combinatorial biological discovery, is used to assess properties of these novel multifunctional materials having compositional gradients. Human umbilical vein endothelial cells (HUVECs) are cultured on a CVD gradient surface. Initially a suitable model system for cell adhesion studies, polymer films made of either 100% polymer (11) or (12) are qualified on the basis of cell adhesion. This indicates that films made from amino-functionalized paracyclophane (10) are conducive to cell adhesion, while films made from trifluoroacetyl-functionalized paracyclophane (6) did not support cell adhesion. Because a relatively small change in the chemical composition, i.e., transition in side group chemistry from aminomethyl to trifluoroacetyl, can have a profound biological impact, this system appeared to be well suited for studying the influence of gradient surfaces in a discovery-type approach.

Surface gradients are prepared in the same manner described for the fluorescence analysis and are seeded with HUVECs for 48 hours in 13 isolated spots along the surface gradients. In order to evaluate the surface composition for each of the isolated spots, identical samples are reacted with two fluorescence dyes using the protocol as described. The excellent agreement between fluorescence data and chemical composition as determined by XPS enabled determination of the average surface composition for each spot.

The x-axis shown in FIG. 30 illustrates a typical transition of the reacted fluorescent dyes on the surface. Composition of a typical gradient surface ranged from about 22% (spot 1) to about 95% (spot 13) of the aminomethyl-containing repetition unit.

Next, the morphology of the adherent cells is analyzed for each spot by fluorescent staining of actin cytoskeleton and vinculin. The later indicates the presence of focal adhesion contacts. As shown in FIG. 30, the cell surface area and adhesion increase as the surface concentration of aminomethyl functionality (12) increases. In areas of high concentration of (11) (trifluoroacetyl), cells tend to clump and adhere near or on top of other cells, in order to avoid contact with the substrate.

In FIG. 30, images of the first 3 locations with surface compositions below about 31% reveal roughly equal surface areas for actin- and vinculin-stained cell features. At a surface composition of about 40% aminomethyl-functionalized building blocks, the actin fibers extend beyond the cellular regions that contain vinculin. With increasing ratio of amino-functionalized building blocks, the HUVECs characteristic stretching continues to increase and gradually adapts a scenario that is very similar to pure amino-functionalized coating (12). The overall footprint of HUVECs increased gradually with increasing contributions of the amino group and peaks for the about 95% amino-functionalized reference surfaces. While HUVEC morphologies differ greatly between the two homopolymer surfaces (0% and 100%), a gradual transition can be observed, and cell morphologies can be refined and manipulated by solely changing the surface ratios of the components in the polymeric coatings.

The present disclosure therefore further provides a process for the fabrication of polymer thin films having continuous, reactive compositional gradients. These poly(p-xylylene) coatings may have a uniform polymeric backbone with functional side groups present at the surface. The film may possess a compositional gradient with respect to two or more reactive side groups, allowing manipulation and control of the polymeric film's physical and/or chemical properties independent of the backbone. The compositional gradient is optionally present within the bulk film and/or also at the surface, and can be readily ascertained using FTIR and XPS. One or more fluorescently-labeled ligands may be immobilized onto the reactive polymer gradient(s). Also, CVD gradients may be used to probe for cellular morphologies, with respect to a wide range of surface concentrations. Not only is CVD polymerization conformal over complex geometries, but the deposition can occur over various substrate materials. Because of the orthogonality of the chemical groups, one or more different ligands may be immobilized to form a surface gradient.

Furthermore, CVD compositional gradients are not limited to the examples of the two monomer functionalities described. A range of different functionalities including alcohols, amines, ketones, esters, alkynes, and aldehydes may be incorporated into these coatings. One may create a gradient of virtually any functionality simply by modifying the paracyclophane precursor(s) with the appropriate functional group(s). In addition, one could also adapt the CVD system to accommodate a third source (and fourth, etc.), for the ability to produce ternary gradients, including polymers with multiple gradient directionalities. CVD compositional gradients may be used to resolve many common setbacks and limitations of previous methods. Embodiments of these polymer coatings have applications in scaffold engineering, microbiological studies, and combinatorial screening, for example.

In other aspects, the present disclosure provides methods of controlling a ratio of distinct monomers in a polymeric film. Such a method includes sublimating and activating a first paracyclophane monomer and a second paracyclophane monomer to generate a first stream having a first amount of the first paracyclophane monomer and to generate a second stream having a second amount of the second paracyclophane monomer. The process conditions are controlled in such a manner during sublimation and activation/pyrolysis so as to control a preselected or predetermined amount of the first monomer and of the second monomer in the polymer film that is formed on a substrate in a deposition chamber. In this manner, the method provides the ability to form a CVD polymeric film having a predetermined ratio of the first monomer to the second monomer (or other additional monomers when present).

In certain aspects, the method includes sublimating a first paracyclophane monomer at a first temperature in a first stream and sublimating a second paracyclophane monomer at a second temperature in a second stream. At least one of the first and second paracyclophane monomers is a substituted paracyclophane and the first paracyclophane is distinct from the second paracyclophane. Furthermore, the first and second temperatures are distinct from one another. At least a portion of the respective first and second paracyclophane monomers are pyrolyzed in the first and second streams to generate first and second reactive monomers. The method also includes introducing a first amount of the first reactive monomer and a second amount of the second reactive monomer to a deposition chamber comprising a substrate, where the first reactive monomer and the second reactive monomer polymerize on the substrate to form the polymeric film having the predetermined and controlled ratios related to the first and second amounts of the respective first and second reactive monomers contained therein.

In certain aspects, the introducing further includes controlling a flow rate of at least one of the first or second streams to provide the first or second amount resulting that relate to the polymer film composition. Similarly, in other aspects, the introducing further includes controlling a concentration of at least one of the first reactive monomer in the first stream or the second reactive monomer in the second stream to provide the first or second amount, again related to the desired polymer film composition. In this regard, the present teachings desirably provide controlled stoichiometry and ratios of multiple functional monomers as they polymerize with one another to form a polymer film.

Various embodiments of the invention can be further understood by the specific examples contained herein. Specific examples are provided for illustrative purposes of how to make and use the compositions and methods of this invention and, unless explicitly stated otherwise, are not intended to be a representation that given embodiments of this invention have, or have not, been made or tested.

EXAMPLE 1

Figure 1B:
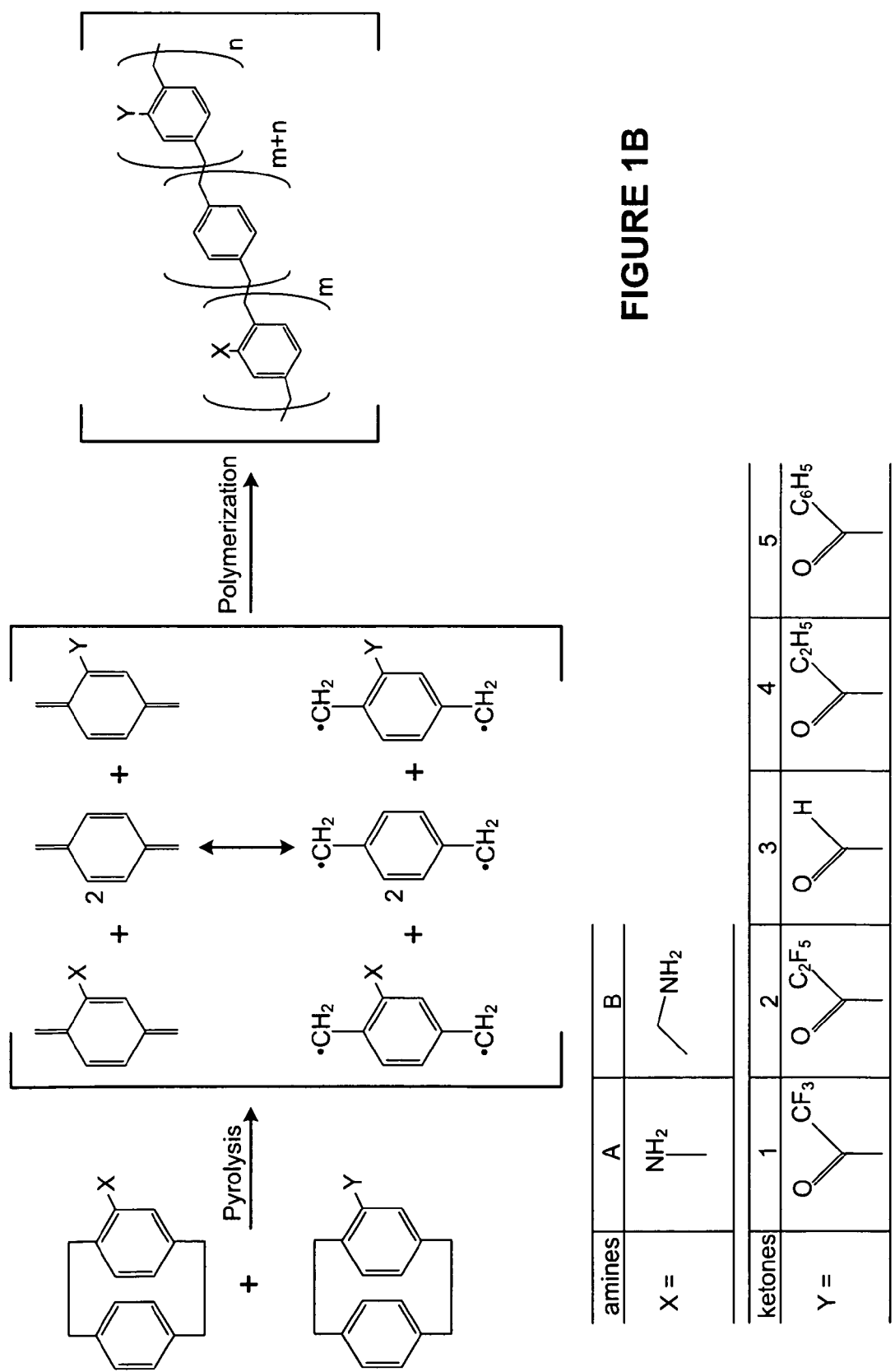
Figure 1C:
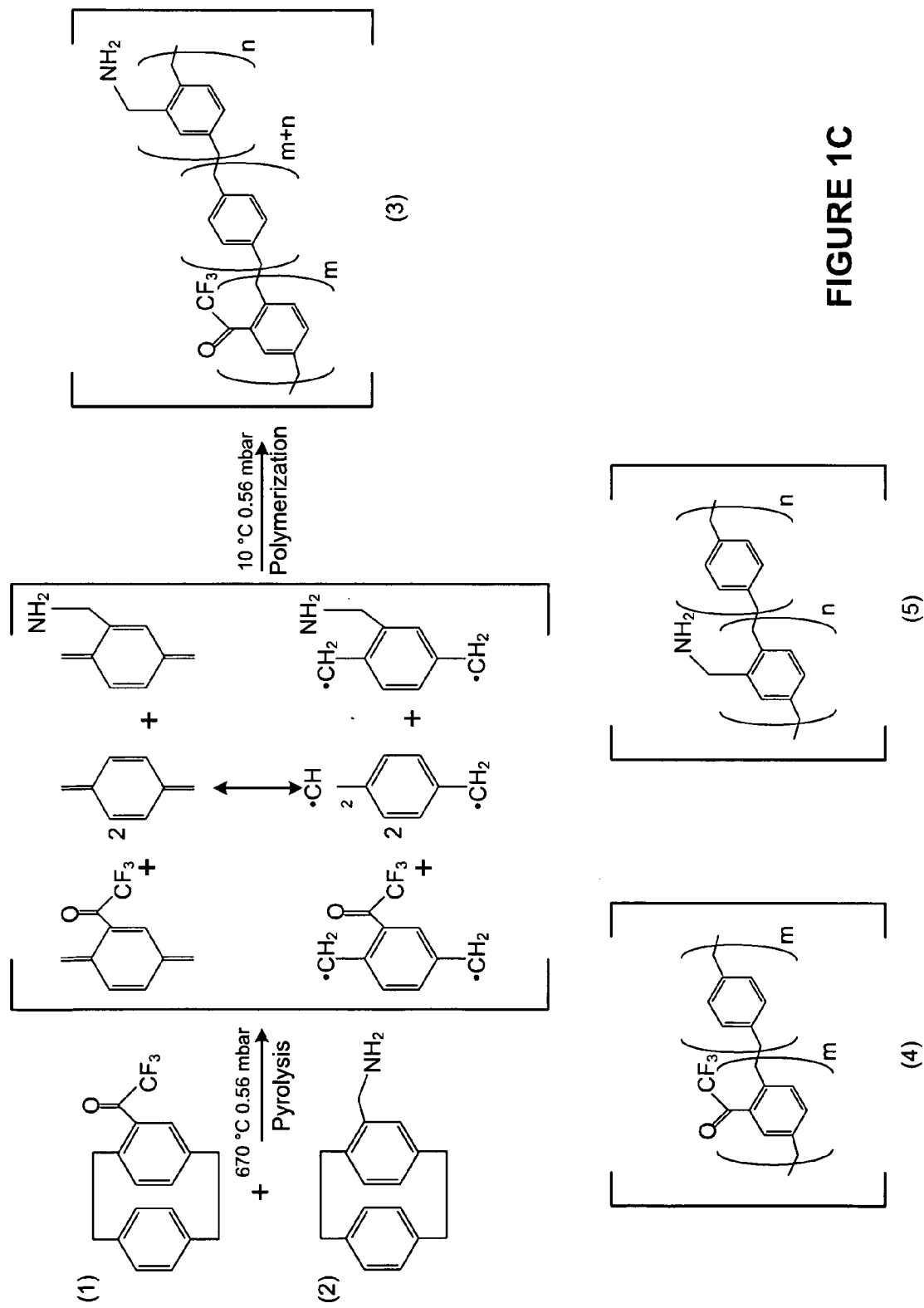

With reference to FIGS. 1A, 1B, and 1C, CVD copolymerization may include the following. 4-Aminomethyl[2,2]paracyclophane is synthesized from [2.2]paracyclophane (commercially available from Aldrich) in a two-step synthesis as described in Rozenberg, et al., *Eur. J. Org. Chem.*, p. 432 (2003), incorporated herein by reference in its entirety. 4-Trifluoroacetyl [2,2]paracyclophane is synthesized via Friedel-Crafts acylation of [2,2]paracyclophane. CVD co-polymerization is performed using molar mixtures of (1) and (2) (for the 1:1 feed ratio, 38.0 µmol each is used). To independently control each source independently, the two species are kept in separate feed dishes within the sublimation zone. A pressure of about 0.56 mbar and a temperature between about 90 and 100° C. are employed for CVD co-polymerization. Under these conditions, the species sublimates and is transferred in a stream of argon carrier gas (20 sccm) to the pyrolysis zone (670° C.). Following pyrolysis, the diradicals are transferred into the deposition chamber, where polymerization occurs. While the wall temperature is adjusted to about 120° C., the silicon, gold, or glass substrates are cooled to about 10° C. to optimize the deposition onto the substrate and to avoid loss of starting material due to wall deposition. Moreover, rotation of the sample holder ensures uniform film deposition. For co-polymerization of varying molar feed ratios, all reaction conditions are maintained with the exception of the adjusted ratio of the two starting materials. XPS composition of a co-polymer with a 1:1 molar feed ratio: $C_{1s}$:83.26% (calc. 84.76%), $N_{1s}$: 2.84% (calc. 3.05%), $F_{1s}$: 8.54% (calc. 9.15%), $O_{1s}$: 5.35% (calc. 3.05%); IR (grazing angle 85°): 3361.5, 3301.1, 3007.9, 2926.1, 2860.4, 1715.7, 1641.2, 1499.9, 1454.3, 1227.2, 1202.0, 1152.4, 976.9, 837.8 cm$^{-1}$.

With reference to FIGS. 2A, 2B, 3, and 4, surface characterization by XRD and FTIR may include the following. To assess the crystallinity of functionalized poly(p-xylylene) films, such as that shown in FIG. 4, silicon substrates coated with the polymer of interest are examined by wide-angle X-ray diffraction, using a Rigaku 12 kW high intensity rotary anode generator. All CVD films are examined both as deposited and after annealing. The polymer films are annealed for 14 hours in an oven at a temperature of 120° C., unless specified otherwise.

X-ray photoelectron spectroscopy (XPS) data, such as shown in FIGS. 2A and 2B, are recorded on an Axis Ultra X-ray photoelectron spectrometer (Kratos Analyticals, UK) equipped with a monochromatized AlKα X-ray source. All spectra are calibrated with respect to the non-functionalized aliphatic carbon with a binding energy of 285.0 eV. For XPS imaging, the lens mode is in hybrid, pass energy is set to 160.0 eV, and the aperture is 600 µm×600 µm for all imaging acquisitions. Thicknesses are recorded at a wavelength of 532 nm using an EP$^3$—SW imaging ellipsometry (Nanofilm Technologie GmbH, Germany). Both, nulling (four zones) and mapping experiments are performed at an angle of incident of 600, and an anisotropic Cauchy model is used to model the ellipsometric parameters psi and delta. Infrared spectroscopy is performed on a Nicolet 6700 spectrometer utilizing the grazing angle accessory (Smart SAGA) at a grazing angle of 85°.

Figure 5:
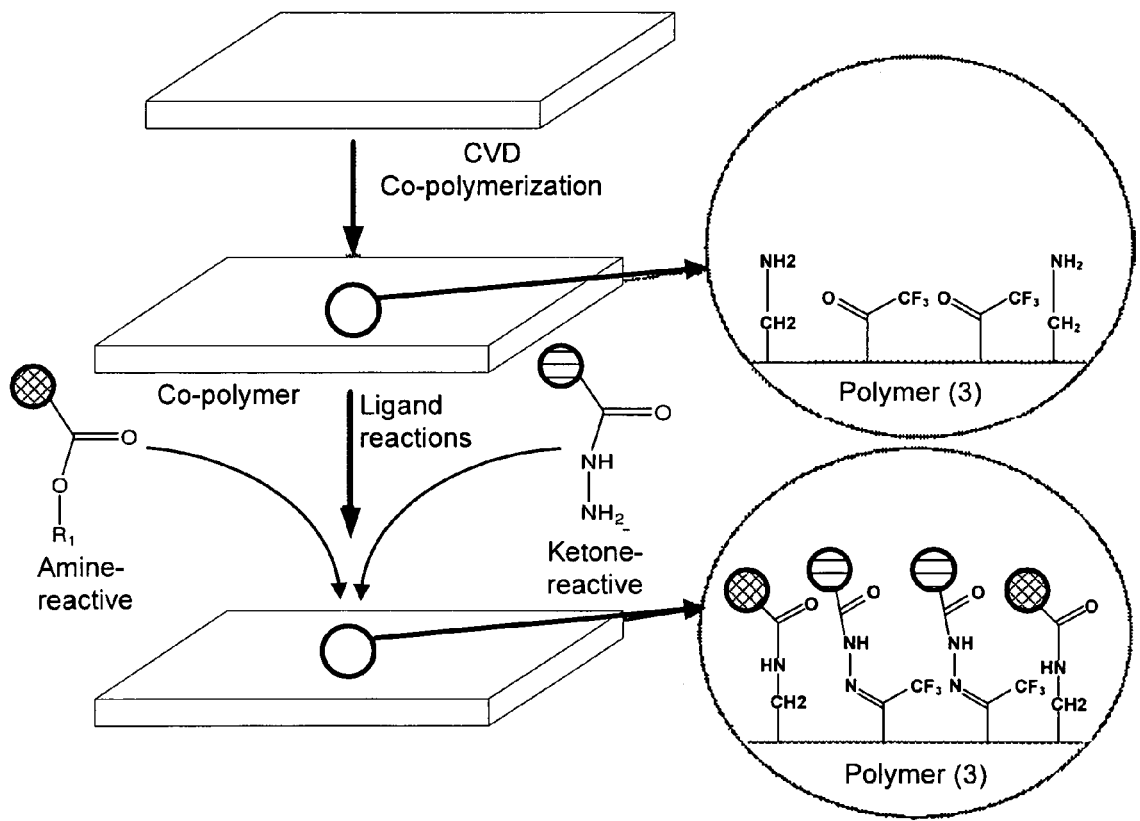

With reference to FIGS. 5 and 6, surface reaction may include the following. Biotin hydrazide and rhodamine-linked streptavidin are from Pierce Inc. (Rockford, Ill.), and Atto 655 NHS ester is from Sigma Aldrich (St. Louis, Mo.). All surface reaction experiments are performed on glass substrates for individual polymers (4) and (5) as well as on different ratios of co-polymer (3). As a control, amine and ketone-reactive ligands are applied separately to each polymer. For surface reaction, 1.7 µL of reaction buffer is dispensed onto the film, incubated, and rinsed several times. For the co-polymers, consecutive surface reactions are conducted. Fluorescence images and intensities are acquired using a GenePix 4000B scanner with 532 nm (17 mW) and 635 nm (10 mW) lasers. Both excitation wavelengths are scanned simultaneously at 20 µm spatial resolution. Colors shown in the scanning images are not true colors, but were set for better resolution.

Ligand 1: 0.5 ml of anhydrous dimethylformamide was added to 1 mg Atto 655 NHS ester. From this, 3.6 µl is diluted with 2 ml 0.1 M sodium bicarbonate buffer (pH 8.3), containing 0.02% (v/v) Tween 20. NHS esters are time-sensitive in aqueous solution, so the buffer is applied to the film immediately upon dilution. The solution is incubated for 1 hour at room temperature, after which the surface is rinsed with ethanol for 5 minutes and with PBS/Tween solution for 30 minutes.

Ligand 2: Biotin hydrazide is diluted to 10 mM in phosphate buffered saline (PBS pH 7.4). The solution is gently heated and acid-catalyzed prior to surface application. Incubation time is about 5 to 7 minutes, which is followed by a wash of PBS containing 0.02% (v/v) Tween 20. The area is then applied with rhodamine-linked streptavidin solution (0.075 mg/ml in PBS; 0.02% (v/v) Tween 20; 0.1% (w/v) bovine serum albumin) for 10 minutes. Finally, the entire glass slide is immersed for 1 hour in a PBS/Tween/BSA solution.

In another aspect of the disclosure, a multifunctional copolymer system is used in conjunction with live human and bacterial cells. In certain aspects, the polymer system is optionally formed by the reaction mechanism set forth in FIG. 1B, showing a process of making poly (p-xylylene) thin films via CVD. One advantage of the teachings of the present disclosure is that such films provide the ability to screen many combinations of derivates for a particular response to an external stimulus.

Figure 7:
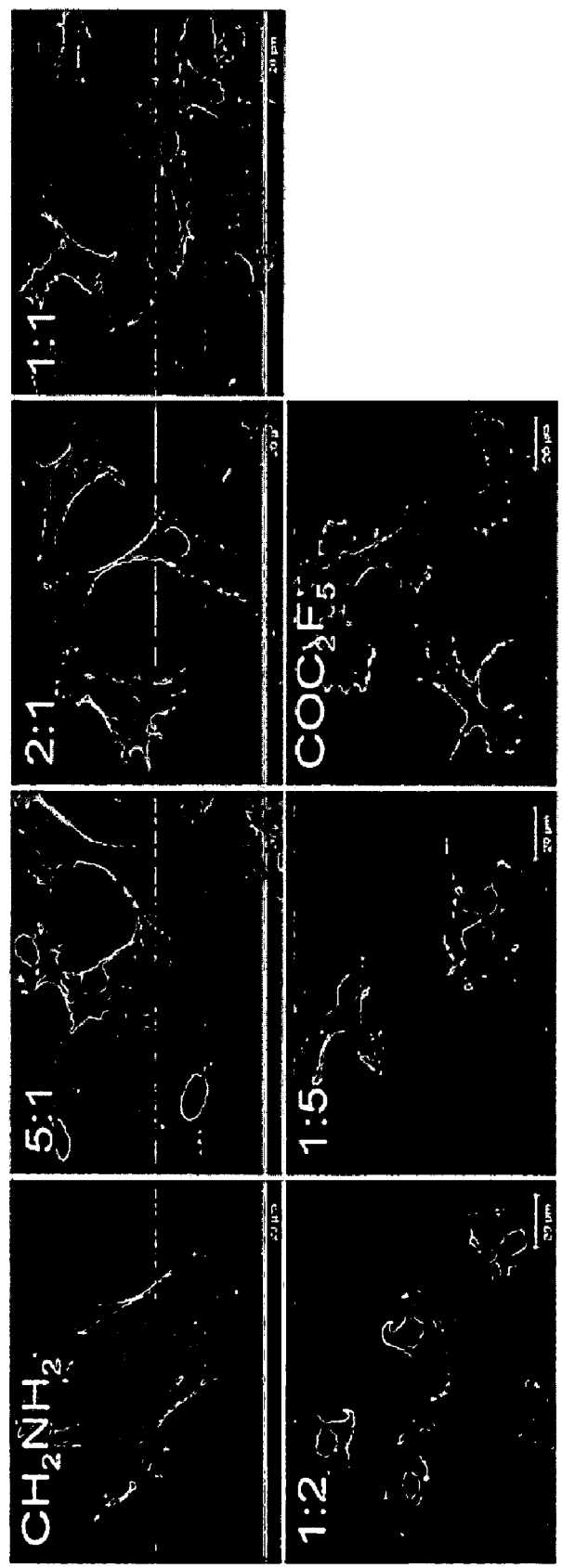
FIG. 7 shows confocal microscopy images of human umbilical vein endothelial cells (HUVECs) grown on CVD-deposited copolymers having various ratios of monomers having the functional groups $CH_2NH_2$ and $COC_2F_3$, where a gradual decrease in cytoskeleton stability appears to occur with increasing amount of functionalized poly-p-xylylenes (PPX) PPX-$COC_2F_5$.
Figure 8:
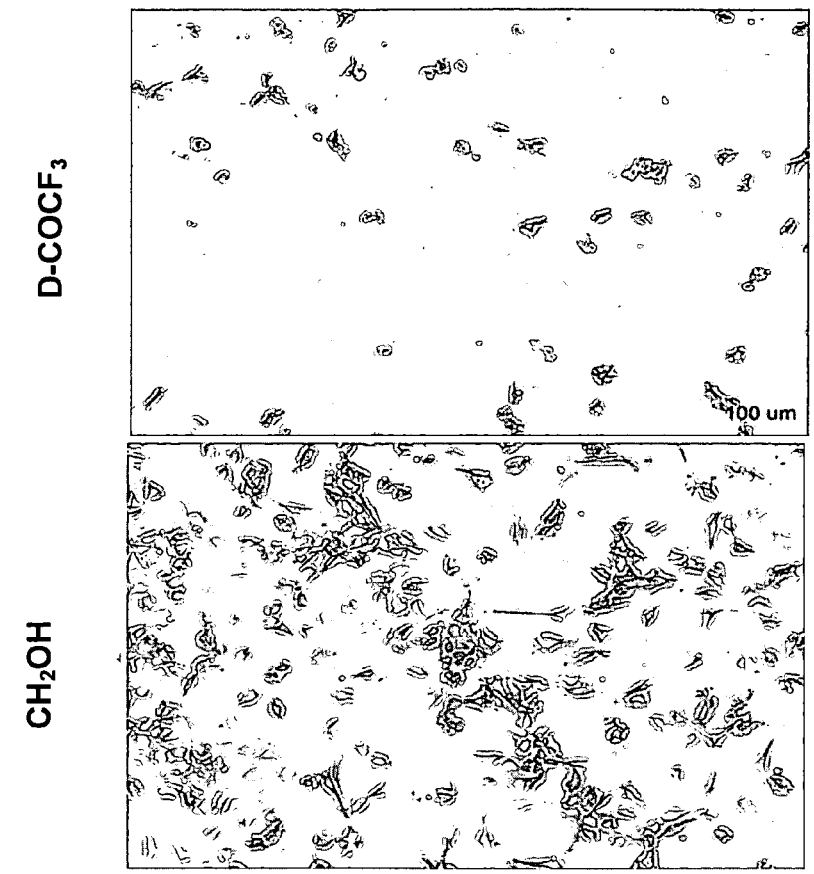
FIG. 8 shows optical microscopy images showing cell counts of HUVECs grown on copolymers having PPX-D-$COCF_3$ and PPX-$CH_2$—OH monomers.

With reference to FIGS. 7 and 8, cell interaction with the polymer may include the following. Human umbilical vein endothelial cells (HUVECS) can be used to determine response to various poly(p-xylylene)(PPX) copolymer films. After cell growth, the cytoskeleton is fluorescently labeled red, vinculin is labeled green, and the nucleus is labeled blue. HUVEC stability and proliferation are sensitive to surface charge, contact angle, and surface density of the surface functional groups. FIG. 7 shows initial screening results. The cells appear to be spread out more on the aminomethyl functionalized PPX ($CH_2NH_2$), whereas the pentafluoropropyl ketone PPX (COC$_2$F$_5$) produced cells appear to be shriveled and adhere weakly to the surface. Vinculin is an indicatory of cell adhesion and vinculin decreases significantly as the amount of COC$_2$F$_5$ is increased. Thus, controlling the CVD copolymer ratios permits manipulation of cell morphology and the degree of adhesion.

In other aspects, HUVECs are grown on certain homopolymers to test selectivity. One polymer is relatively hydrophilic and lacking a surface charge, while the other is chlorinated and has hydrophobic groups attached to it. The optical microscopy image in FIG. 8 shows that the cell count is significantly different between these two homopolymers. Differences in cell count are also observed, as well as some differences in morphology. Also, the hydrophilicity of PPX-CH$_2$—OH does not appear to have a negative effect on cell proliferation, likely due to the hydrophobic PPX backbone.

Figure 9:
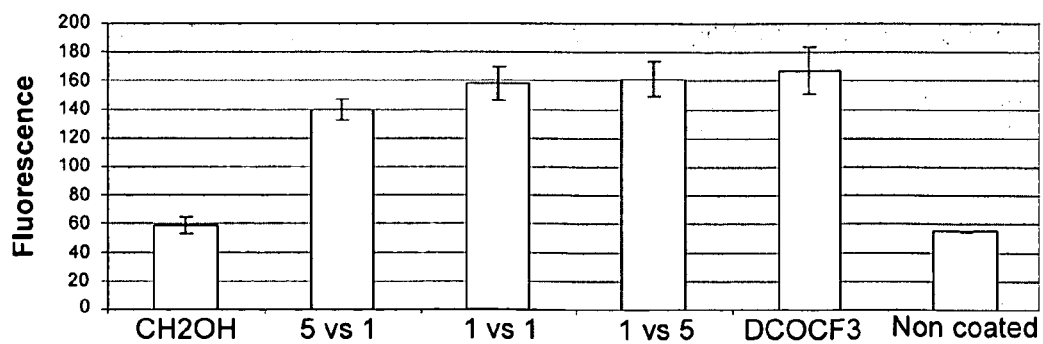
FIG. 9 shows a quantification of *E. coli* colony formation on ratios of two PPX derivates, using fluorescence labeling, where concentration appears to be non-linear.

With reference to FIG. 9, bacteria interaction with the polymer may include the following. With these same homopolymer derivatives, surfaces are further assessed for bacterial proliferation and attachment. Specifically, *Escherichia coli* is seeded and allowed to incubate over the various PPX homopolymers and copolymers. FIG. 9 shows results for the *E. coli* colony count, via fluorescence tagging. First, there is a distinct difference between the pure PPX-CH$_2$—OH functionality and the pure PPX-D-COCF$_3$ homopolymers. Second, although there is a change with respect to monomer ratio, the change appears to occur rather suddenly, close to the concentrations that are dominant in PPX-CH$_2$—OH. Thus, *E. coli* colony formation appears to be non-linear with respect to concentration. While not limiting the present disclosure to any particular theory, this may suggest that the effect of hydrophobic groups is strong with respect to bacterial attachment. Furthermore, it also may suggest that small concentration changes within that interval are important for control over the cell growth.

Thus, multifunctional polymer coatings according to the present teachings are useful in conjunction with living cells. By controlling a ratio of a first moiety having a first functional group and a second moiety having a second and distinct functional group within the polymer composition before the CVD process, different morphologies, cell counts, and adhesion strengths can be obtained and controlled via the resulting coated surface.

EXAMPLE 2

With reference to FIGS. 10, 11, and 12, polymer syntheses may include the following. Monomer Synthesis. 4-Aminomethyl-[2.2]paracyclophane is from Uniglobe Kisco, Inc. (White Plains, N.Y.). 4-Amino-[2.2]paracyclophane is synthesized from [2.2]paracyclophane using an established synthesis route, as described in J. Lahann, H. Hocker, R. Langer, Angew. Chem. Int. Ed. 2001, 40, 726, which is incorporated herein by reference. All carbonyl-functionalized PCPs are synthesized by Friedel-Crafts acylation of commercially available [2.2]paracyclophane (Uniglobe Kisco) as described in J. Lahann, R. Langer, Macromolecules 2002, 35, 4380; H. Nandivada, H. Y. Chen, L. Bondarenko, J. Lahann, Angew. Chem. Int. Ed. 2006, 45, 3360; X. Jiang, H. Y. Chen, G. Galvan, M. Yoshida, J. Lahann, Adv. Func. Mater. 2008, 18, 27; J. Lahann, M. Balcells, T. Rodon, J. Lee, I. S. Choi, K. F. Jensen, R. Langer, Langmuir 2002, 18, 3632; and J. Lahann, R. Langer, Macromol. Rapid Commun. 2001, 22, 968, which are all incorporated herein by reference. All synthesized monomers are purified by column chromatography prior to CVD polymerization, and characterized by nuclear magnetic resonance spectroscopy (NMR), mass spectrometry (MS) and Fourier Transform infrared spectroscopy (FTIR).

CVD Polymerization. All polymer coatings are synthesized using a custom-built chemical vapor deposition system, as described in J. Lahann, Polym. Int. 2006, 55, 1361, and which is incorporated herein by reference. For CVD polymerization, a total of 20-30 mg of either one or two different functionalized [2.2]paracyclophane(s) was used. For co-polymerization, the molar ratios of amino-functionalized (—NH$_2$, —CH$_2$NH$_2$) and carbonyl-functionalized (—COC$_6$H$_5$, —COC$_2$H$_5$, —COC$_2$F$_5$, —COCF$_3$) PCPs (as shown in FIG. 12) are varied to yield a previously specified target ratio of functional groups of the CVD coatings. To account for differences in the sublimation temperatures between different PCPs, charges of starting material are loaded individually into magnetically movable glass dishes. For CVD co-polymerization, the working pressure was about 0.28 Torr and sublimation temperatures varied between about 90 and 100° C. For different functionalized PCPs, the pyrolysis temperature changes with respect to the functionality. PCP-COC$_6$H$_5$ is activated at a pyrolysis temperature of about 800° C. in order for polymerization to occur, whereas all other monomers are cleaved at about 670° C. Preparation of co-polymers (—COC$_6$H$_5$/—NH$_2$ and —COC$_6$H$_5$/—CH$_2$NH$_2$ require a pyrolysis temperature of 730° C. All other co-polymers utilized a pyrolysis temperature of about 670° C. Silicon, gold, stainless steel, or glass substrates are placed on a cooled sample holder (about 15° C.; unless stated otherwise) for polymer deposition. Rotation of the sample holder may ensure more uniform film deposition. For co-polymerization of varying molar feed ratios within one subgroup, all reaction conditions are maintained with the exception of the adjusted ratio of the two starting materials.

With reference to FIGS. 13 and 14, surface characterization may include the following. X-ray photoelectron spectroscopy (XPS) data are recorded on an Axis Ultra X-ray photoelectron spectrometer (Kratos Analyticals, UK) equipped with a monochromatized AlKα X-ray source. All spectra are calibrated with respect to the non-functionalized aliphatic carbon with a binding energy of 285.0 eV. Coating thicknesses are recorded at a wavelength of 532 nm using EP$^3$—SW imaging ellipsometry (Nanofilm Technologie GmbH, Germany). Both nulling (four zones) and mapping experiments are performed at an angle of incident of 600, and an anisotropic Cauchy model is used to model the ellipsometric parameters psi and delta. FTIR is performed on a Nicolet 6700 spectrometer utilizing the grazing angle accessory (Smart SAGA, Thermo) at a grazing angle of 85°.

X-ray Diffraction (XRD). To assess the crystallinity of functionalized PPX films, silicon substrates coated with the polymer of interest are examined by wide-angle XRD, using a Rigaku 12 kW high intensity rotary anode generator. All CVD films are examined both as deposited and after annealing. Prior to analysis, the polymer films are annealed for about 14 hours in an oven at a temperature of about 120° C.

Enzyme Linked Immunosorbent Assay (ELISA). Nunc 96 well plates and CVD-coated stainless steel disks placed in 24 well plates are coated with varying concentrations of human fibrinogen (Calbiochem) diluted in Dulbecco's PBS overnight at 4° C. Surfaces are blocked (1% BSA in Dulbecco's PBS 25° C., 1 hr), incubated with primary antibody (anti-human fibrinogen, rabbit Calbiochem; 1:8,000) in wash buffer (0.5% Tween20 in Dulbecco's PBS) for 1 hr at 25° C., washed, and incubated with secondary antibody (goat anti-rabbit IgG H&L chain, peroxidase conjugate, Calbiochem, 1:10,000) in wash buffer for 1 hr at 25° C. Upon washing, the surfaces are incubated with 2,2'-azino-bis-(3-ethylbenzthiazoline-6-sulfonic acid) (ABTS) for 20 min at 25° C. The enzymatic reaction is terminated with a 0.5M $H_2SO_4$ stop solution and analyzed by absorbance measurement at 405 nm.

Growth of HUVECs and NIH3T3s on CVD-coated surfaces. Human umbilical vein endothelial cells (HUVECs) (Cambrex, Walkersville, Md.) or murine fibroblasts (NIH 3T3s) (ATCC, Manassas, Va.) are cultured in tissue culture-treated polystyrene (TCPS) flasks (Corning), maintained at 37° C. in a humidified atmosphere of 5% $CO_2$, and media replaced every other day until ~80% confluency was reached.

Functionalized PPX polymers and co-polymers are deposited on 18 mm, No. 1 glass cover slips. Polymer-coated cover slips were placed in sterile 12-well plates and incubated in Endothelial Growth Medium (Cambrex) prior to addition of cells. HUVECs are suspended at a density of $1\times10^5$/ml, and added at 1 ml/well. Phase contrast micrographs are taken at 2 hrs and 24 hrs post-seeding. At 24 hrs post-seeding, substrates with adherent cells are processed for immunocytochemistry. Samples are fixed and permeabilized (4% paraformaldehyde, 0.5% TritonX-100 in Dulbecco's PBS) for 15 min, blocked (1% BSA) for 30 min, and stained with a primary antibody (1:400 anti-vinculin, Sigma, 1:400). Upon washing, cells are blocked (5% normal goat serum, (Zymed)) then stained with secondary antibody (Alexa Fluor 488-conjugated goat anti-mouse IgG1 (Invitrogen)), followed by rhodamine-conjugated phalloidin (Invitrogen). Finally, samples are mounted with Prolong Gold with DAPI (Invitrogen) for analysis by confocal microscopy.

NIH3T3s are grown on CVD-coated stainless steel disks or PVC films at a density of $7.5\times10^4$/ml in 24 well plates. All substrates are UV-sterilized for 30 min prior to addition of cells. After 24 hrs in culture, substrates are fixed and permeabilized, then stained with rhodamine-conjugated phalloidin and Hoechst 33342 (Invitrogen). Substrates are mounted on cover slips with Prolong Gold, and imaged by confocal microscopy. All fluorescently-labeled cells are visualized using a Zeiss LSM 510 confocal microscope at the Microscopy & Image Analysis Laboratory of the University of Michigan.

Figure 21:
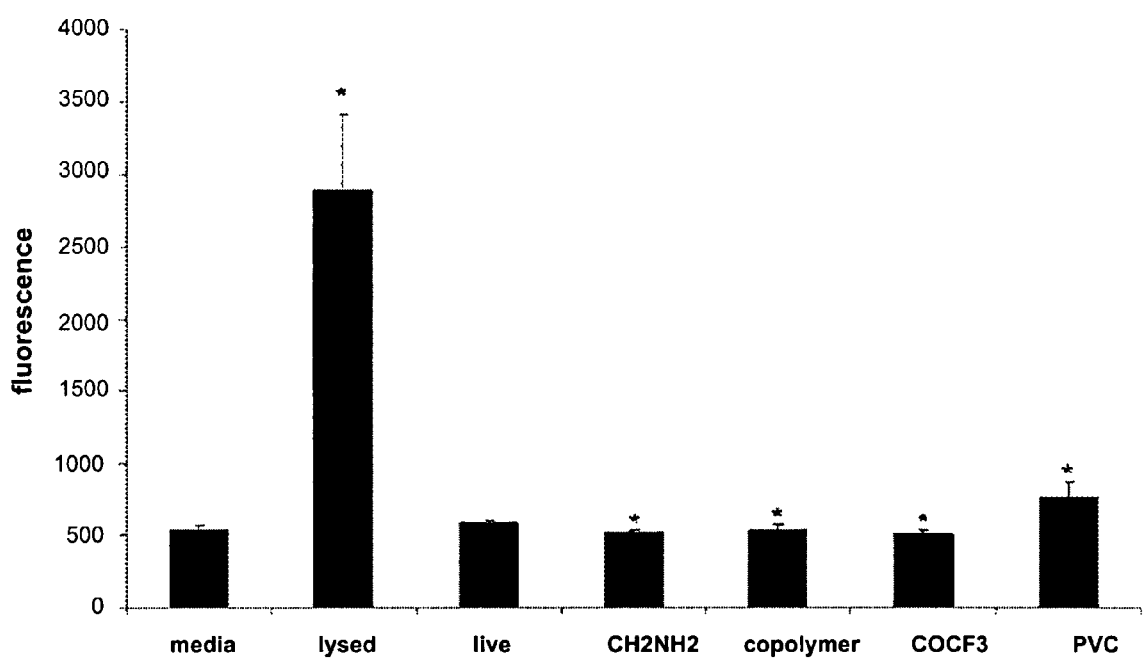
FIG. 21 illustrates G6PD release from NIH 3T3s grown on various substrates; fluorescence values are reported; results are compared G6PD measured in media supporting live cells; with n=3, *: p<0.05.

With reference to FIG. 21, cell lysis analysis may include the following. Glucose 6-phosphatase Dehydrogenase (G6PD) Release. Upon culturing NIH3T3 cells on bare or CVD-coated stainless steel disks for 24 hrs, cell culture media is collected and cleared by centrifugation at 1200 rpm for 5 min. Growth media alone or media from cells grown on TCPS, or that from lysed cells (0.1% TritonX-100 for 5 min) are used as controls. Cleared media are analyzed for G6PD content by Vybrant Cytotoxicity Assay Kit (Molecular Probes) per manufacturer's directions. Fluorescence values (ex/em: 544/590) are recorded every 5 min after addition of 2× resazurin reaction mixture to the well at 37° C. For statistical analysis, results from all surfaces are compared to those of live cells grown on TCPS, using $p<0.01$.

Statistical Analysis. Statistical analysis is performed using a general linear model ANOVA with Minitab software (Version 13.20, Minitab, State College, Pa., USA). Unless otherwise indicated, p-values of 0.05 are considered significant. Experiments are repeated as indicated.

With reference to FIG. 23, reaction kinetic analyses may include the following. NMR Studies. Carbonyl-functionalized p-xylenes are synthesized following an approach only slightly modified from the synthetic procedures described for the corresponding PCPs. Model reactions of the carbonyl groups with hexanoic hydrazide are performed in an NMR tube and sequence of $^1$H NMR (Varian Inova, 400 MHz) spectra is collected in real-time as the reaction progressed. Prior to starting the reaction, a base $^1$H NMR spectrum is taken as a reference spectrum. A slight excess of hexanoic hydrazide (1.1 equivalents) is dissolved in deuterated ethyl alcohol, and the functionalized p-xylene is added. Next, acetic acid is added to initiate the reaction, and data acquisition is started immediately after the sample is placed in the NMR spectrometer. NMR spectra are acquired every 7 minutes for two hours. A final measurement is taken after 12 hrs.

With reference to FIG. 24, analyses of attachment of biomaterials to polymer functional groups may include the following. r-Hirudin Immobilization and Binding Assay. CVD-coated surfaces are incubated with hexamethylene diisocyanate (HDI) (1:10 w/w in absolute diethyl ether) for 24 hrs in argon atmosphere. The surfaces are then washed using soxhlet extraction in absolute diethyl ether for 6 hrs and dried under vacuum. Hirudin is immobilized by incubating the surfaces with an N-terminal protected hirudin (500 nmol/ml in water) at 4° C. for 24 hrs. The surfaces are washed extensively using wash buffer (PBS containing 0.1% Tween-20). The protecting group is cleaved by exposing the surface to piperidine solution (10% in DI-water) at 0° C. for 3 hrs, and substrates are washed rigorously. Hirudin binding is measured via an amidolytic assay (chromogenic assay) for thrombin. The surfaces are incubated with thrombin solution (20 U/ml in PBS, pH 7.4, Sigma-Aldrich, MO) for 30 min at 25° C., to which thrombin-active chromogenic substrate (S-2238, 1 mmol/L in DI-water; DiaPharma Group Inc., OH) is added. The reaction is stopped after 120 s with acetic acid (20%), and the resulting colored solution is transferred to cuvettes for UV absorption reading at 405 nm.

Heparin Immobilization and Binding Assay. CVD-coated substrates are incubated with a 500 mM solution of adipic acid dihydrazide (Sigma-Aldrich, MO) in PBS for 24 h. The substrates are then washed with wash buffer (PBS with 0.1% Tween20). These hydrazide-functionalized substrates are immersed in heparin solution (1 mg/ml in water, Sigma-Aldrich, MO) overnight at 50° C. The surfaces are then washed with the wash buffer and finally rinsed with water. To quantify heparin immobilization, 1 ml of Toluidine blue (0.0005%, Sigma-Aldrich, MO) is placed with the heparin-modified surface and shaken vigorously, and 1 mL of n-hexane is added to this mixture. After the organic layer (containing the heparin-toluidine blue complex) is removed, the absorbance of the aqueous layer is measured by UV spectrophotometry at 631 nm.

EXAMPLE 3

With reference to FIGS. 25 and 26, CVD copolymerization may include the following. Depositions are carried out in a chemical vapor deposition system equipped with two distinct inlet sources. Each source consists of a quartz tube encased in a 3-zone tube furnace, and both tubes enter the deposition chamber directly opposite to each other. 4-trifluoroacetyl[2,2]paracyclophane (6) and 4-aminomethyl[2,2]paracyclophane (10) monomers are synthesized using established synthesis routes. 200 mg monomer (6) and 260 mg monomer (10) are loaded separately in two feed dishes, with each dish loaded into its own source. A system pressure of about 0.165 Torr and sublimation temperatures between about 80-110° C. are used to ensure sublimation. Argon carrier gas is used to independently control the flow velocities of sublimated monomer (6) (6.5 sccm) and monomer (10) (27 sccm). The sample holder is set about 4 inches below the position of both sources. To ensure gradient formation, the sample holder is not rotated. Although the sample holder remained at about 15° C., a copper plate is set on top of the sample holder in order to control the sample's angle of inclination. Deposition occurred on silicon, gold, and glass substrates. To minimize wall deposition, the chamber wall was heated to 120° C.

With reference to FIGS. 27 and 28, surface characterization may include the following. X-ray photoelectron spectroscopy (XPS) data are recorded on an Axis Ultra X-ray photoelectron spectrometer (Kratos Analyticals, UK) equipped with a monochromatized AlKα X-ray source. All spectra are calibrated with respect to the non-functionalized aliphatic carbon with a binding energy of 285.0 eV. Thicknesses are recorded at a wavelength of 532 nm using an EP³—SW imaging ellipsometry (Nanofilm Technologie GmbH, Germany). Both, nulling (four zones) and mapping experiments are performed at an angle of incident of 700, and an anisotropic Cauchy model is used to model the ellipsometric parameters psi and delta. Infrared spectroscopy is performed on a Nicolet 6700 spectrometer utilizing the grazing angle accessory (Smart SAGA) at a grazing angle of 85°.

With reference to FIG. 29, surface reaction may include the following. Biotin hydrazide and rhodamine-linked streptavidin are purchased from Pierce Inc. and Atto 655 NHS ester is purchased from Sigma Aldrich. All surface reaction experiments are performed on glass substrates. For reactions in spots, 8.0 µL of reaction buffer is dispensed onto the film, incubated, and rinsed several times. This is done at regular intervals along the length of the gradient. For reactions along a continuous stripe, a polydimethylsiloxane (PDMS) membrane is molded and cut in the shape of a long rectangle made for holding fluid within its boundaries. The membrane is placed on the film and allowed to seal, and the reaction buffer fills the membrane. Then the entire slide is immersed in washing buffer with the PDMS still remaining on the surface. Reactions are carried out in a closed Petri dish to prevent the reaction mixtures from drying out. All surfaces are rinsed with deionized (DI) water after applying the ligands and using the washing buffers. Consecutive surface reactions are conducted at each location. Fluorescence images and intensities are acquired using a GenePix 4000B scanner with 532 nm (17 mW) and 635 nm (10 mW) lasers. Both excitation wavelengths are scanned simultaneously at 100 µm spatial resolution.

Ligand 1: 0.5 ml of anhydrous dimethylformamide is added to 1 mg Atto 655 NHS ester. From this, 5.0 µl is diluted with 7 ml 0.1 M sodium bicarbonate buffer (pH 8.3), containing 0.02% (v/v) Tween 20. NHS esters are time-sensitive in aqueous solution, so the buffer is applied to the film immediately upon dilution. The solution is incubated for 1 hour at room temperature, after which the surface is rinsed with ethanol for 10 minutes and with PBS/Tween solution for 30 minutes.

Ligand 2: Biotin hydrazide is diluted to 10 mM in phosphate buffered saline (PBS pH 7.4). The solution is acid-catalyzed (HAc) prior to surface application. Incubation time lasted 7 to 10 minutes, which is followed by a wash of PBS containing 0.02% (v/v) Tween 20. The area is then applied with rhodamine-linked streptavidin solution (0.075 mg/ml in PBS; 0.02% (v/v) Tween 20; 0.1% (w/v) bovine serum albumin) for 15 minutes. Finally, the entire glass slide is immersed for 1 hour in a PBS/Tween/BSA solution.

With reference to FIG. 29, cell culture may include the following. Cryopreserved human umbilical vein endothelial cells (HUVECs) are purchased from Cambrex (Walkersville, Md., USA) and cultured in complete Endothelial Growth Media (Lonza) containing 2% fetal bovine serum. Passage 10 HUVECs are cultured in 75 cm² tissue culture-treated polystyrene (TCPS) flasks (Corning), maintained at 37° C. in a humidified atmosphere of 5% $CO_2$, and media replaced every other day until ~95% confluency is reached. Cells are harvested from flasks with 0.25% trypsin/ethylenediaminetetraacetic acid solution (Sigma) and seeded on the CVD deposited slides at $3.1\times10^4$ cells/cm² ($5.79\times10^5$ cells/slide). The slides are UV irradiated for 1 hr prior to seeding.

With reference to FIG. 30, cell characterization may include the following. After 48 hours of incubation, slides are washed 3 times in Dulbecco's phosphate-buffered saline (DPBS, Invitrogen). Phase contrast micrographs are taken with a Nikon Eclipse TS100. Cells are then fixed for 15 min in 4% paraformaldehyde (Fluka, St. Louis, Mo., USA). Upon washing, cells are permeabilized with 0.5% Triton X-100 (Alfa Aesar, Ward Hill, Mass., USA) and blocked for one hour in 1% bovine albumin serum (BSA, Sigma) in DPBS, then stained for one hour with 1/400 α-vinculin monoclonal Ab (Sigma) in 1% BSA in DPBS. The cells are then blocked for one hour in 5% Goat Serum (Zymed) in DPBS and stained for 30 minutes in 2 µg/ml Alexa 488 goat anti-mouse (IgG1, Molecular Probes). Cells are then stained with rhodamine-conjugated phalloidin (Invitrogen) and Hoechst 33342 (Invitrogen). After the final washing steps, the slides are mounted in Prolong Gold (Invitrogen), allowed to cure overnight at 4° C., and visualized using the Olympus FV-500 Confocal at Microscopy & Image Analysis Laboratory at the University of Michigan.

What is claimed is:

1. A polymeric film comprising a reactive and multifunctional copolymer comprising a first substituted p-xylylene unit having a first reactive functional group, wherein the first substituted p-xylylene unit is introduced at a first position with respect to a substrate on which the copolymer is formed so that distribution of the first substituted p-xylylene unit in the copolymer forms a first compositional gradient in a first direction in the film and a second substituted p-xylylene unit comprising a second reactive functional group distinct from said first reactive functional group, wherein the second substituted p-xylylene unit is introduced at a second position with respect to the substrate so that said second substituted p-xylylene unit forms a second compositional gradient in a second direction in the film, wherein at least one of the first and second compositional gradients corresponds to an x-dimension or a y-dimension of the film and the first position and second position are distinct from one another.

2. The polymeric film of claim 1, wherein the first and second directions of the respective first and second compositional gradients are convergent relative to one another.

3. The polymeric film of claim 1, wherein the first and second directions of the respective first and second compositional gradients are divergent relative to each other.

4. The polymeric film of claim 1, wherein one of the first and second substituted p-xylylene units comprises an amine group and the other of the first and second substituted p-xylylene units comprises a carbonyl group.

5. The polymeric film of claim 4, wherein the amine group is selected from $-NH_2$ and $-CH_2NH_2$ and the carbonyl group is selected from $-CHO$, $-COCH_3$, $-COC_2H_5$, $-COC_nH_{2n+1}$, where n ranges from 3 to 8, $-COCF_3$, $-COC_2F_5$, $-COC_{n'}F_{2n'+1}$, where n' ranges from 3 to 8, $COC_6H_5$, $-CH_2OCOCH_3$, $-COOCH_3$, $-CH_2OCOOC_6F_6$, and $-CH_2OCOCF_3$.

6. The polymeric film of claim 1, wherein the first and second substituted p-xylylene units are substantially unreactive with each other.

7. The polymeric film of claim 1, wherein the first substituted p-xylylene unit comprises a group selected from $-CHO$, $-COCH_3$, $-COC_2H_5$, $-COC_nH_{2n+1}$, where n ranges from 3 to 8, $-COCF_3$, $-COC_2F_5$, $-COC_{n'}F_{2n'+1}$, where n' ranges from 3 to 8, $-COC_6H_5$, $-NH_2$, $-CH_2NH_2$, —C≡CH, —CH₂OH, —CH₂OCH₃, —CH₂OCOCH₃, —COOCH₃, —CH₂OCOCOOC₆F₆, —CH₂OCOCF₃, —Cl, —Br, and —F.

8. A method of making a polymeric film having a compositional gradient in at least one direction, the method comprising:
  sublimating a first paracyclophane monomer in a first stream;
  sublimating a second paracyclophane monomer in a second stream, wherein at least one of the first and second paracyclophane monomers is a substituted paracyclophane and the first paracyclophane monomer is distinct from the second paracyclophane monomer;
  pyrolyzing at least a portion of the first and second paracyclophane monomers to generate first and second reactive monomers respectively; and
  introducing the first and second reactive monomers into a deposition chamber comprising a substrate, wherein the first reactive monomer enters the chamber at a first position with respect to the substrate and the second reactive monomer enters the chamber at a second position distinct from the first position with respect to the substrate, wherein the first reactive monomer and the second reactive monomer polymerize to form the polymeric film having the compositional gradient in at least one direction on the substrate.

9. The method of claim 8, wherein at least one of the first and second paracyclophane monomers which is substituted comprises a group selected from —CHO, —COCH₃, —COC₂H₅, —COC$_n$H$_{2n+1}$, where n ranges from 3 to 8, —COCF₃, —COC₂F₅, —COC$_{n'}$F$_{2n'+1}$, where n' ranges from 3 to 8, —COC₆H₅, —NH₂, —CH₂NH₂, —C≡CH, —CH₂OH, —CH₂OCH₃, —CH₂OCOCH₃, —COOCH₃, —CH₂OCOCOOC₆F₆, —CH₂OCOCF₃, —Cl, —Br, and —F.

10. The method of claim 8, wherein both the first and second paracyclophane monomers are substituted and the first paracyclophane monomer comprises an amine group and the second paracyclophane monomer comprises a carbonyl group.

11. The method of claim 8, wherein the first and second positions in the chamber are substantially opposite to one another.

12. The method of claim 8, wherein the sublimating of the first paracyclophane monomer occurs at a first temperature and the sublimating of the second paracyclophane monomer occurs at a second temperature distinct from the first temperature.

13. The method of claim 8, wherein the introducing further comprises changing the amount of one of the first or second reactive monomers relative to the other of the first and second reactive monomers in order to control a ratio of the first and second reactive monomers present in the polymeric film.

14. The method of claim 8, wherein the pyrolyzing at least a portion of the first and second paracyclophane monomers comprises independently pyrolyzing said first paracyclophane monomer in said first stream and said second paracyclophane monomer in said second stream.

15. The polymeric film of claim 1, wherein the first position is about 180° apart from the second position.

16. The polymeric film of claim 1, wherein the copolymer is semi-crystalline.

17. The polymeric film of claim 1, wherein the first position is about 120° apart from the second position.

18. The polymeric film of claim 1, wherein the first substituted p-xylylene unit has a concentration which decreases along the first compositional gradient as distance increases from the first position and the second substituted p-xylylene unit has a concentration which decreases along the second compositional gradient as distance increases from the second position, wherein the first and second positions are opposite to one another.

19. A polymeric film comprising a reactive and multifunctional copolymer comprising a first substituted p-xylylene unit having a first reactive functional group, wherein distribution of the first substituted p-xylylene unit in the copolymer forms a first compositional gradient in at least one direction in the film and a second substituted p-xylylene unit comprising a second reactive functional group distinct from said first reactive functional group, wherein said second substituted p-xylylene unit forms a second compositional gradient in a second direction in the film, wherein the first substituted p-xylylene unit is deposited countercurrent to the second substituted p-xylylene unit, and at least one of the first and second compositional gradients corresponds to an x-dimension or a y-dimension of the film.

20. The polymeric film of claim 19, wherein the first substituted p-xylylene unit has a concentration which decreases along the first compositional gradient as distance increases from a first introduction position and the second substituted p-xylylene unit has a concentration which decreases along the second compositional gradient as distance increases from a second introduction position, wherein the first and second introduction positions are opposite to one another.

\* \* \* \* \*

UNITED STATES PATENT AND TRADEMARK OFFICE
CERTIFICATE OF CORRECTION

PATENT NO.       : 8,399,047 B2                                                      Page 1 of 1
APPLICATION NO.  : 12/054171
DATED            : March 19, 2013
INVENTOR(S)      : Joerg Lahann et al.

It is certified that error appears in the above-identified patent and that said Letters Patent is hereby corrected as shown below:

On the Title Page, Item (73), Assignee, "Univeristy" should be --University--.

In the Specifications

Column 4, lines 12-13, delete "[(4-aminomethyl-p-xylylene)-co-(4-trifluoroacetyl-p-xylylene)-co-p-xylylene]polymer (3)" and insert --[(4-aminomethyl-p-xylylene)-co-(4-trifluoroacetyl-p-xylylene)-co-p-xylylene] polymer (3)--.

Column 8, line 31, delete "4-trifluoroacetyl[2.2]paracyclophane" and insert --4-trifluoroacetyl [2.2]paracyclophane--.

Column 8, line 32, delete "4-aminomethyl[2.2]paracyclophane" and insert --4-aminomethyl [2.2]paracyclophane--.

Column 13, line 37, delete "10.70" and insert --10.7°--.

Column 13, line 38, delete "21.20" and insert --21.2°--.

Column 13, line 38, delete "18.40" and insert --18.4°--.

Column 20, line 62, delete "1200" and insert --120°--.

Column 25, line 47, delete "$C_{1s}$:83.26%" and insert --$C_{1s}$: 83.26%--.

Column 26, line 7, delete "600" and insert --60°--.

Column 28, line 44, delete "600" and insert --60°--.

Column 31, line 13, delete "700" and insert --70°--.

In the Claims

Column 32, line 58, in Claim 5, delete "$COC_6H_5$," and insert -- --$COC_6H_5$,--.

Signed and Sealed this
Sixth Day of August, 2013

Teresa Stanek Rea
*Acting Director of the United States Patent and Trademark Office*